US006366295B1

(12) United States Patent
Kurashina

(10) Patent No.: US 6,366,295 B1
(45) Date of Patent: Apr. 2, 2002

(54) IMAGE DISPLAY DEVICE

(75) Inventor: Hiroyasu Kurashina, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/057,928

(22) Filed: Apr. 9, 1998

(30) Foreign Application Priority Data

Apr. 15, 1997 (JP) ........................................... 9-133036

(51) Int. Cl.[7] ................................................ G06F 3/00
(52) U.S. Cl. ....................................................... 345/684
(58) Field of Search ................................ 345/123–125, 345/127–131, 684

(56) References Cited

U.S. PATENT DOCUMENTS

| | | | | |
|---|---|---|---|---|
| 5,541,592 A | | 7/1996 | Shiihara | |
| 5,726,687 A | * | 3/1998 | Befiore et al. | 345/341 |
| 5,774,108 A | * | 6/1998 | Michiyoshi | 345/123 |
| 5,798,749 A | * | 8/1998 | Minematsu et al. | 345/123 |
| 5,924,106 A | * | 7/1999 | Sawada et al. | 707/526 |
| 6,061,062 A | * | 5/2000 | Venolia | 345/341 |

FOREIGN PATENT DOCUMENTS

| | | |
|---|---|---|
| EP | 0550812 A1 | 7/1993 |
| EP | 0574657 A3 | 12/1993 |
| EP | 0574657 A2 | 12/1993 |
| EP | 0762264 A1 | 3/1997 |
| JP | 02187791 | 7/1990 |
| JP | 6-115224 | 4/1994 |
| JP | 7-125374 | 5/1995 |
| JP | 08020141 | 1/1996 |

OTHER PUBLICATIONS

P.C. Carpenter, "Word Processor Scrolling Device", IBM Technical Disclosure Bulletin, vol. 25, No. 8, Jan. 1983, pp. 4348–4349, XP–002110212.

European Search Report dated Aug. 19, 1999 for application No. 98106716.8–2304.

* cited by examiner

*Primary Examiner*—Almis R. Jankus
(74) *Attorney, Agent, or Firm*—Hogan & Hartson, L.L.P.

(57) ABSTRACT

Various commands and data are input to an image display device via an input block. Part or whole of basic image data formed of a dot matrix is stored in a basic image data storage device of the image display device. A portion of the basic image data in a display range is converted to display image data to display the display image data on the display screen, in response to a corresponding one of the various commands input by the input. From the input block, there are input a start command for starting an automatic scroll process for automatically continuously shifting the display range in a scrolling manner in a predetermined one of upward, downward, leftward and rightward directions on the basic image data, and a proportion change command for changing a proportion between the size of the display image data and the size of the basic image data, at or before the start of the automatic scroll process or during the automatic scroll process. The automatic scroll process is started in response to the start command, and the display image data is changed in response to the proportion change command and according thereto to thereby display resulting display image data on the display screen.

14 Claims, 45 Drawing Sheets

IMAGE DISPLAY DEVICE

BACKGROUND OF THE INVENTION

1. Field of the Invention

This invention relates to an image display device for an information processing system, and more particularly to an image display device having a display screen which is small relative to the size of the entire source image, such as one used in small-sized and inexpensive information processing systems, including a tape printing apparatus.

2. Prior Art

Conventionally, the small-sized and inexpensive information processing systems of the above-mentioned kind have been capable of processing only image data which is smaller in size than that processed by a personal computer of a general type or the like, and hence images displayed on such a display device have been small in size. However, recently, as technology has advanced, an information processing system which is small-sized and inexpensive and that is capable of processing a very large volume of image data has become available. The display device of this type of system is also required to be capable of displaying large-sized images.

The display device for the information processing system of the above-mentioned kind is limited as to the size and the number of dots available on the display screen, due to size and cost constraints. Therefore, the present assignee has proposed an image display for a tape printing apparatus, which displays the whole image by reducing the size of the original image such that the image can be easily recognized in its entirety even when a display screen which is small relative to the size of the original image is used (see Japanese Laid-Open Patent Publication (Kokai) No. 6-115224 and Japanese Laid-Open Patent Publication (Kokai) No. 7-125374, for instance).

In general, however, the resolution of this kind of display is lower than that of the image actually printed, and has a smaller number of dots even when the size of the display screen is equivalent to that of the printed image. Therefore, the image is required to be displayed using thinned dots, which tends to corrupt the image. For instance, in the tape printing apparatus mentioned above, even when character images (the term "unit image" is defined to denote any image of a character, a numeral, a symbol, a figure or the like) are arranged to form print image data. (basic image data) of about 256 dots in the direction of the width thereof to be printed on a tape having a width of 24 mm, if they are displayed on a small image screen having approximately the same size (about 3 cm), each unit image displayed is hard to view or recognize since the display screen normally has only 64 dots, and hence the dot size of 256 dots of an image is an upper limit at which contents of individual unit images can be viewed or recognized on such a small screen which has a size of approximately 3 cm and is capable of displaying approximately 64 dots (see FIGS. 43A to 44B).

However, in the above-mentioned tape printing apparatus, wider tapes tend to be used as print materials, and if the basic image data adapted to such wide tapes having 521 dots or 1024 dots in the direction of the width is displayed on the display screen, not only contents of individual unit images but also the layout of images cannot be confirmed (see FIGS. 45A and 45B). It is expected that as the width of a tape increases, that is, as the size of printable image data becomes larger and more diversified, the necessity of viewing the contents and layout of the unit images becomes more and more important. Further, this necessity presents a problem requiring a solution, not only in the case of a tape printing apparatus but also in other information processing systems which are small-sized and inexpensive, such as a small-sized stamp making apparatus in which viewing and confirmation of images is required for making a stamp having a larger stamp face than that which can be displayed on a small display screen.

SUMMARY OF THE INVENTION

It is the object of the invention to provide an image display device and method which is improved in usefulness and operability in that even with a display screen small-sized relative to the size of a displayed image, the contents, layout, etc. of unit images forming the displayed image, at desired locations, can be easily viewed through relatively simple operations.

To attain the above object, according a first aspect of the invention, there is provided an image display device including:

- input means for inputting various commands and data;
- display means having a display screen;
- basic image data storage means for storing part or whole of basic image data formed of a dot matrix; and
- display control means responsive to a corresponding one of the various commands input by the input means for converting a portion of the basic image data in a display range to display image data to display the display image data on the display screen.

The image display device according to the first aspect of the invention is characterized in that the input means comprises:

- start command means for inputting a start command for starting an automatic scroll process for automatically continuously shifting the display range in a scrolling manner in a predetermined one of upward, downward, leftward and rightward directions on the basic image data, and
- change command means for inputting a proportion change command for changing a proportion between a size of the display image data and a size of the basic image data, at or before a start of the automatic scroll process or during the automatic scroll process,
- wherein the display control means is responsive to the start command input by the start command means for starting the automatic scroll process, and to the proportion change command input by the change command means for changing the display image data according thereto to thereby display resulting display image data on the display screen.

According to this image display device, by entering the start command, the display range can be automatically scrolled in the predetermined direction of the upward, downward, leftward and rightward directions on the basic image data. The conversion of image data in the display range of the basic image data to display image data includes, similarly to the conventional devices, simple extraction, expansion (zoom-in of the image) /reduction (zoom-out of the image), and schematizing (substitution of schematic image for each unit image) employed in reducing unit images. The automatic scroll makes it possible to easily and successively view the contents, layout and the like of the unit images (e.g. images of characters) in the direction of the scroll. The proportion change command can be entered at or before or during the automatic scroll process, and if it is entered during the automatic scroll process, it is possible to change the proportion in size (resolution) between the display image data and the basic image data. Therefore, even when a display screen is used which is small-sized relative to the size of the image to be displayed, the image display device enables the user to easily view or recognize the contents, layouts, and the like of the unit images which form the image displayed, through relatively simple operations.

Preferably, the display control means starts the automatic scroll process from the display range having been set when the start command is input.

According to this preferred embodiment, the automatic scroll process is started from the display range having been set when the start command is input. Therefore, for instance, if the scroll is carried out to a desired starting position by operating a cursor key or the like and then the starting command is input, it is possible to carry out the automatic scroll process from a desired display range to thereby view the image from a desired portion with ease. This makes it possible to further increase the operability of the image display device.

Preferably, the input means further includes starting position-designating means for designating a starting position on the basic image data from which the automatic scroll process should be started.

According to this preferred embodiment, the starting position of the automatic scroll can be designated and hence if the starting command is input after designating the starting position, it is possible to carry out the automatic scroll process from the desired display range to thereby view image of the image data from a desired portion thereof with ease. This makes it possible to further increase the operability of the image display device.

Preferably, the display control means carries out the automatic scroll process until a trailing end of the basic image data is reached, whereupon the automatic scroll process is terminated.

According to this preferred embodiment, the automatic scroll process is carried out until it reaches the trailing end of the basic image data to thereby terminate the same. Therefore, the staring command can be entered without designating a particular ending position thereof. Further, the automatic scroll process is automatically terminated, which makes it possible to save the trouble of operating the device, thereby making the image display device more convenient to use.

Preferably, the input means further includes ending position-designating means for designating an ending position on the basic image data at which the automatic scroll process should be terminated.

According to this preferred embodiment, the ending position of the automatic scroll can be designated and hence if, the start command is input after designating the ending position, the automatic scroll process can be terminated at the designated ending position, which makes it possible to easily view the image of only a required display range of the data, thereby reducing waste of processing time. Further, the automatic scroll process is automatically terminated and hence the trouble of operating the device can be saved, which makes the image display device more convenient to use.

Preferably, the display control means carries out the automatic scroll process in a circular manner by connecting a trailing end and a leading end of the basic image data to each other.

According to this preferred embodiment, the automatic scroll process is carried out in a circular manner by connecting the trailing end of the basic image data and the leading end of the same to each other, so that, from whatever portion of the basic image data the automatic scroll process may be started, the image can be viewed in its entire range in the direction of the scroll, and even a portion which was overlooked can be reviewed with ease without executing other particular operations, which makes the image display device more convenient to use. Further, when the image display device is shown for sale in a store, it is possible to provide an advantageous effect of causing the device to continue presenting itself to customers.

Preferably, the image display device further includes:

basic data storage means for storing the data input from the input means as basic data;

unit image data-forming means for outputting unit image data corresponding to sad basic data; and basic image data-forming means for arranging the unit image data corresponding to the basic data, which is outputted from the unit image data-forming means, in an area for the basic image data within the basic image data storage means to thereby form the part or whole of the basic image data.

According to this preferred embodiment, the image display device further includes basic data storage means for storing the data input from the input means as basic data, unit image data-forming means for outputting unit image data corresponding to the basic data, and basic image data-forming means for forming the part or whole of the basic image data. Therefore, it is possible to form not only basic image data stored in advance in the basic image data storage means but also new basic image data. Further, basic data is stored and basic image data is formed therefrom, which makes it possible to form basic image data within a desired range as required. This makes the image display device a more convenient one which has a function as an input device for entering images.

Preferably, the image display device further includes scroll image data storage means for storing therein, at any given time point during execution of the automatic scroll process, a portion of the basic image data within a scrollable range including the display range at the any given time point and a range to which the display range can be shifted within a predetermined unit time period from the any given time point, as scroll image data for use at the any given time point, and the display control means converts a portion of the scroll image data in the display range to display image data and display the display image data at the any given time point on the display screen during the execution of the automatic scroll process, and reads out the scroll image data for use at the any given time point from the basic image data storage means to store the scroll image data in the scroll image data storage means by the any give time point.

According to this preferred embodiment, scroll image data in the display range at any given time point and in a range to which the display range can be shifted from the display range before the lapse of a predetermined unit time period is stored in the scroll image data storage means different from the basic image data storage means, and the scroll image data in the display range is converted to display image data. Therefore, even when basic image data storage means is accessed by other resources or the like to make the same unavailable, the scroll process can be performed within the lapse of the predetermined unit time period. Further, in the case of the image display device also serving as an input device for entering images, it is possible to carry out scroll display by reading data from the scroll image data storage means in parallel or simultaneously with a process for forming and storing basic image data in the basic image data storage means. This makes it possible to shorten time for processing data.

Preferably, the image display device further includes;

basic data storage means for storing the data input from the input means as basic data;

unit image data-forming means responsive to inputting of various kinds of data thereto for outputting unit image data corresponding to the various kinds of data input thereto;

scroll image data storage means for storing therein, at any given time point during execution of the automatic scroll process, a portion of the basic image data within a scrollable range including the display range at the any given time point and a range to which the display range can be shifted within a predetermined unit time period from the any given time point, as scroll image data for use at the any given time point; and basic image data-forming means for arranging the unit image data corresponding to the basic data, which is outputted from the unit image data-forming means in an area for the basic image data within the basic image data storage means, and forming the scroll image data for use at the any given time point before the predetermined time period from the any given time point, the display control means converting a portion of the scroll image data in the display range to display image data and display the display image data at the any given time point on the display screen during the execution of the automatic scroll process, and reading out the scroll image data for use at the any given time point from the basic image data storage means to store the scroll image data in the scroll image data storage means by the any give time point In general, if the display screen is small in size, the size of display image data required at any given time is small, and accordingly however large the entire basic image data for forming display image data therefrom may be, it is only required that an amount of data corresponding to a small display range is available at each displaying time point. Further, when basic image data is edited on the display screen by changing entered data items via the input means, the processing time for display becomes shorter when only a display range and its neighboring portion are changed than when the entire basic image data is re-formed whenever data is changed.

This preferred embodiment includes the scroll image data storage means and the basic image data-forming means. Therefore, the corresponding advantageous effects described above can be obtained. Further, the basic image data-forming means forms basic image data required for display from any give time point within a predetermined unit time period from the given time point, by the predetermined unit time period before the given time point. Accordingly, the resulting basic image data can be stored as scroll image data in the scroll image data storage means by the given time point, whereby it is possible to continue smooth scroll process within the lapse of the predetermined unit time period from the given time point. And, basic image data to be made available at each time point can be limited to a size or range of data which can be scrolled within a time period twice as long as the predetermined unit time period after each time point, which makes it possible to save the memory area of the basic image data and at the same time shorten processing time for forming or changing the basic image data.

For instance, the basic image data is print image data to be printed on a print material.

According to this preferred embodiment, print image data to be printed on a print material can be displayed by using the same as basic image data. Therefore, the image display device can be applied to one for a printing apparatus.

For instance, the print material is in the form of a tape.

According to this preferred embodiment, the image display device can be applied to one for a tape printing whose print material is in the form of a tape.

Preferably, the change command means further includes stop command means for inputting a stop command for temporarily stopping the automatic scroll process.

According to this preferred embodiment, it is possible to stop the automatic scroll temporarily for changing the direction of scroll, zoom ratio of the image, etc.

Preferably, the size of the basic image data is represented by a number of dots in a direction of width of an image represented by the basic image data and the size of the display image data is represented by a number of dots in a direction of width of an image represented by the display image data.

To attain the above object, according to a second aspect of the invention, there is provided a method of displaying an image by automatically scrolling image data for an image display device having input means and a display screen, the method comprising:

storing part or whole of basic image data formed of a dot matrix;

converting a portion of the basic image data in a display range to display image data to display the display image data on the display screen, in response to a corresponding one of various commands input by the input means;

starting an automatic scroll process in response to a start command input by the input means, for automatically continuously shifting the display range in a scrolling manner in a predetermined one of upward, downward, leftward and rightward directions on the basic image data; and changing, in response to a proportion change command input by the input means at or before a start of the automatic scroll process or during the automatic scroll process, a proportion between a size of the display image data and a size of the basic image data, to change the display image data to thereby display resulting display image data on the display screen.

According to this method, the advantageous effects as obtained by the first aspect of the invention can be obtained.

The above and other objects, features, and advantages of the invention will become more apparent from the following detailed description taken in conjunction with the accompanying drawings.

BRIEF DESCRIPTION OF THE DRAWINGS

FIGS. 42A to 42G show examples of mixtures of various unit images mixed in respect of orientation and/or sequence, e.g. a mixture of character string images comprised of vertical writing character images and/or horizontal writing character images arranged in the direction of the length of a tape and/or in the direction of the width thereof, in which:

FIG. 42A shows an image in "Index/Vertical" print format;

FIG. 42B shows an image in "Index/Horizontal" print format;

FIG. 42C shows an image in "Horizontal Writing" print format;

FIG. 42D shows an image in "Portrait/Horizontal writing" print format;

FIG. 42E shows an image in "Vertical writing" print format;

FIG. 42F shows an image in "Landscape/Vertical writing" print format;

FIG. 42G shows an image in a format of mixture of "Portrait/Horizontal writing" print format plus "Vertical writing" print format;

DETAILED DESCRIPTION

The invention will now be described in detail with reference to drawings showing embodiments thereof. In these embodiments, an image display device according to the invention is applied to an ink jet printer for printing tapes.

Figure 1:
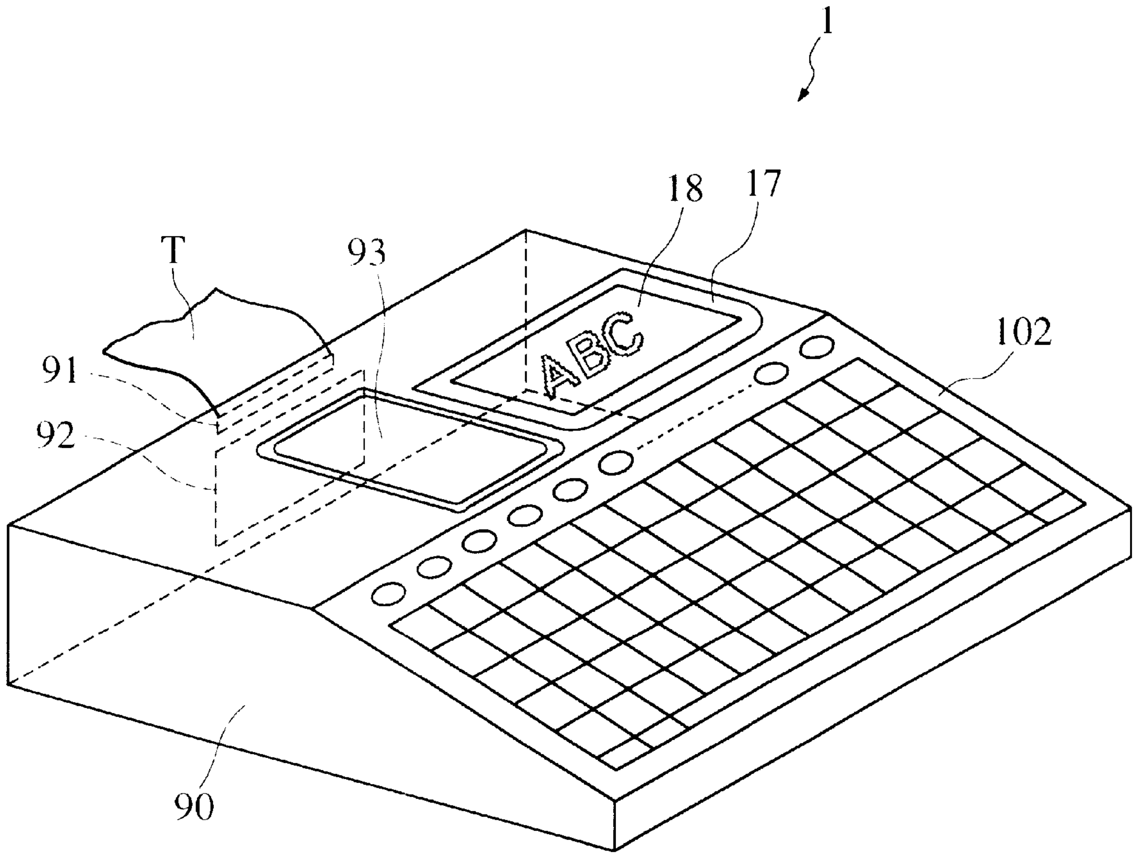
FIG. 1 is a perspective view of an appearance of an ink jet printer to which the invention is applied.
Figure 2:
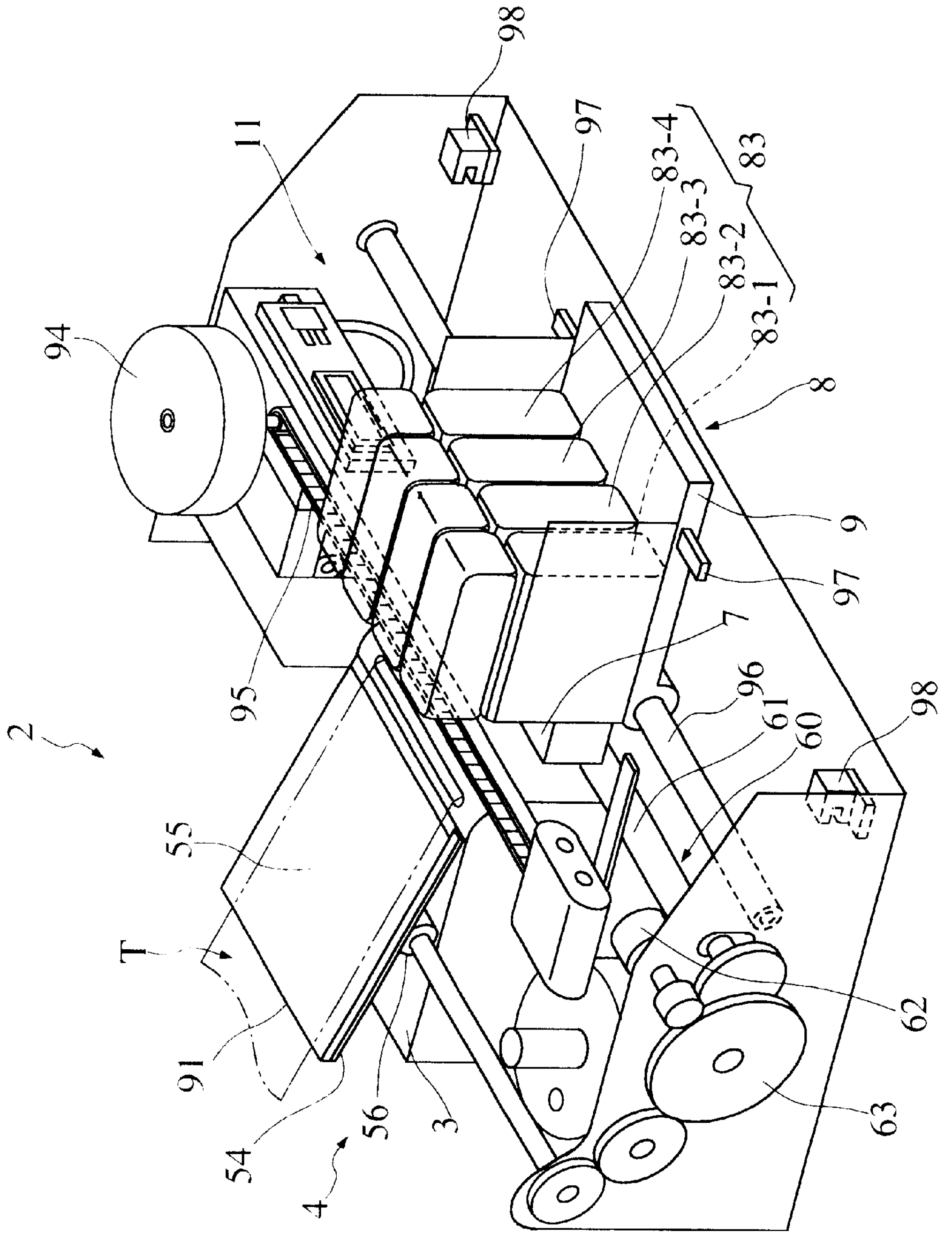
FIG. 2 is a schematic perspective view of a printer block incorporated in the ink jet printer shown in FIG. 1.

FIG. 1 is a perspective view of an appearance of an ink jet printer (tape printing apparatus) 1 incorporating the image display device according to the present embodiment. FIG. 2 is a schematic perspective view of a printer block 2 included in the ink jet printer shown in FIG. 1. The ink jet printer 1 is called a label printer, a label word processor or the like.

As shown in the figures, a peel-off paper-backed printing tape T is fed from a tape cartridge 3 loaded in a loading block 4 and color printing is carried out on the tape T by using an ink jet head 7. There are provided several kinds of printing tape T having different background colors, with various tape widths of 6 mm to 100 mm, each of which is supplied in a state received within a tape cartridge 3 therefor. A print image having a resolution of 24 to 1024 dots in the direction of the width thereof is printed on the printing tape T in a manner dependent on the width thereof.

Now, the arrangement of the ink jet printer 1 will be described in detailed hereafter. As shown in FIG. 1, the ink jet printer 1 has a body casing 90 generally in the form of a thin rectangular parallelepiped, including a keyboard 102 arranged on a front portion of a top thereof and a liquid crystal display block 17 in a right-side rear portion of the same. The keyboard 102 and the liquid crystal display block 17 form main or essential parts of the image display device according to the invention together with a control block 200 described hereinafter with reference to FIG. 5, and hence will be described in detail when the control system of the printer including the control block 200 is described.

On the other hand, as shown in FIG. 1, a tape exit 91 for sending a printed portion of the tape T out of the ink jet printer 1 is formed through a central portion of a rear upper end of the body casing 90. At a location below the tape exit 91, there is arranged a lid 92 which can be opened and closed for exchanging tape cartridges 3, while a lid 93 which can be opened and closed for exchanging ink cartridges 8 is arranged at a central portion of the top of the body casing 90. The body casing 90 contains a power supply unit and batteries, such as nicad batteries, neither of which is shown. The printer block 2 shown in FIG. 2 is provided in a rear portion of the inside of the body casing 90.

Referring to FIG. 2, the printer block 2 includes the loading block 4 in which the tape cartridge 3 is removably loaded, the ink jet head 7 for printing characters and figures on the printing tape T, the ink cartridge 8 for supplying ink, and a carriage 9 for removably loading the ink cartridge 8 thereon and moving the ink cartridge 8 and the ink jet head 7 forward and backward in the direction of the width of the printing tape T.

To the carriage 9 is connected a timing belt 95 which is driven in a normal or reverse direction according to normal or reverse rotation of a carriage motor (hereinafter referred to as "the CR motor") 94, whereby the carriage 9 reciprocates in the direction of the width of the tape T in a manner guided by a carriage guide shaft 96. When one of light shields 97 projecting from the carriage 9 in the direction of the width of the tape T are brought before an associated one of position-detecting sensors 98 each comprised of a photo interrupter or the like, the ink jet head 7 is detected to be at a home position, not shown, whereby the correction of the position of the ink jet head 7, such as zero position adjustment, is carried out.

The home position serves not only as a standby position of the ink jet head 7 but also as a reference position for printing. The CR motor 94 is driven for rotation in a predetermined number of steps from the reference position, whereby the carriage 9 is moved with accuracy to each position in the direction of the width of the tape T within a printing range, and the ink jet head 7 is driven in synchronism with movement of the carriage 9 to thereby effect printing of characters and figures on a surface of the tape T in a desired manner. Further, the printer block 2 has a head cap mechanism 11 for closing ink nozzles, not shown, of the ink jet head 7 and cleaning the same by using a pump motor 99 (see FIG. 5) as required.

Figure 3:
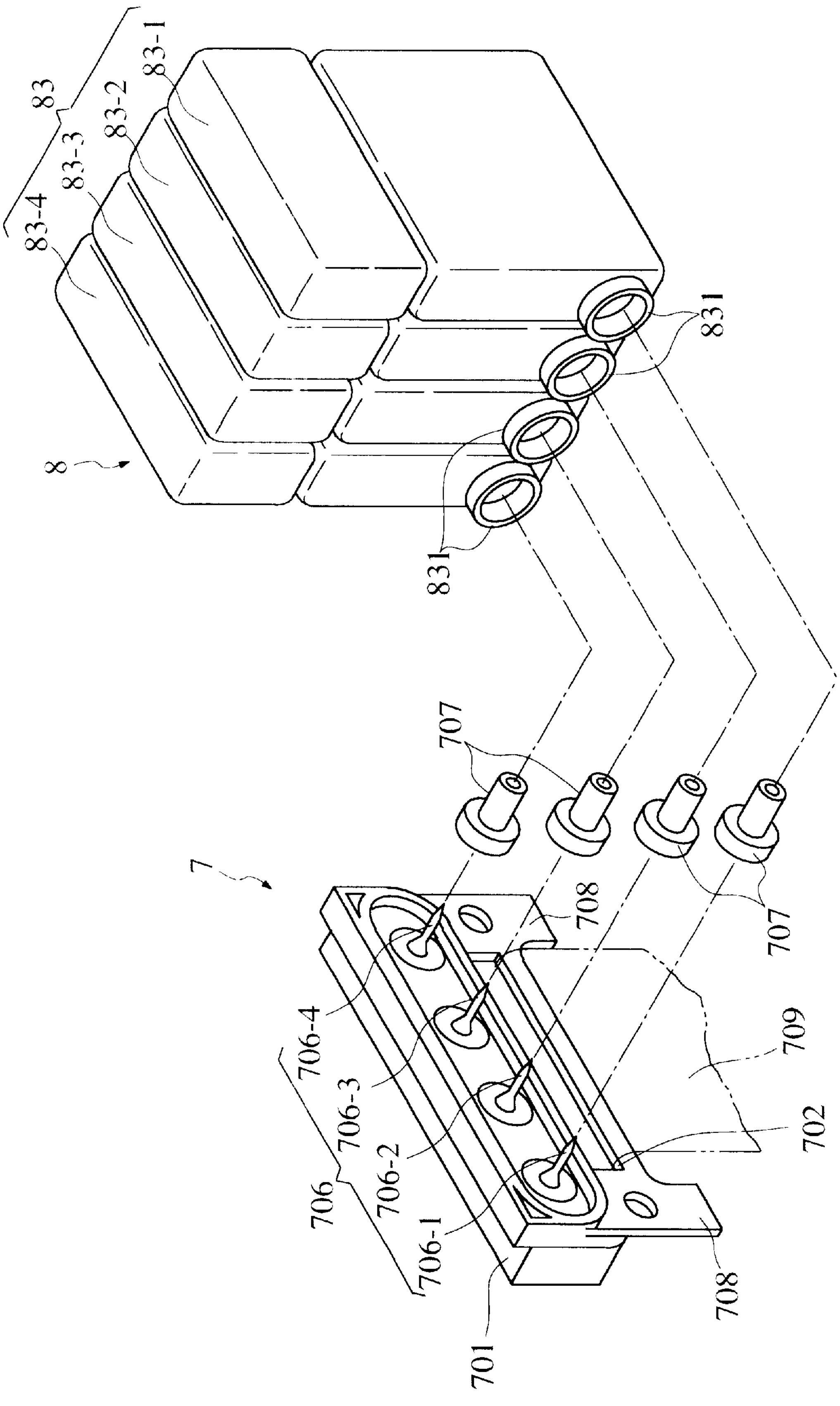
FIG. 3 is a schematic perspective view showing only an ink jet head mounted in the FIG.1 ink jet printer and an ink cartridge removably connected to the ink jet head.

As shown in FIG. 3, the ink jet head 7 includes a head casing 701 generally in the form of a rectangular parallelepiped. The head casing 701 has a front wall formed with the ink nozzles provided numerous in number, not shown, by semiconductor manufacturing technology. Four head needles 706 (706-1, 706-2, 706-3, 706-4) project outward from the back of the ink jet head 7, and yellow ink, cyan ink, magenta ink and black ink held in respective four ink tanks 83 (83-1, 83-2, 83-3, 83-4) of the ink cartridge 8 are supplied via ink filter cartridges 707 inserted into ink supply holes 831 and head needles 706 inside the ink filter cartridges 707 to discharge ink droplets from ink nozzles for corresponding colors of ink.

Mounting portions 708 formed on opposite lateral ends of the ink jet head 7 are fixed to the carriage 9 by screws or the like. Further, as indicated by phantom lines, a flexible cable 709 has one end thereof connected to the body of the inkjet head 7 arranged on the front side through a slit 702 opening in the back of the ink jet head 7, and another end thereof connected to a head-driving circuit 281 (see FIG. 5) associated with the ink head jet 7. The ink jet head 7 is electrically driven by way of the cable 709 by the head-driving circuit 281 to carry out an ink-discharging action.

Figure 4B:
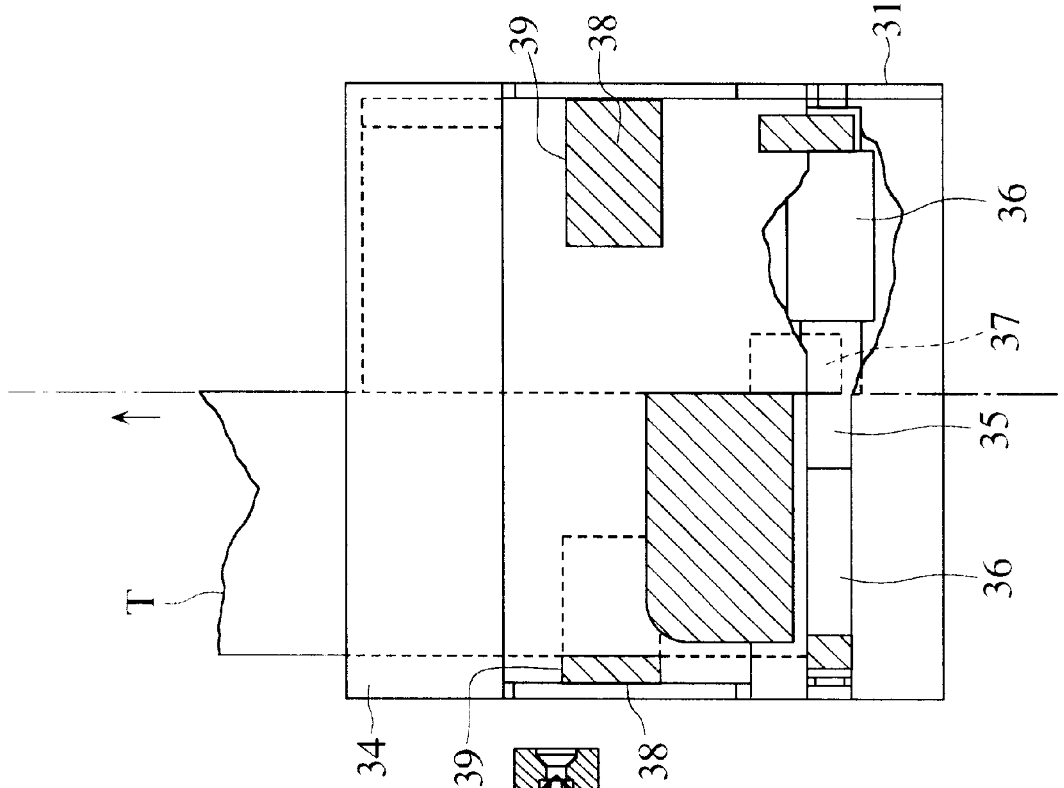
FIG. 4B is an explanatory view showing a front wall side of the tape cartridge.
Figure 4A:
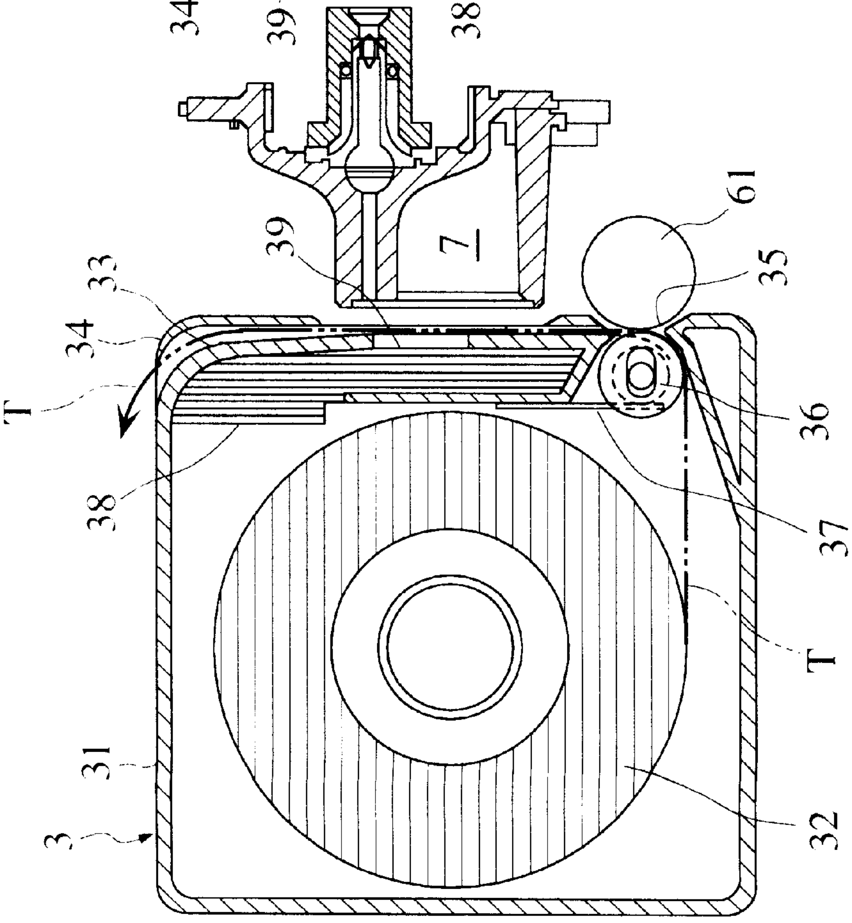
FIG. 4A is a schematic cross-sectional view showing a tape cartridge for the FIG. 1 ink jet printer and a portion of the printer at which the tape cartridge is mounted.

FIGS. 4A and 4B show the construction of the tape cartridge 3 in cross-section. The tape cartridge 3 has a cartridge casing 31 in the form of a rectangular parallelepiped. In a central portion inside the cartridge casing 31 there is arranged a tape roll 32 into which a tape T is wound. A pair of tape-retaining rollers 36 are arranged inside a tape-delivering hole 35 formed through a lower portion of the front wall 33. The tape-retaining rollers 36 are supported against a spring force of a leaf spring 37 attached to an inner wall of the tape cartridge 3. Further, inside the front wall 33 there is formed a waste ink-collecting block 38 filled with an ink absorbent, separately from the other blocks inside the tape cartridge 3. Part of the waste ink-collecting block 38 is exposed through a pair of collecting windows 39 toward the ink jet head 7.

Referring again to FIG. 2, a tape-feeding mechanism 60 includes a feeding roller 61, a paper-feeding motor (hereinafter referred to as "the PF motor") 62 mounted on a left-side wall of the printer block 2 and a reduction gear train 63 which is rotatably supported on an outer surface of the left-side wall of the printer block 2 to transmit torque from the PF motor 62 to the feeding roller 61. As shown in FIGS. 4A and 4B, a tape T is fed upward by the feeding roller 61 and printed by the ink jet head 7 when the printing area of the tape T is in the printing position at an intermediate portion of the front wall 33. The tape T including the printed portion is fed along a feeding passage between the front wall 33 and an upper guide wall 34 and sent between a pair of guide plates 54, 55 which are disposed on a discharging roller 56, and extend from a rear-side central portion of the printer block 2 in a manner obliquely projecting backward, as shown in FIG. 2, to be delivered out of the tape exit 91 of the body casing 90 (see FIG. 1).

Next, the basic configuration of the control system of the ink jet printer 1 will be described with reference to FIG. 5. The control system is basically comprised of the control block 200, the keyboard 102, the position-detecting sensors 98, a printer-driving circuit 280, a liquid crystal display (LCD)-driving circuit 290, and the liquid crystal display block 17.

The position-detecting sensor 98 detects that the ink jet head 7 has reached the home position, as describes above, to generate a signal indicative of the sensed position, which is supplied to the control block 200. The printer-driving circuit 280 includes the head-driving circuit 281 for driving the ink jet head 7 of the printer block 2 and a motor-driving circuit 282 for driving the CR motor 94, the PF motor 62 and the pump motor 99 to control the respective devices in the printer block 2 in response to control signals delivered from the control block 200 i.e. in accordance with commands carried by the signals. Similarly, the liquid crystal display-driving circuit 290 controls the liquid crystal display block 17 in accordance with commands from the control block 200.

The liquid crystal display block 17 has a display screen 18 which is capable of displaying display image data GC of 64×96 dots on a rectangular display area of approximately 4 cm×6 cm (see FIG. 1). The liquid crystal display block 17 is used to enable the user to enter data via the keyboard 102 to form or edit print image data (basic image data) GD, enter various commands including ones for selections via the same, view print image data GD e.g. during an automatic scroll process described hereinafter, etc.

On the keyboard 2 there are arranged a character key group 103 including alphabet keys and symbol keys, and a function key group 104 for designating various operation modes and the like. The function key group includes a power key 105, a print key 106 for instructing printing operations, a selection key 107 for inputting data after character code conversion (in the present embodiment, text is entered in Japanese language which requires determination or settling of entered text with respect to character code conversion between Japanese Kana characters and Kanji characters) and feeding lines during text entry as well as selecting modes on a menu screen, a color specification key 108 for specifying printing colors of the print image data GD, a color-setting key 109, and four cursor keys 110 (110U, 110D, 110L, 110R: hereinafter referred to as "the cursor "↑" key 110U" and the like) for moving a cursor in respective upward "↑", downward "↓", leftward "←", and rightward "→" directions, neither of which is shown.

The function key group 104 also includes an escape key 111 for canceling commands, a stop key 112 for interrupting various operations, an environment-setting key 113 for displaying environment-setting menus, an image key 114 for alternately changing between a text entry screen or a menu screen and an image screen for displaying the print image data GD, an automatic scroll key 115 for starting an automatic scroll process described hereinafter, a pause key 116 for causing the continued operation of the above automatic scroll process or the like to pause, a resume key 117 for canceling the pause to resume the process stopped by the pause key 116, and a zoom key 118 for changing a ratio (proportion) of a size of the print image data GD to a size of display image data GC displayed on the image screen.

Needless to say, similarly to keyboards of a general type, the above key entries may be made by separate keys exclusively provided for respective key entries, and/or by a smaller number of keys operated in combination with a shift key or the like. Here, for purposes of ease of understanding, the following description will be made assuming that there are provided as many keys as described above.

Figure 5:
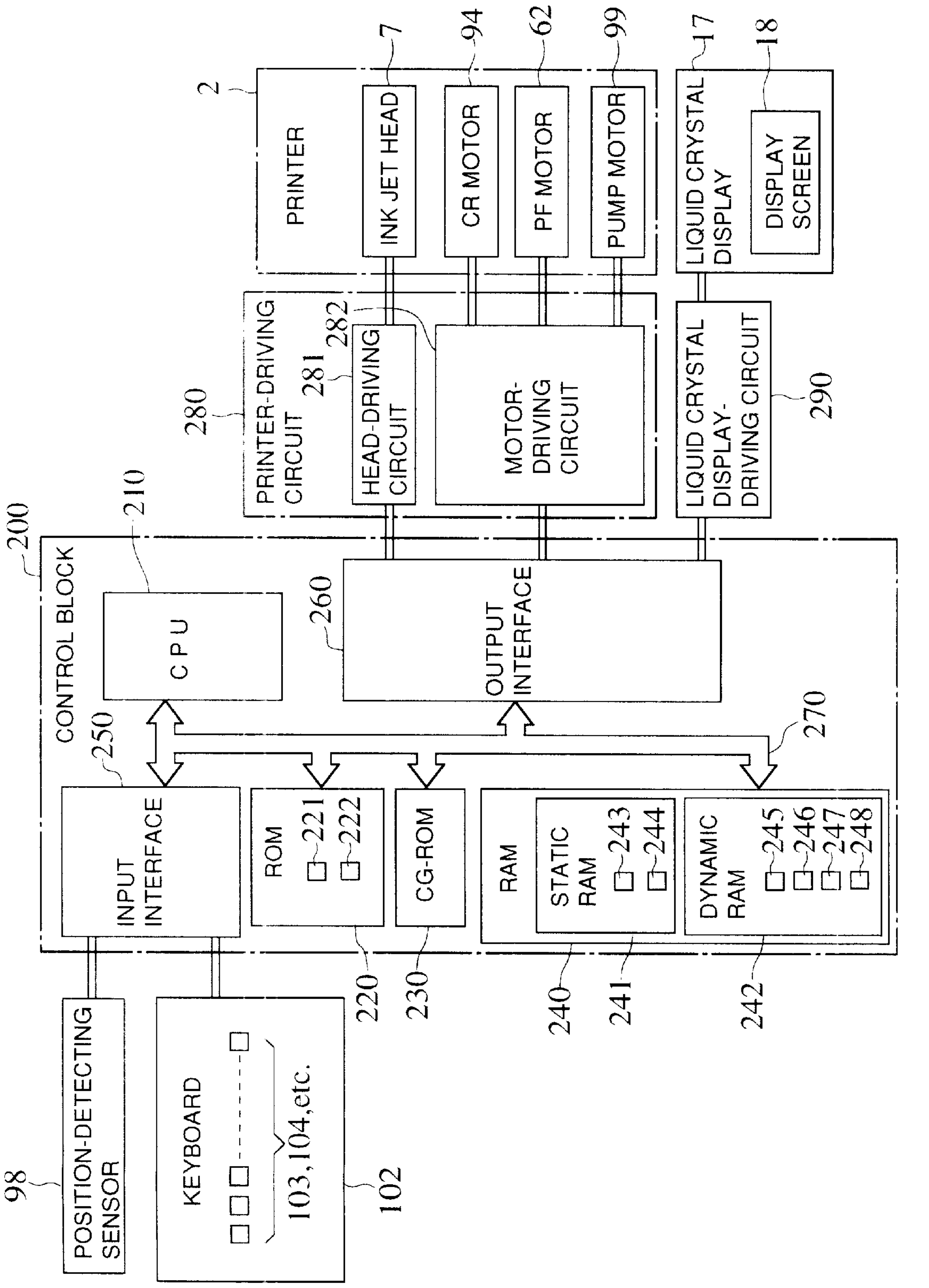
FIG. 5 is a block diagram showing the configuration of a control system of the FIG. 1 ink jet printer.

Referring to FIG. 5, from the keyboard 102, various commands described above and data are input to the control block 200.

The control block 200 includes a CPU 210, a ROM 220, a character generator ROM (hereinafter referred to as "the CG-ROM") 230, a RAM 240, an input interface 250, and an output interface 260, all of which are connected to each other by an internal bus 270.

The ROM 220 stores control programs executed by the CPU 210 as well as a color conversion table 221 and a character modification table 222. The CG-ROM 230 stores font data, i.e. data of characters, symbols, figures and the like, provided for the ink jet printer 1, and when code data for identifying characters or the like are given, it outputs corresponding font data.

The RAM 240 has a static RAM 241 and a dynamic RAM 242. The static RAM 241 is supplied with power by a backup circuit, not shown, such that it can preserve stored data even when the power is turned off by operating the power key 105, and hence it mainly stores data required to be backed-up. The static RAM 241 includes various kinds of register groups 243 desired to be preserved even when the power is off and an area of a text memory 244 for storing text data of letters and the like entered by the user via the keyboard 102, and is used as a work area for carrying out control operations.

The dynamic RAM 240 is a buffer for temporarily storing image data as results of various processes executed by the CPU 210, which includes a developed image data buffer 245, a scroll image data buffer 246, a display image data buffer 247, all referred to hereinafter, as well as various conversion buffers 248, such as a color conversion buffer.

The input interface 250 is a circuit which is connected to the keyboard 102 and the position-detecting sensor 98 for receiving commands and data entered via the keyboard 102 and position-detecting signals from the position-detecting sensor 98, into the internal bus 270. The output interface 260 is a circuit for outputting data and control signals output to the internal bus 270 by the CPU 210 or the like to the printer-driving circuit 280 and the liquid crystal display-driving circuit 290.

The CPU 210 of the control block 200 constructed as above receives via the input interface 250 commands and data entered via the keyboard 102 and position-detecting signals from the position-detecting sensor 98 according to the control program read from the ROM 220, processes font data from the CG-ROM 230 and various data stored in the RAM 240, and delivers control signals to the printer-driving circuit 280 and the liquid crystal-driving circuit 290 by way of the output interface 260, whereby the CPU 210 carries out the position control in printing operations, the display control of the display screen 18 and the printing control to cause the ink jet head 7 to carry out color printing on a tape T under predetermined printing conditions. In short, the CPU 210 controls the overall operation of the ink jet printer 1.

Next, the overall control process carried out by the ink jet printer 1 will be described with reference to FIG. 6. As shown in the figure, when the program for carrying out the control process is started e.g. when the power of the ink jet printer 1 is turned on, first, at a step S1, initialization of the system including restoration of saved control flags is carried out to restore the ink jet printer 1 to the state it was in before the power was turned off the last time. Then, the image that was displayed on the display screen 18 before the power was turned off the last time is shown as the initial screen at a step S2.

Figure 6:
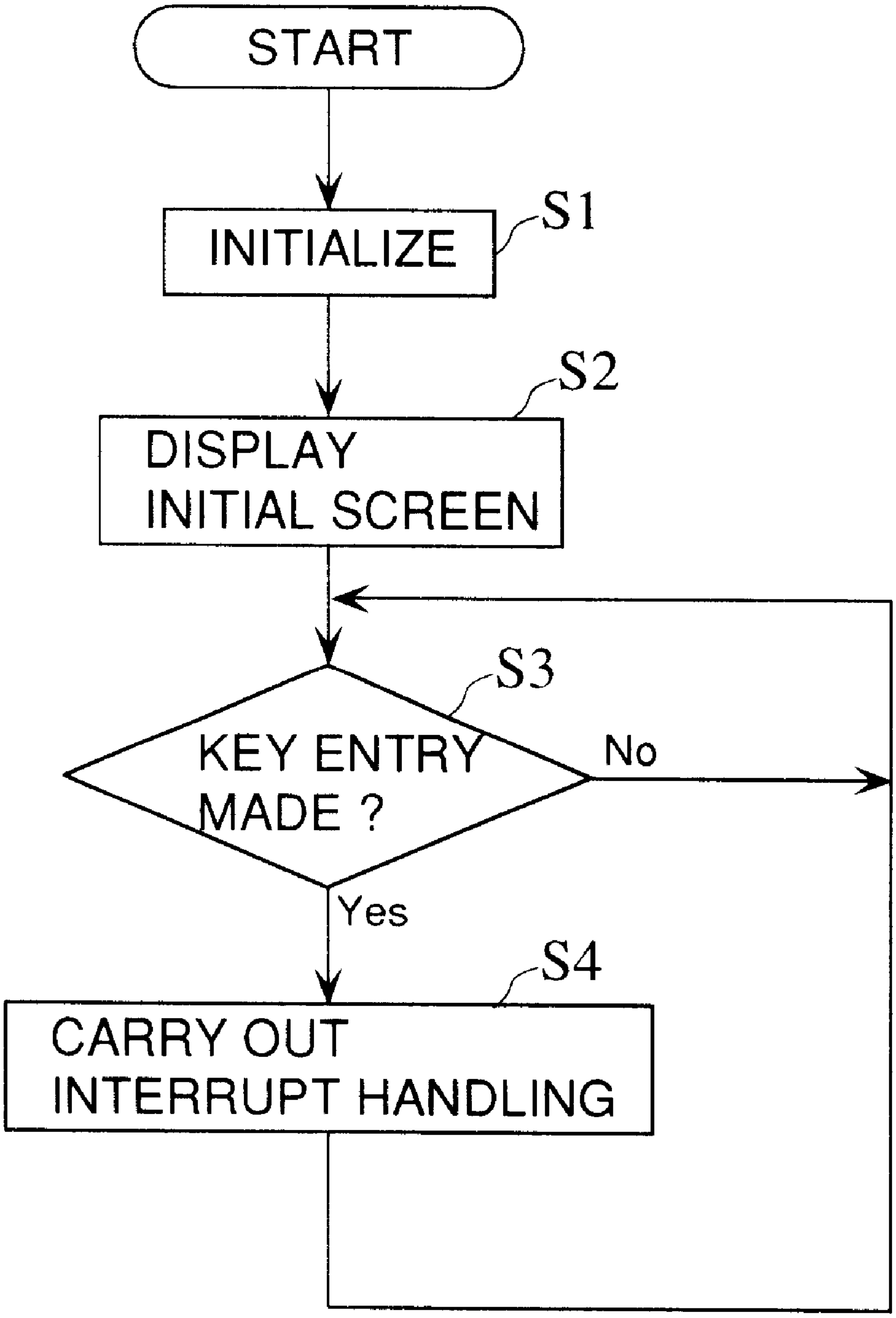
FIG. 6 is a flowchart showing an overall control process executed by the control system of the FIG. 1 ink jet printer.

The following steps in FIG. 6, that is, a step S3 for determining whether or not a key entry is to be made and a step S4 for carrying out interrupt handling operations are conceptual representations of actual operations. Actually, when the initial screen has been displayed at the step S2, the ink jet printer 1 enables an interrupt by key entry (keyboard interrupt), and maintains the key entry wait state (No to S3) until a keyboard interrupt is generated. When a keyboard interrupt is generated (Yes to S3), a corresponding interrupt handling routine is executed at the step S4, and after the interrupt handling routine is terminated, the key entry wait state is again enabled and maintained (No to S3).

Figure 7:
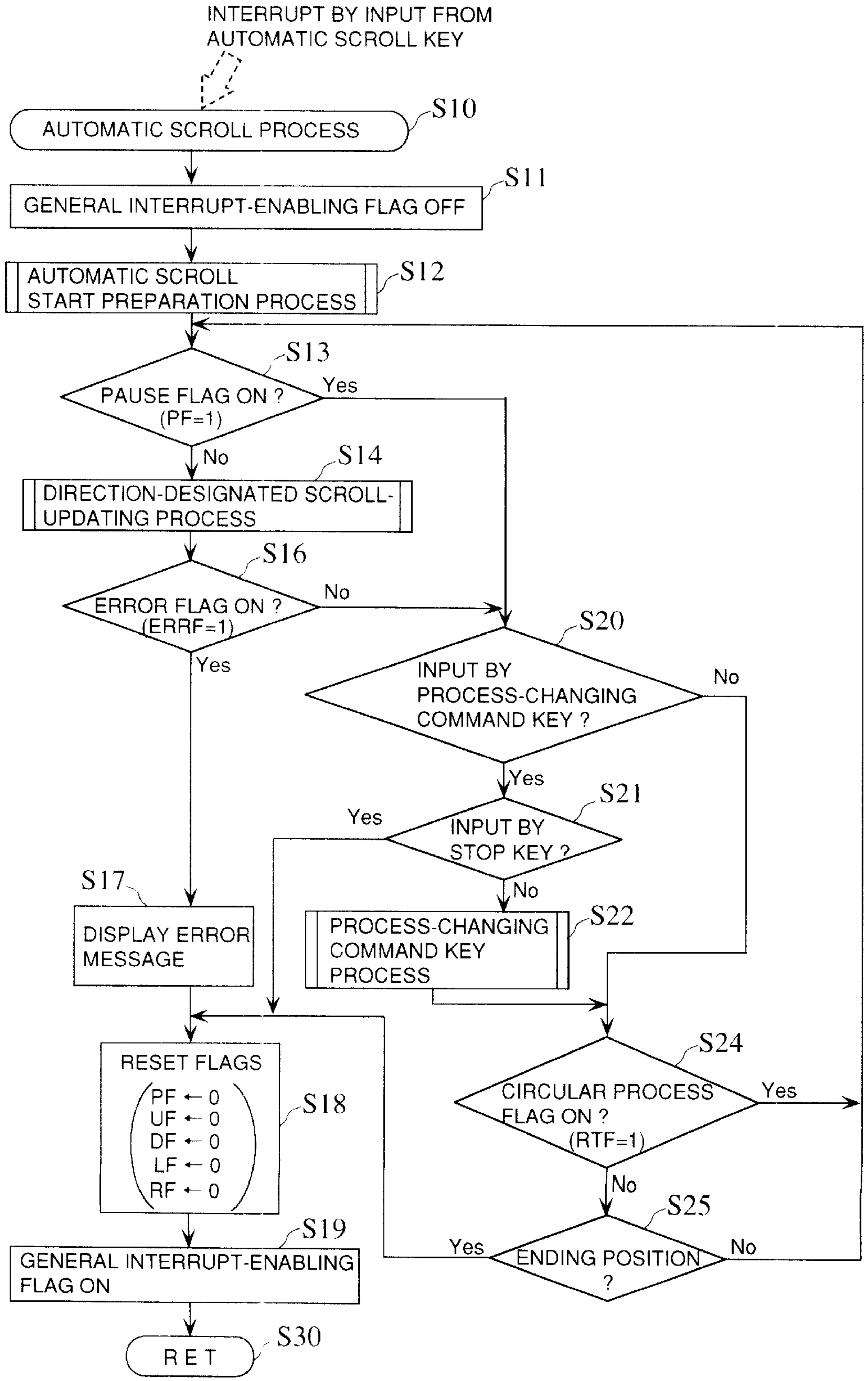
FIG. 7 is a flowchart showing a routine for carrying out an automatic scroll process.

Next, the automatic scroll process which constitutes characterizing features of the invention will be described with reference to FIG. 7. In the enabled key entry wait state mentioned with reference to FIG. 6, if any of the four cursor keys 110 (110U, 110D, 110L, 110R) is depressed with the automatic scroll key 115 being depressed, an automatic scroll keyboard interrupt is generated. The kind of the cursor key (direction) (when the cursor "→" key 110R is depressed, for instance, the direction is "rightward") is stored by a flag (e.g. by setting a rightward flag RF to 1) or the like, and then the automatic scroll process shown in FIG. 7 is started at a step S10. When the direction is upward, an upward flag UF is set to 1, when the direction in downward, a downward flag DF is set to 1, and when the direction is leftward, a leftward flag LF is set to 1. The following description is made assuming that the right ward flag RF is set to 1.

When a routine for carrying out the automatic scroll process is started at the step S10, as shown in FIG. 7, first, to avoid the risk that general interrupt handling routines will become multiplexed and thereby get out of control (causing garbled data or the like), a flag (general interrupt-enabling flag) for enabling general interrupts other than urgent interrupts, such as one generated when the power is turned off, is set to an OFF state (interrupt-disabled state) at a step S11. Then, the process for preparing for the start of the automatic scroll process (automatic scroll start preparation process) is carried out to display an image screen containing a portion of the print image data GD at the starting position of the automatic scroll at a step S12. The process executed at the step S12 will be described in detail hereinbelow with reference to FIG. 8, and the following description is made assuming that the image screen has displayed the image restored from the last power down (image restored as the result of initialization performed at the step S1 in FIG. 6).

After the portion of the print image data GD within the display range at the starting position of the automatic scroll is displayed on the image screen at the step S12, it is determined at a step S13 whether or not a pause flag PF is on (whether PF is equal to 1) at a step S13. Immediately after the routine for the automatic scroll process (S10) is started, the pause flag is equal to 0 (No to S13), and hence the program proceeds to a step S14 wherein a designated direction scroll-updating process is executed. Since this process performed at the step S14 will be also described in detail hereinafter with reference to FIG. 21, the description is made here assuming that the image screen has displayed the display image scrolled rightward by a predetermined number of lines of dots with the rightward flag RF having been set to 1.

After the display image has been updated for a scroll of the predetermined number of lines of dots, then the program proceeds to a step S16, wherein it is determined whether or not an error flag ERRF is on (whether or not ERRF is equal to 1). If there is an error (Yes to S16), after a predetermined error message display is carried out at a step S17, each flag is reset at a step S18 and then the general interrupt-enabling flag is again turned on (general interrupt enabled) at a step S19, followed by terminating the present automatic scroll routine at a step S30 to return the display screen 18 to the FIG. 6 state in which the keyboard interrupt is enabled.

On the other hand, when there is no error (No to S16), or alternatively, if the above pause flag is on (PF=1) (Yes to S13), then, it is determined at a step S20 whether or not a key entry has been made by any of the process-changing command keys described hereinafter, during a time period from a time point of the generation of the automatic scroll interrupt to a time point of execution of the present process. If this key entry has been made (Yes to S20), it is determined at a step S21 whether or not the entry has been made by the stop key 112.

If the entry has been made by the stop key 112 (Yes to S21), to terminate the automatic scroll process (S10) in response to the entry via the stop key, similarly to the case of occurrence of an error, each flag is reset at the step S18 and then the general interrupt-enabling flag is again turned on (general interrupt enabled) at the step S19, followed by terminating the present routine at the step S30 to return the display screen 18 to the FIG. 6 state in which the keyboard interrupt is enabled.

It should be noted that by storing a state of the display screen 18 before starting the automatic scroll process (S10) in advance in memory, such as the RAM, the display screen 18 can be forcibly returned to the state before starting the automatic scroll process when the escape key 111 is operated as the process-changing command key. This use of the escape key 111 is consistent with its function of canceling a routine or subroutine started by an erroneous operation of any of the other function keys, which makes it possible to further increase the ease of operation of the printer by the user.

On the other hand, if the key entry executed at the step S20 has not been made by the stop key 112 (No to S21), then, a subroutine for a process-changing command key process is executed at a step S22. Since this process carried out at the step S22 is also described in detail hereinafter with reference to FIG. 36, the description is made here assuming that the pause flag PF has been turned on (PF=1) through operating the pause key 116.

After terminating the process-changing command key process (S22), or alternatively, when no key entry has been made by any of the process-changing command keys (No to S20), then it is determined at a step S24 whether or not a circular process flag RTF is on (whether or not RTF is equal to 1).

If the circular process flag is on (Yes to S24), it means that a trailing end of the print image data GD and a leading end of the same are connected to each other to circularly carry out the automatic scroll process (S10), and hence as long as there does not occur a terminating event, such as a key entry via the above stop key 112 or the escape key 111, an urgent interrupt handling responsive to a key entry via the power key 105 or the like, or turn-on of the error flag which occurs when an error is caused by a mechanical failure or the like, the program proceeds to carry out a loop of the determining process from the determination of whether or not the pause flag PF is equal to 1 (S13) to that of whether or not the circular process flag RTF is equal to 1 (S24).

On the other hand, if the circular process flag RTF is off (RTF=0) (No to S24), then it is determined at a step S25 whether or not the automatic scroll process has reached an ending position EP of the print image data. In this case, if the ending position EP has been designated at or before the automatic scroll process start preparation process at the step S12, it is determined more specifically at the step S25 whether or not a reference point setting the ending position EP (see screens T37 to T40 in FIGS. 16 to 17B, and screens T46 to T48 in FIG. 19) has been displayed within the display screen 18 (image screen), that is, the display image data GC is changed to contain the reference point setting the ending position EP.

Figure 12A:
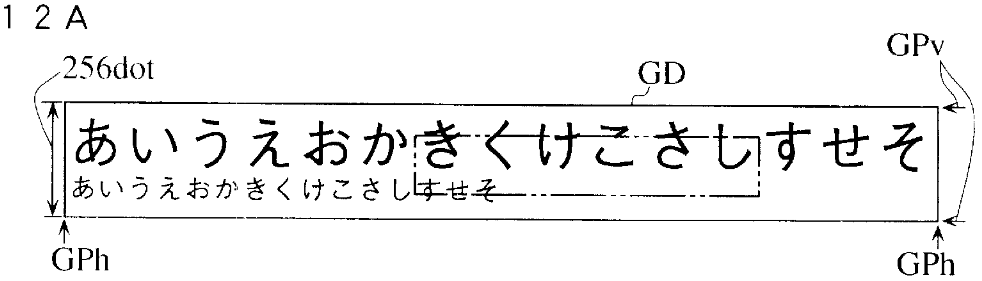
FIGS. 12A to 12E are diagrams showing examples of a rightward automatic scroll process carried out on a print image date item which has a resolution of 256 dots in the direction of the width of an image thereof.
Figure 12B:
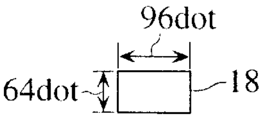

On the other hand, if the ending position is not particularly designated, the position of a trailing end of the print image data GD [vertical trailing end (=vertical leading end) GPv, or horizontal trailing end (=horizontal leading end) GPh of the print image data D; see FIG. 12A, for instance] is set to the reference point setting the ending position EP, and then it is determined at the step S25 whether or not the display image data GC is changed to contain the reference point (GPV or GPh in this case) setting the ending position EP.

If the ending position EP (more specifically, the reference point setting the ending position EP) has been displayed on the image screen (Yes to S25), each flag is reset at the step S18, and the general interrupt-enabling flag is again turned on at the step S19, followed by terminating the present routine at the step S30 to return the display screen 18 to the FIG. 6 state in which the keyboard interrupt is enabled.

On the other hand, if the ending position EP has not been reached (No to S25), the automatic scroll process (S10) continues to be carried out similarly to the case of the circular process flag being on (Yes to S24), and hence the program proceeds to execute a loop of the determining process from the determination of whether or not the pause flag PF is equal to 1 (S13) to that of whether or not the ending position EP has been reached (25).

Figure 8:
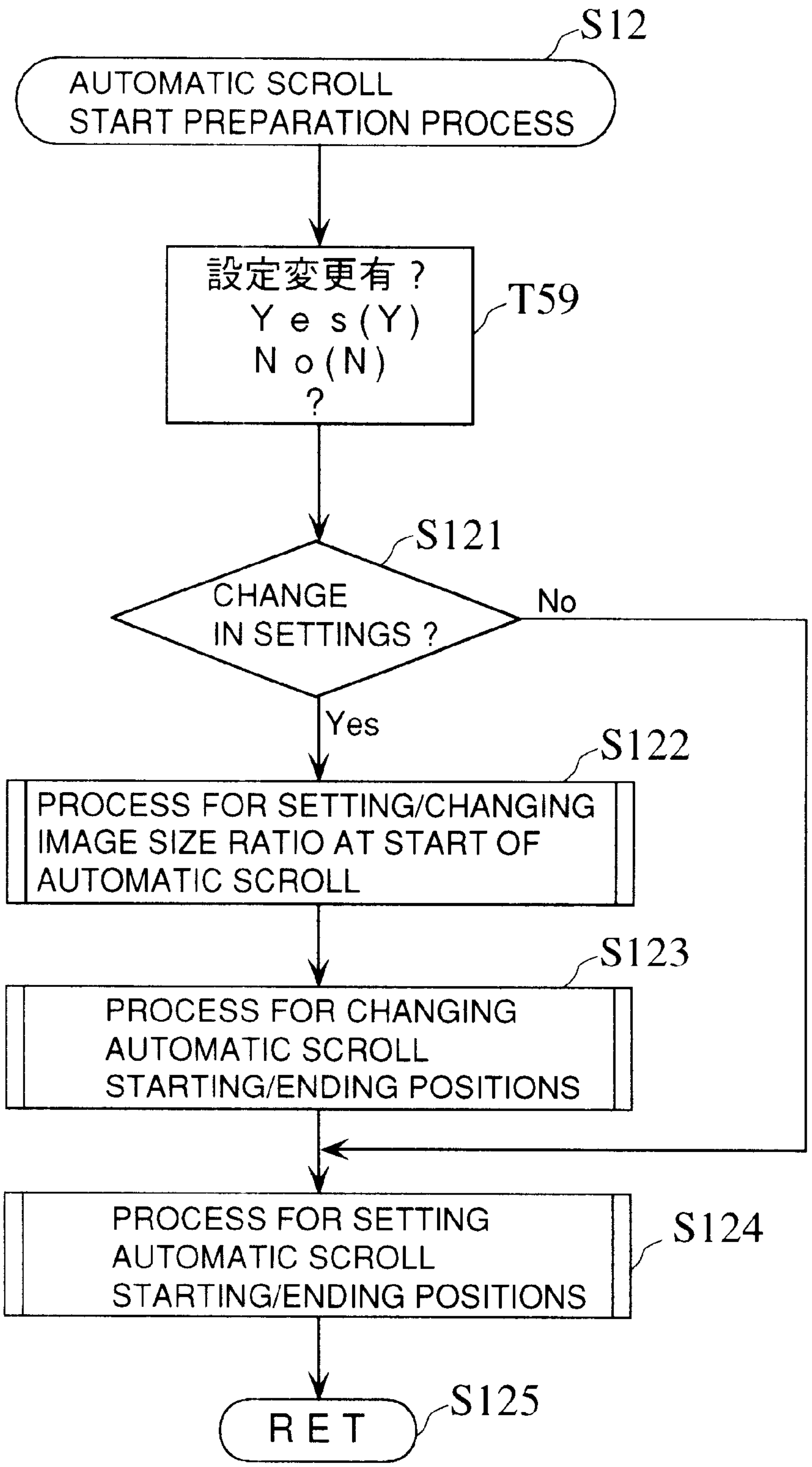
FIG. 8 is a flowchart showing a routine for carrying out an automatic scroll start preparation process, which is executed in the FIG. 7 automatic scroll process.

Next, the automatic scroll start preparation process (S12) will be described with reference to FIGS. 8 to 20. After the general interrupt-enabling flag is turned off at the step S11 in FIG. 7, and the present routine is started at the step S12, as shown in FIG. 8, a message "設定変更有? (Change in settings ?)" is first displayed on the display screen 18 to prompt the user to effect a key entry answering a question as to whether or not the settings are to be changed (screen T59: hereafter, contents displayed on the display screen 18 are referred to as "screen T??" (? represents a digit) and for each reference numeral only T?? is used).

When the key entry (T59) has been completed to answer the question as to whether or not the settings are to be changed, then it is determined at a step S121 whether or not the settings are to be changed. If the settings are not to be changed (No to S121), a process for setting the automatic scroll starting/ending positions is carried out at a step 124 and then this process is terminated at a step S125, followed by the program proceeding to the next step S13 in FIG. 7, wherein it is determined whether or not the above pause flag PF is equal to 1.

Figures 13A, 13B:
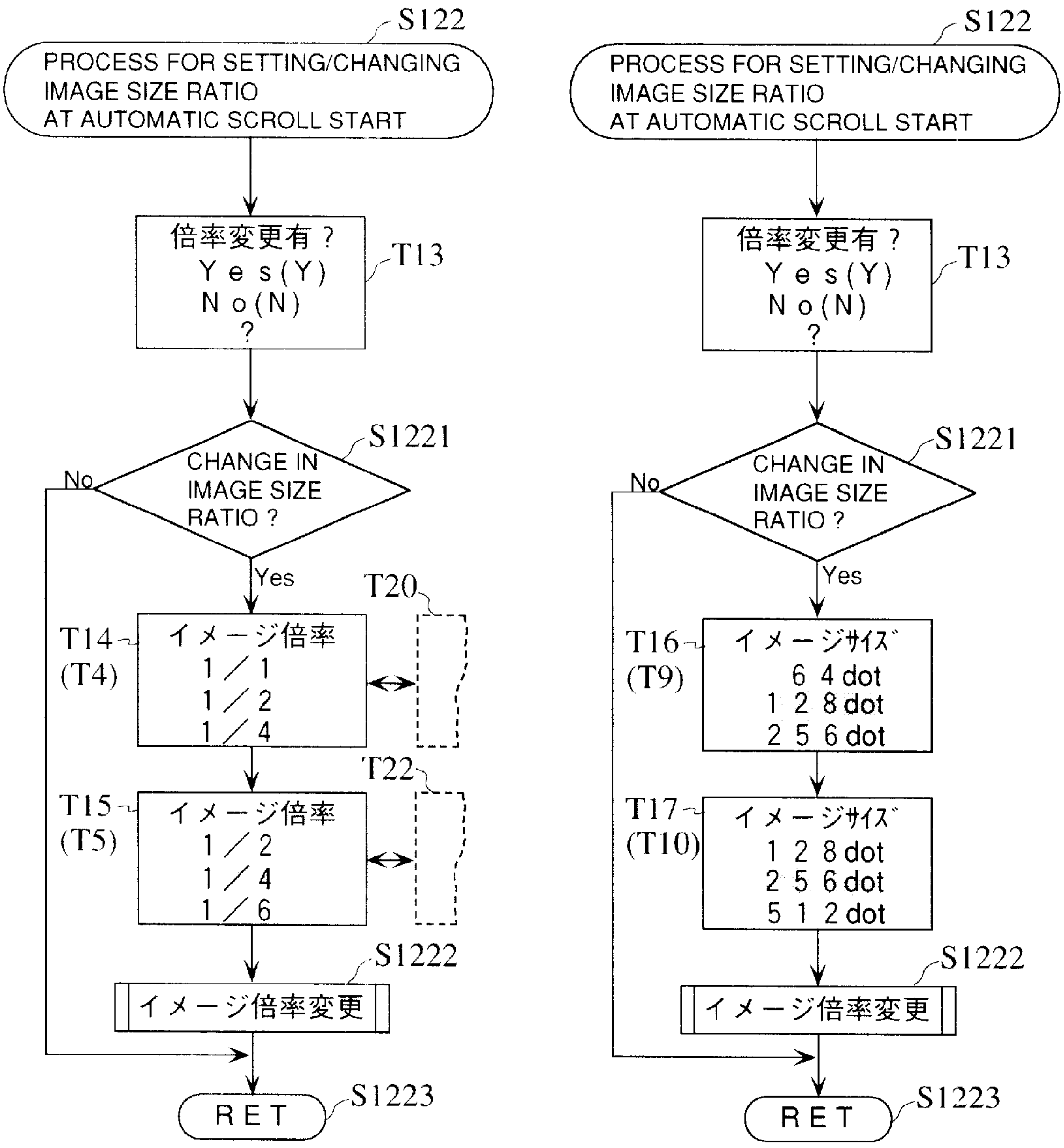
FIGS. 13A and 13B are flowcharts each showing a subroutine for carrying out an image size ratio-setting/changing process at the start of an automatic scroll, which is executed in the FIG. 8 automatic scroll start preparation process.

On the other hand, if the settings are required to be changed (Yes to S121), the program proceeds to a step S122 wherein a process for setting/changing the image size ratio (proportion) at the start of the automatic scroll, described hereinafter with reference to FIGS. 13A and 13B, is carried out and then at a step S123, a process for changing the automatic scroll starting/ending positions is carried out. Thereafter, the process for setting the automatic scroll starting/ending positions is carried out at the step S124 and the present subroutine is terminated at the step 125, followed by the program proceeding to the next step S13 in FIG. 7.

According to the ink jet printer 1, it is possible to change the settings of the image size ratio (proportion), i.e. a proportion of the size of display image data GC displayed on the display screen 18 (actually, a resolution of a displayed image: the maximum 64 dots in the direction of width or vertical direction, the maximum 96 dots in the direction of the length or horizontal direction) to the size of a portion of the print image data GD (actually, a resolution of the image data in the number of dots: the maximum 1024 dots in the direction of the width or vertical direction) corresponding to the display image data GC, by three different methods.

First of all, a first manner of setting/changing the image size ratio from an environment-setting screen will be described with reference to FIGS. 9 to 12E. Then, a second manner of setting/changing the same when the automatic scroll is started, that is, the process (S122) for setting/changing the image size ratio when the automatic scroll is started will be described with reference to FIGS. 13A and 13B. A third manner of changing the same during execution of the automatic scroll process will be described in detail when the process-changing command key process (S22) (see FIG. 36) is described.

Figure 9:
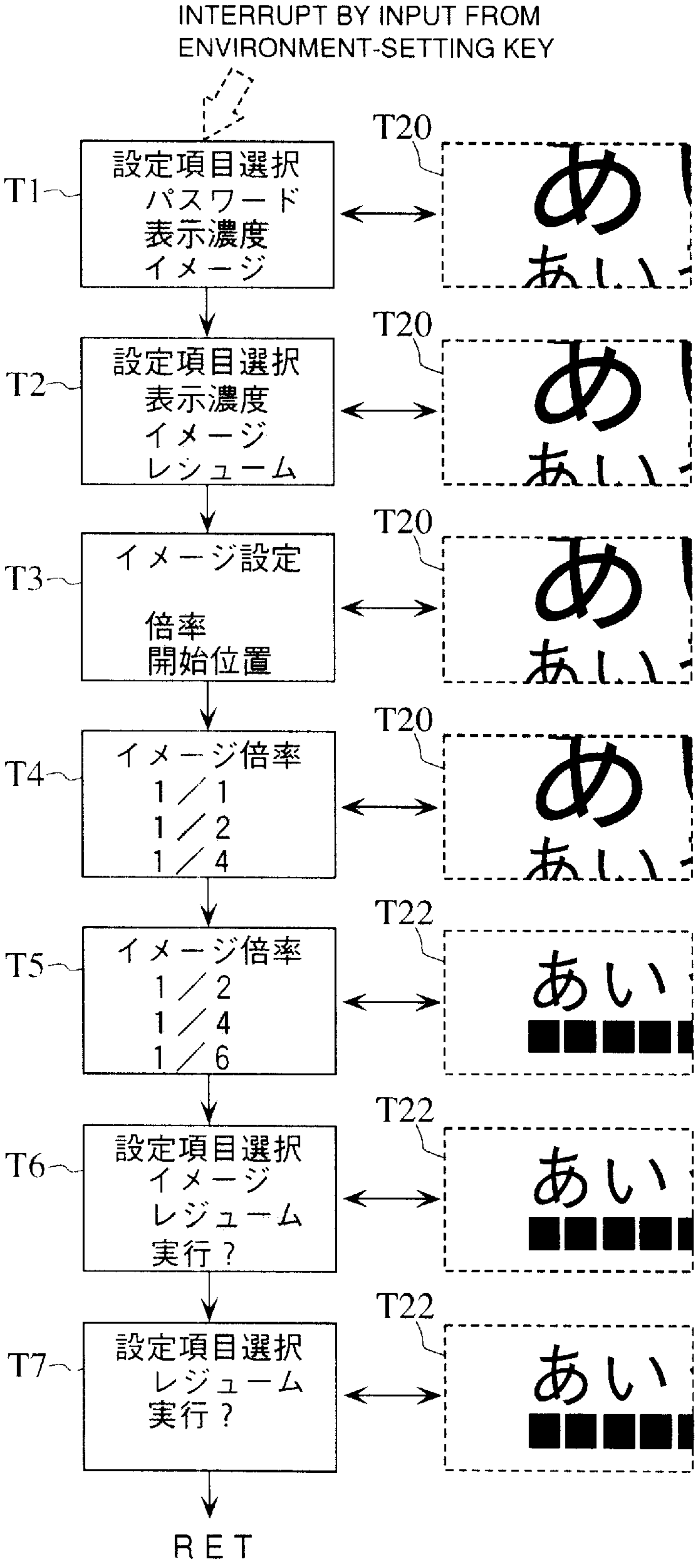
FIG. 9 is a diagram which is useful in explaining a method of changing a proportion of the size of display image data to the size of print image data via an environment-setting screen.

First, when the environment-setting key 113 is depressed in the key entry wait state (No to S3) of FIG. 6, an interrupt handling for the environment-setting process responsive to an interrupt input by the environment-setting key 113 is started, as shown in FIG. 9, whereby "設定項目選択" (Environment menu) screen (T1) is displayed.

In an initial state after starting the interrupt handling process, an item selected in the immediately preceding environment-setting process, e.g. an item of "表示濃度" (Density of display) is displayed in a selected state (actually, highlighted or in reverse video, but shown in a shaded manner in the figure) (T1).

In this state (T1), as the cursor "↓" key 110D or the cursor "↑" key 110U is operated, one of the items (options) available for selection, e.g. (1) "パスワード" (Password) (2) "表示濃度" (Density of display), (3) "イメージ" (Image), (4) "レジューム" (Resume), (5) "実行?" (Execution ?) and the like is displayed in a selected state (what are actually displayed on the display screen are Japanese-language options each in double quotation marks, as shown in FIG. 9. This will also apply to the other portions of the description referring to options displayed on the display screen.) After selecting the option (3) "イメージ" (Image) (T2), by depressing the selection key 107, a menu screen immediately under the option (3) "イメージ" (Image), that is, "イメージ設定" (Image setting) screen (T3) is displayed.

On the image setting screen (T3), there are displayed options (1) "倍率" (Size ratio), (2) "開始位置" (Starting position), (3) "終了位置" (Ending position), etc., so that when the image size ratio is desired to be set, after selecting the option (1) "倍率" (Size ratio) (T3), by depressing the selection key 107, a menu screen under the option (1) "倍率" (Size ratio), that is, "イメージ倍率" (Image size ratio) screen is displayed (T4).

In this sate (T4), a display resolution of the print image data GD having a source resolution of 24 to 1024 dots in the direction of the width thereof is selected. In other words, if the print image data GD is to be reduced in size for display, for instance, a degree to which the dots should be thinned is selected. In the embodiment, there are provided the following options: (1) 2/1 (two-hold), (2) 1/1, (3) 1/2, (4) 1/4, (5) 1/6, (6) 1/8, (7) 1/12, (8) 1/16, and so forth, and for instance when print image data GD having a source resolution of 256 dots in the direction of the width thereof (see FIG. 12A) is to be displayed along the whole width thereof within the display screen 18 of 64 dots (see T22 shown in FIG. 12D), the option (4) 1/4 is selected.

After selecting the option (4) 1/4 (T5), the selection key 107 is depressed to thereby finish setting the image size ratio, and the program returns to the environment menu screen, where the option of (4) "レジューム" (Resume) following the option (3) "イメージ" (Image) is displayed in its selected state (T6). Next, when the option (5) "実行?" (Execution ?) is selected (T7), and the selection key 107 is depressed, the environment-setting process is terminated to return to the display screen displayed before the interrupt was generated, e.g. to the text entry screen, and as to the state of processing, to the key entry wait state (No to S3) in FIG. 6.

FIG. 12A shows an example of the print image data GD having a resolution of 256 dots in the direction of the width thereof. When part of this print image data GD in a display range is displayed as an image on the display screen 18 of 64×96 dots shown in FIG. 12B and the display range in the data GD is automatically scrolled rightward, the relationship between the display range and the entire range of the print image data GD varies with the image size ratio set in the above image size ratio-setting process, as shown in FIGS. 12C to 12E.

Figure 12C:
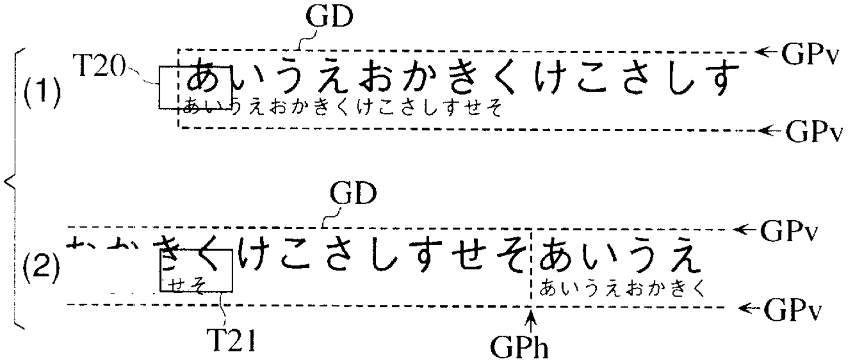
Figure 12D:
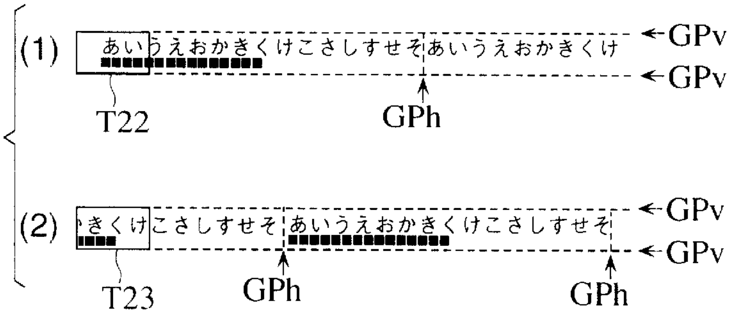
Figure 12E:
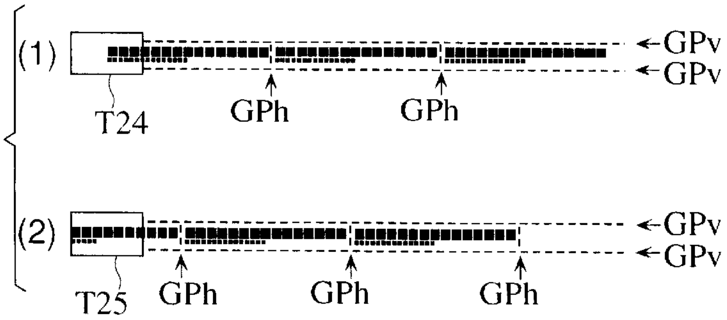

Hereafter, in figures similar to FIG. 12C and the like (FIGS. 18A to 18D and the like), portions of the print image data GD enclosed by broken lines show ranges being confirmed (viewed) or to be confirmed (viewed), while portions having been confirmed (viewed) are shown in a deleted or blank state. For instance, FIG. 12C (1) shows a displayed portion (T20) immediately after a rightward automatic scroll process at the image size ratio ½ is started from the starting position SP of "左中央" (Left end center), referred to hereinafter, and FIG. 12C (2) a displayed portion (T21) at an intermediate time point in the course of this scroll process. Similarly, FIG. 12D (1) shows a displayed portion (T22) immediately after the start of the same process at the image size ratio ¼ and FIG. 12D (2) a displayed portion (T23) at an intermediate time point in the course of this process. FIG. 12E (1) shows a displayed portion (T24) immediately after the start of the same process at the image size ratio ⅙ and FIG. 12E (2) a displayed portion (T25) at an intermediate time point in the course of this process.

In the ink jet printer 1, it is possible to change the text entry screen or the menu screen described above with reference to FIG. 9 to the image screen and vice versa by depressing the image key 114. For instance, if the image screen displayed before changing its image size ratio was the screen T20 (corresponding to the image size ratio ½) in FIG. 12C, in a state in which the screen T4 or an earlier one in FIG. 9 is displayed, by depressing the image key 114, the image screen (T20) can be displayed, as shown by the corresponding one of screens, enclosed by broken lines, on the right-hand side of FIG. 9. When the image key 114 is depressed again, the screen displayed before the preceding depression of the image key 114 can be displayed again.

Further, after the image size ratio is changed to e.g. ¼ (T5), by depressing the image key 114, an image screen (T22) at the image size ratio ¼ is displayed. When one of these image screens (T20 or T22) is displayed, operations can be normally carried out on the image screens e.g. by operating the cursor keys 110U, 110D, 110L and 110R. That is, the user can set or change image size ratios, while confirming (viewing) an image screen at a selected image 227 size ratio. However, when the option "実行?" (Execution ?) is in a selected state or displayed in reverse video on the screen T7 in FIG. 9, if instead of depressing the selection key 107, the escape key 111 is operated to return to a state before the interrupt handling process responsive to the operation of the environment-setting key has started, the present process does not take effect, so that the image screen returns to the screen T20.

Figure 10:
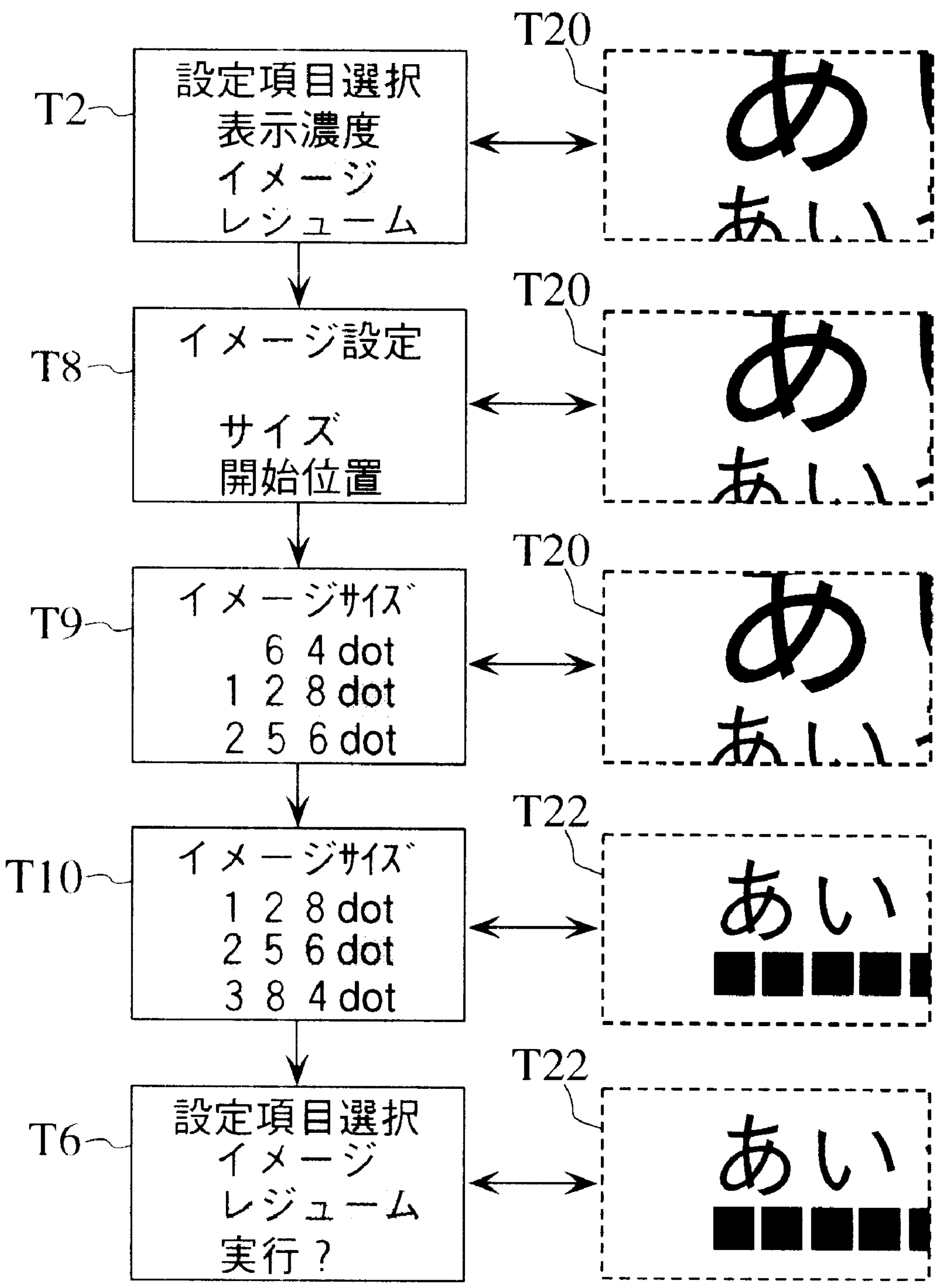
FIG. 10 is a diagram similar to FIG. 9, which is useful in explaining another method of changing the proportion.

It should be noted that as the method of setting or changing the image size ratio from the environment-setting screen, another method can be adopted. As shown in FIG. 10, for instance, in place of the options of image size ratio on the FIG. 9 Image setting screen T3, sizes of images to be displayed on the display screen 18 are displayed as options enabling the user to directly select one of the sizes. The options are (1) "サイズ" (Size), (2) "開始位置" (Starting position), (3) "終了位置" (Ending position), etc., so that after selecting the option (1) "サイズ" (Size) (T8), if the selection key 107 is depressed, a menu screen immediately under the option (1) "サイズ" (Size), that is, "イメージサイズ" (Image size) screen is displayed (T9).

In this state (T9), there are provided the following options of the display resolution of the print image data GD having a source resolution of 24 to 1024 dots in the direction of the width thereof: (1) 32 dot (32 dots: equivalent to 2/1 (two-hold) described above with reference to FIG. 9), (2) 64 dot (64 dots: equivalent to 1/1), (3) 128 dot (128 dots: equivalent to 1/2), (4) 256 dot (256 dots: equivalent to 1/4), (5) 348 dot (384 dots: equivalent to 1/6), (6) 512 dot (512 dots: 1/8), (7) 768 dot (768 dots: 1/12), (8) 1024 dot (1024 dots: 1/16), and so forth.

If one of the sizes is directly designated, for instance, if the option (4) 256 dot (256 dots: equivalent to 1/4) is selected (T10) for the print image data GD having a source resolution of 256 dots in the direction of the width thereof, or alternatively, the option (2) 64 dot (64 dots: equivalent to 1/1) is selected for the print image data GD having a source resolution of 64 dots in the direction of the width thereof, it is possible to display each print image data item in a manner exploiting the whole width (64 dots) of the display screen 18.

Further, an option of "テープ幅" (Tape width) may be provided in the menu of "イメージサイズ" (Image size) in FIG. 10 in order to enable an user who has little knowledge about the dot number of the image data described above to make use of the whole width of the display screen 18. In this case, e.g. as shown in FIG. 11, after selecting "テープ幅" (Tape width) (T11), i.e. displaying the same in reverse video, by depressing the selection key 107, the menu screen immediately under the option of "イメージサイズ" (Image size), that is, the screen of "テープ幅" (Image width) is displayed to display options corresponding to tape widths (T12).

Figure 11:
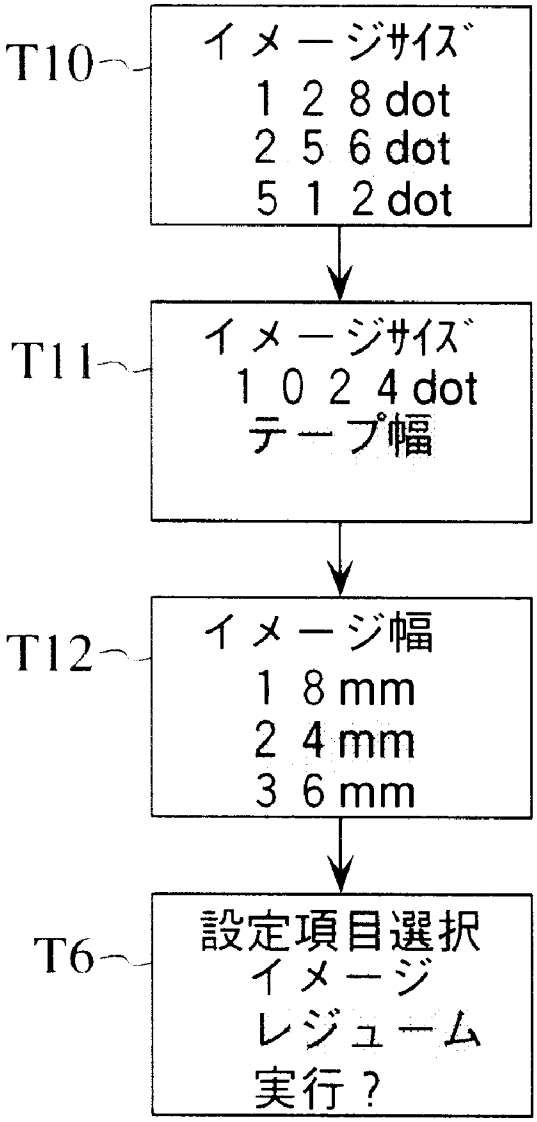
FIG. 11 is a diagram similar to FIG. 9, which is useful in explaining still another method of changing the proportion.

In the case of FIG. 11, the options are e.g. (1) 6 mm, (2) 9 mm, (3) 12 mm, (4) 18 mm, (5) 24 mm, (6) 36 mm, (7) 48 mm, (8) 64 mm, (9) 72 mm, (10) 96 mm, and so forth. For instance, when the option (1) 6 mm is selected, the image size ratio is set to 1/1 to thereby enable the whole width of print image data CD of 64 dots to be displayed, while when the option (5) 24 mm is selected (T12), the image size ratio is set to 1/4 to thereby enable the whole width of print image data CD of 256 dots to be displayed, and similarly, when the option (10) 96 mm is selected, the image size ratio is set to 1/16 to thereby enable the whole width of print image data CD of 1024 dots to be displayed.

Next, the process for setting/changing the image size ratio at the start of the automatic scroll executed at the step (S122) in FIG. 8 will be described with reference to FIGS. 13A and 13B. If the answer to the question (Change in settings ?) of the step (S121) in FIG. 8 is affirmative (YES to S121), it is confirmed that the settings are to be changed and the present process is started. As shown in FIG. 13A, a message screen "倍率変更有?" (Change in image size ratio ?)" is first displayed on the display screen 18 to prompt the user to effect a key entry answering the question of whether or not the image size ratio is to be changed (T13).

When the key entry answering the question "倍率変更有?" (Change in image size ratio ?) (T13) is completed, then, it is determined at a step S1221 whether or not the image size ratio is to be changed. If the image size ratio is not tobe changed (No to S1221), the process is terminated (S1223), followed by the program proceeding to the next step in FIG. 8, that is, the process for changing the automatic scroll starting/ending positions (S123).

On the other hand, if the image size ratio is to be changed (Yes to S1221), a screen (T14) identical to the image size ratio screen T4 in FIG. 9 is displayed and hence, similarly to the procedure described with reference to FIG. 9, after selecting the image size ratio (T15 identical to T5), by depressing the selection key 107, the image size ratio of the image screen is changed at the step S1222, followed by terminating the program at a step S1223.

It should be noted that, as shown in FIG. 13B, display sizes may be directly selected in the above process (S122) in FIG. 8 for setting/changing the image size ratio at the start of the automatic scroll process. That is, for instance, in place of the screens T14 and T15 in FIG. 13A for selecting the image size ratio, screen T16 and T17 for selecting image sizes (identical to T9 and T10 in FIG. 10) can be displayed. When the method described hereinabove with reference to FIG. 10, for instance, is adopted for selection of the image size ratio from the environment-setting screen, the same screen as T9 and T10 can be employed. This is preferred in enhancing the consistency of operation of the device.

In the ink jet printer 1, manners of setting/changing the starting position SP of the automatic scroll and the ending position EP of the same on the print image data GD can be largely classified into two methods. Now first, a manner of setting/changing the starting position SP of the automatic scroll and the ending position EP of the same from the environment-setting screen will be described hereafter with reference to FIGS. 14 to 18D, and then, a manner of setting/changing the same at the start of the automatic scroll, that is, the process for changing the automatic scroll starting/ending positions (S123) will be described with reference to FIG. 19.

First, in the key entry wait state (No to S3) in FIG. 6, when the environment-setting key 113 is depressed, similarly to the case of the image size ratio-changing process, an environment-setting keyboard interrupt is generated to display the "設定項目選択" (Environment menu) screen. After selecting the option (3) "イメージ" (Image) (T1 to T2 in FIG. 9), by depressing the selection key 107, the menu screen immediately under the option (3) "イメージ" (Image), that is, the "イメージ設定" (Image setting) screen is displayed (T3 in FIG. 14: identical to that appearing in FIG. 9).

Figure 14:
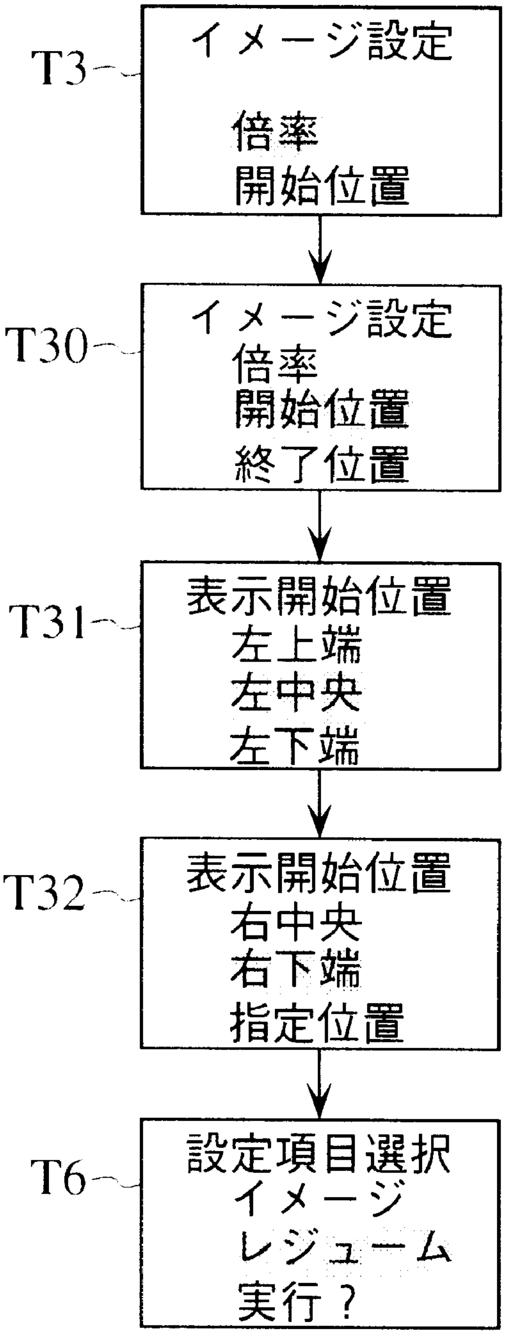
FIG. 14 is a diagram which is useful in explaining a method of changing a starting position of an automatic scroll via the environment-setting screen.

As shown in FIG. 14, on the image setting screen (T3) the following options are displayed: (1) "倍率" (Size ratio), (2) "開始位置" (Starting position), (3) "終了位置" (Ending position), etc., and hence, when the starting position of the automatic scroll is to be set, the option (2) "開始位置" (Starting position) is selected or displayed in reverse video (T30), and then the selection key 107 is depressed to thereby display a menu screen at the level immediately under the option (2) "開始位置" (Starting position), that is, "表示開始位置" (Display starting position) screen (T31) for selecting one from options of the starting position.

In this state (T31), a reference point for setting the starting position SP on the print image data GD from which the display image data GD starts to be displayed is selected. As one type of options in which a left end of the print image data GD is aligned to the vertical center line of the display screen 18 and the reference point is selected from predetermined points on the left end of the print image data GD, there are provided the following options: (1) "左上端" (Upper left corner), (2) "左中央" (Left end center), and (3) "左下端" (Lower left corner).

Figure 18A:
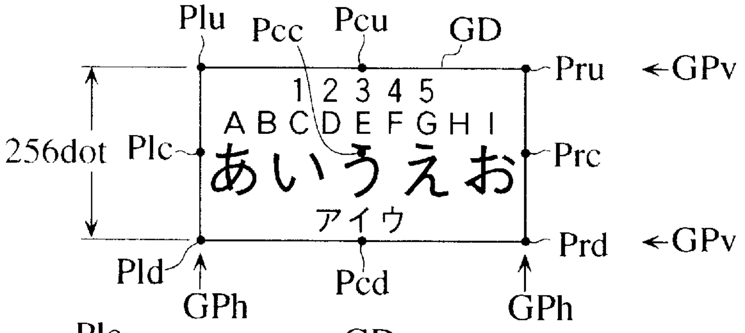
FIGS. 18A to 18D are diagrams showing examples of the rightward automatic scroll process carried out on a print image data item by setting the starting position of the automatic scroll to different positions.
Figure 18B:
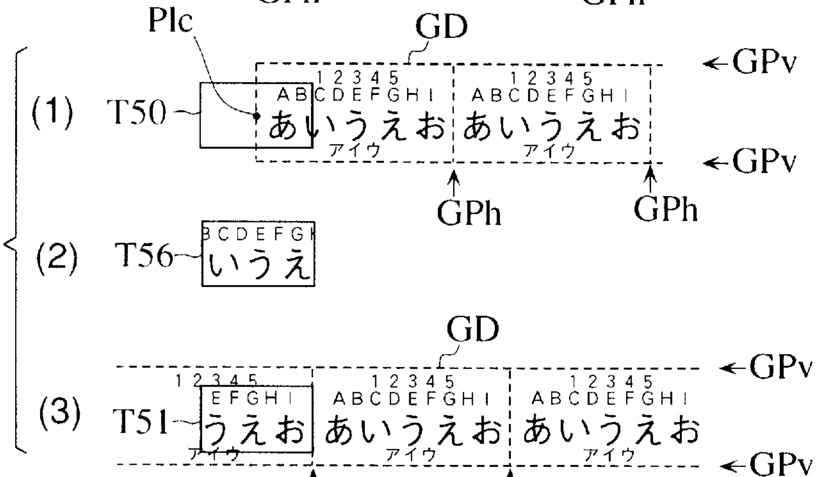
Figure 18C:
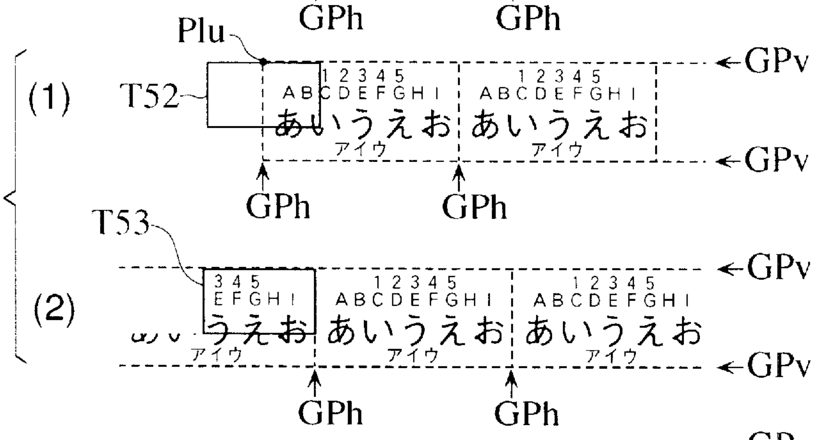
Figure 18D:
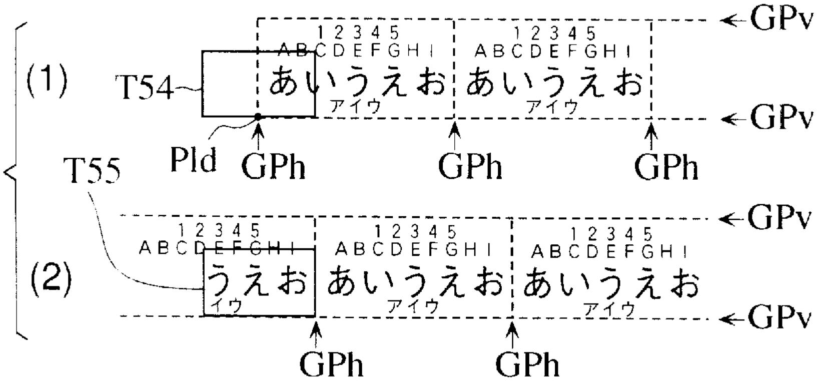

Now, when the option (1) "左上端" (Upper left corner) is selected, an upper left corner point Plu (see FIG. 18A) of the print image data GD is positioned to an upper end of the vertical center line of the display screen 18 to thereby set the upper left corner point Plu to the reference point to set the starting position SP (see T52 in FIG. 18C). When the option (2) "左中央" (Left end center) is selected (T31), a left end central point Plc of the print image data GD is positioned to the center of the whole display screen 18 to thereby set the left end central point Plc to the reference point to set the starting position SP (see T50 in FIG. 18B). When the option (3) "左下端" (Lower left corner) is selected, a lower left corner point Pld of the print image data GD is positioned to a lower end of the vertical center line of the display screen 18 to thereby set the lower left corner point Pld to the reference point to set the starting position SP (see T54 in FIG. 18D).

As another type of options in which the vertical center line of the print image data GD is aligned to the vertical center line of the display screen 18, and the reference point is selected from predetermined points on the center line of the print image data GD, there are provided the following options: (4) "中央上端" (Central upper end) for positioning an upper end Pcu of the vertical center line of the print image data GD to the upper end of the vertical center line of the display screen 18 to thereby set the upper end Pcu to the reference point to set the starting position SP, (5) "中心" (center) for positioning the center Pcc of the print image data GD to the center of the display screen 18 to set the center Pcc to the reference point to set the starting position SP, and (6) "中央下端" (Central lower end) for positioning a lower end Pcd of the center line of the print image data GD to the lower end of the vertical center line of the display screen 18 to set the lower end Pcd to the reference point to set the starting position SP (see FIG. 18A).

As a still another type of options, so as to set a point selected from predetermined points on the right end of the print image data GD to the reference point, there are provided the following options: (7) "右上端" (Upper right corner) for positioning an upper right corner point Pru of the print image data GD to the upper end of the vertical center line of the display screen 18 to thereby set the upper right corner point Pru to the reference point to set the starting position SP, (8) "右中央" (Right end center) for positioning a central point Prc of the right end of the print image data GD to the center of the whole display screen 18 to thereby set the central point Prc to the reference point to set the starting position SP, and (9) "右下端" (Lower right corner) for positioning a lower right corner point Prd of the print image data GD to the lower end of the vertical center line of the display screen 18 to thereby set the corner point Prd to the reference point to set the starting position SP (T32: see FIG. 18A). Further, (10) "指定位置" (Designated position), described hereinafter with reference to FIG. 15, is also included in the options.

Referring to FIG. 14, after selecting any of the above options, e.g. the option (9) "右下端" (Lower right corner) (T32), by depressing the selection key 107, a starting position designation flag SPF, referred to hereinafter, is turned on (SPF=1) and then the starting position SP is set, followed by returning to the environment menu screen (T6: the same as FIG. 9). Next, after selecting the option (5) "実行?" (Execution ?) (T7 in FIG. 9), by depressing the selection key 107, the environment-setting process is terminated, followed by returning to the display screen, e.g. the text entry screen, displayed before the generation of the interrupt, and as to the state of processing, to the key entry wait state (No to S3) in FIG. 6.

Figure 15A:
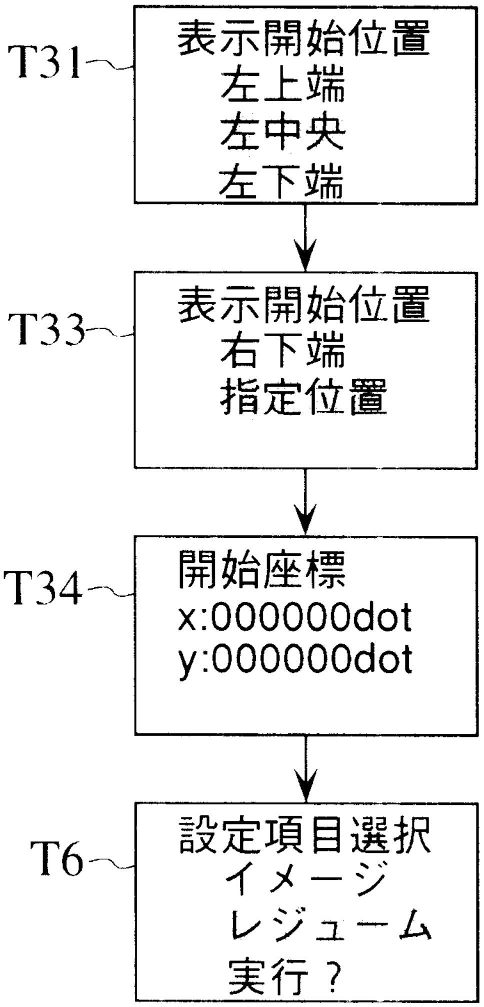
FIGS. 15A and 15B are diagrams similar to FIG. 14, which are useful in explaining other methods of changing the starting position.

In the above process, however, as shown in FIG. 15A, after selecting the option (10) "指定位置" (Designated position) (T33), by depressing the selection key 107, "開始座標" (Starting position coordinates) entry screen (T34) is displayed. In this state (T34), the starting position SP can be set by setting a predetermined point (e.g. the upper left corner point Plu of the print image data GD) to the origin of the coordinate system, which has coordinates (0, 0), and entering coordinates of a reference point with respect to the origin in dots.

Figure 15B:
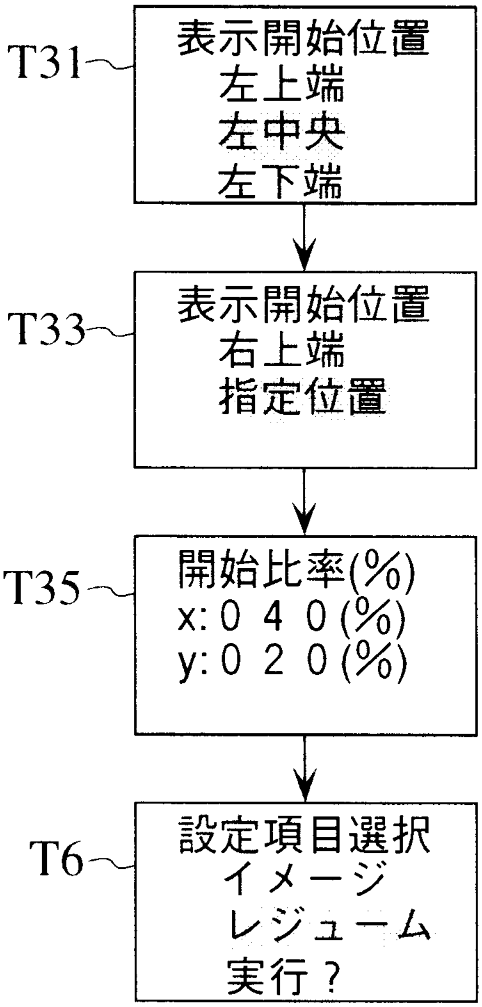

It should be noted that when the option (10) "指定位置" (Designated position) is selected from the screen T33 there may be displayed "開始比率(%)" (Starting position (%)) entry screen T35, as shown in FIG. 15B, which prompts the user to enter distances of the reference point for setting the starting position SP from the horizontal and vertical leading ends of the print image data GD in percentage in the total horizontal and vertical lengths of the same. For instance, if the upper left corner point Plu of the print image data GD is set to the predetermined point, it is possible to enter the distances over which the upper left corner point of the display image data GC is required to be moved from the predetermined point Plu in percentage in the whole horizontal and vertical lengths of the print image data GD to set the starting position SP. According to this method, even if the total dot numbers of the print image data GD are not known, by entering e.g. values of [x: 040 (%), y: 020 (%)] to set the starting position SP (T35), it is possible to designate a display range of the print image data GD in the starting position SP of the display image data GC in an approximated manner by the guesswork.

The following description is made, for purposes of ease of understanding, by mainly using the menu screens shown in FIG. 15B, in which the starting position SP can be easily intuitively grasped. If the above example of x and y being equal to 40% and 20% is applied to the print image data GD used in the cases shown FIGS. 18A to 18D, the starting position SP sets a display range at the start of the scroll as shown by a displayed portion or screen T51 in FIG. 18B (3).

Figure 16:
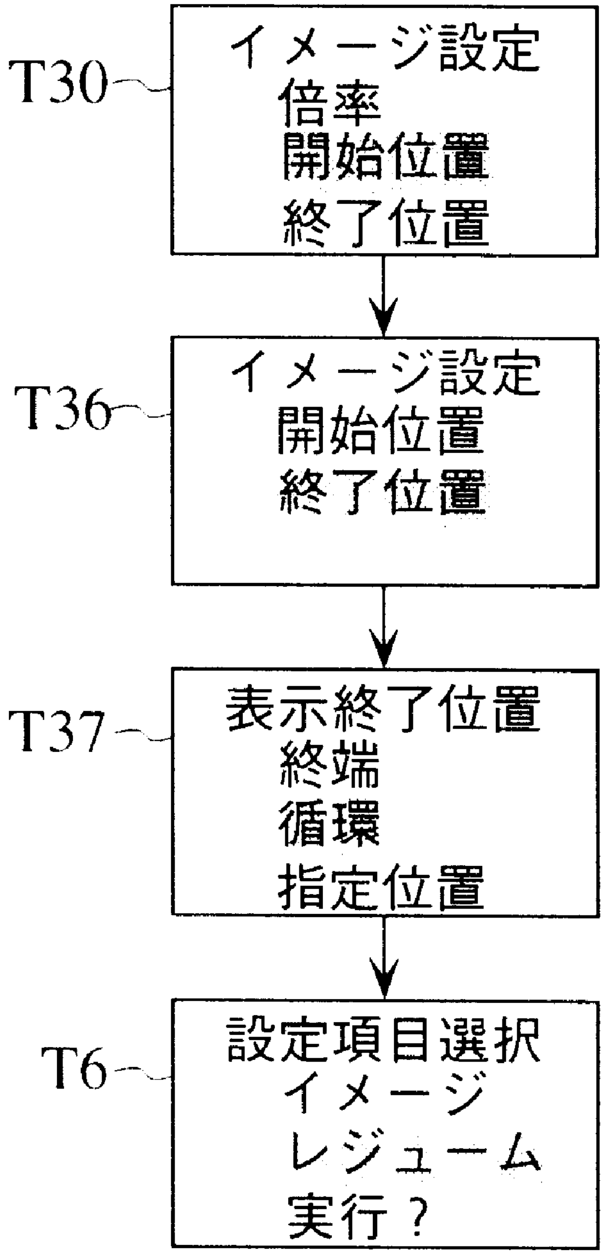
FIG. 16 is a diagram which is useful in explaining a method of changing an ending position of an automatic scroll via the environment-setting screen.

Next, as shown in FIG. 16, from the "イメージ設定" (Image setting) screen (T3 to T30 in FIG. 14), after selecting the option (3) "終了位置" (Ending position) (T36), by depressing the selection key 107, a menu screen at the level immediately under the option (3) "終了位置" (Ending position), that is, "表示終了位置" (Display ending position) screen (T37) appears.

In this state (T37), a point on the print image data GD where the automatic scroll is to be terminated can be selected, and there is first provided an option (1) "終端" (Trailing end) for setting the trailing end of the print image data GD to the reference point setting the ending position EP.

If the option (1) "終端" (Trailing end) is selected, as will be described hereinafter, in the case of an automatic scroll in a vertical direction, for instance, when a point or portion having the same y coordinate (coordinate along the vertical axis) as the vertical trailing (=leading) end GPv is displayed within the image screen (see FIG. 18), that is, when the display image data GC is changed such that it comes to include this point, the automatic scroll process is terminated. Further, in the case of an automatic scroll in a horizontal direction, when a point having the same x coordinate (coordinate along the horizontal axis) as the horizontal trailing (=leading) end GPh comes to be included in the display image data GC, the automatic scroll process is terminated.

According to the ink jet printer 1, by taking into account the internal processing of the print image data GD and the ease of viewing the same, the print image data GD is handled as circular image data having the leading and trailing ends thereof connected to each other (described hereinafter in detail with reference to FIGS. 30A to 31C), and accordingly, the vertical trailing end and the vertical leading end coincide in position with each other, i.e. these ends have the same coordinate y=GPv, while the horizontal trailing end and the horizontal leading end coincide in position with each other, i.e. these ends have the same coordinate x=GPh (see FIGS. 12A to 12E, 18A to 18D, 31A to 31C, etc.).

Therefore, when the starting position SP of the rightward automatic scroll is set to "左中央" (Left end center) (see T31. or the like in FIG. 14) and the ending position EP of the same to "終端" (Trailing end), for instance, the reference point setting the ending position EP of the rightward automatic scroll i.e. the horizontal trailing end (=horizontal leading end) is included in the displayed range or the display image data GC from the beginning, and hence in the case of such a designation being effected, when the reference point setting the ending position EP comes into view again on the image screen, that is, when the display image data GC is "changed" such that it comes to include the reference point setting the ending position EP the next time, the rightward automatic scroll is terminated.

Further, as shown in FIG. 16, from the "表示終了位置" (Display ending position) menu screen T37, an option (2) "循環" (Circulation) for automatically scrolling the print image data GD in a circular manner can be selected as the option of the ending position EP. When the option (2) "循環" (Circulation) is selected, the circular process flag RTF described above with reference to FIG. 7 is turned on and hence the FIG. 7 automatic scroll process (S10) is continued until any terminating event occurs (key entry via the stop key 112 or the like).

From the above-mentioned screen "表示終了位置" (Display ending position) menu screen T37, after selecting the option (1) "終端" (Trailing end) or (2) "循環" (Circulation), by depressing the selection key 107, an ending position designation flag EPF, described hereinafter, is turned on (EPF=1) and thereafter the ending position EP is set, followed by returning to the environment item-setting screen (T6). Then, when the option (5) "実行?" (Execution ?) is selected (T7 shown in FIG. 9), and the selection key 107 is depressed, the environment-setting process is terminated to return to the display screen displayed before the interrupt is generated, and as to the state of processing, to the key entry wait state (No to S3) in FIG. 6.

Figure 17A:
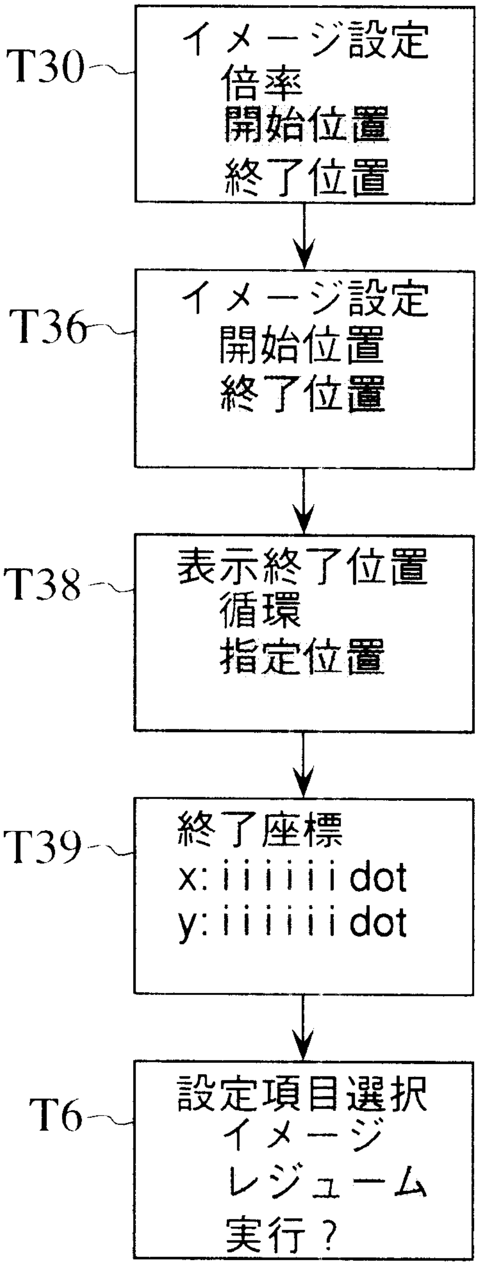
FIGS. 17A and 17B are diagrams similar to FIG. 16, which are useful in explaining other methods of changing the ending position.

In the above routine, however, as shown in FIG. 17A, when the option (10) "指定位置" (Designated position) (T38) is selected to thereby display "終了座標" (Ending position coordinates) entry screen, it is possible to set a predetermined point (e.g. the upper left corner point Plu of the print image data GD) to the origin which has the coordinates (0, 0) and enter the coordinates of the reference point setting the ending position EP with respect to the predetermined point or the origin of the coordinate system in dots to set the ending position EP.

Figure 17B:
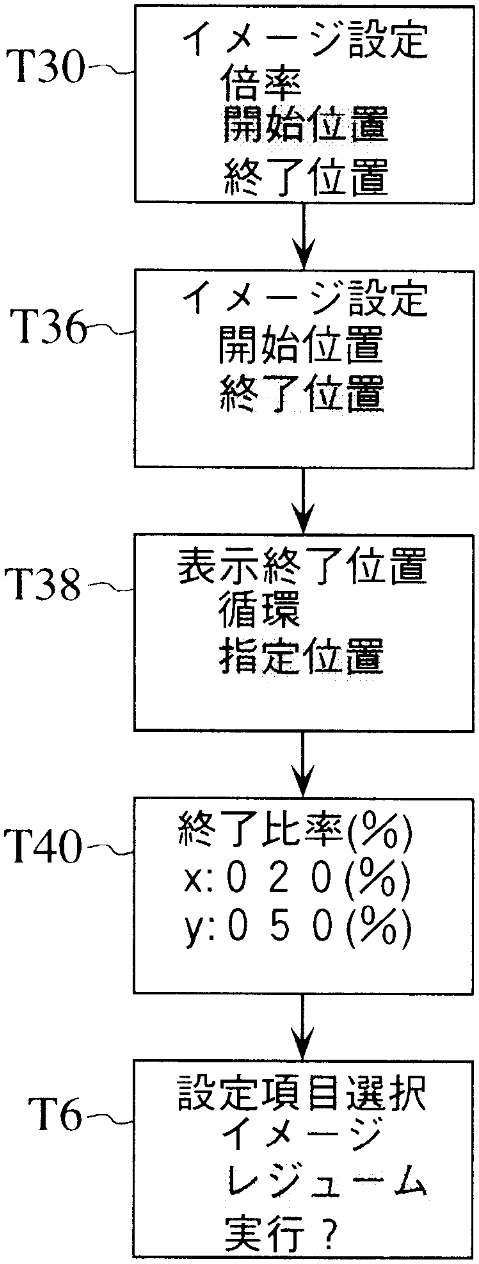

Further, as shown in FIG. 17B, similarly to FIG. 15B, when the option (10) "指定位置" (Designated position) is selected and the selection key 107 is depressed, there can be displayed "開始比率(%)" (Ending position(%))" entry screen T40 for entering distances of the reference point setting the ending position EP from the horizontal and vertical trailing ends in percentage in the whole horizontal and vertical lengths of the print image data GD, respectively. For instance, similarly to the case of the starting position SP, values of [x: 020(%), y: 050 (%)] can be entered as values representative of the x and y coordinates of the reference point setting the ending position EP (T40), which makes it possible to intuitively designate the ending position EP in an approximated manner by the guesswork, even if the total dot numbers of the print image data GD are not known or unavailable.

Now for purposes of ease of understanding, most part of the following description will be made assuming that the menu screens as shown in FIG. 17B are used in which the ending position EP can be easily intuitively grasped. For instance, if the above example of x being equal to 20% is applied to the print image data GD in FIGS. 18A to 18D, the ending position EP is set, as shown by T56 in FIG. 18B (2), to such a display position that the reference point which is distant from the horizontal trailing end of the print image data GD by x=20%, i.e. 20% of the whole horizontal length of the same comes to be included in the display range or the display image data GC.

In the present embodiment, if the starting position SP is set to the display position shown in the screen T51 in FIG. 18B (3) (the case of T35 in FIG. 15B: x=40%), and the ending position EP is set as described above (in which the reference point distant from the horizontal trailing end by 20% of the whole horizontal length, i.e. in the illustrated example, approximately corresponding to a trailing end position of a large character is displayed), to thereby start the rightward automatic scroll, the reference point setting the ending position EP is displayed or contained in the display image data GC from the beginning (T51) and hence, as described above, the rightward automatic scroll is terminated in a state of the screen T56 in which the print image data GD is scrolled round to display the reference point setting the ending position EP again, i.e. the display range is changed such the reference point comes into view again.

The routine to be executed when the reference point of the ending position EP is displayed from the beginning as described above can be varied as required so long as the same does not depart from the scope of the invention.

Further, in the above example, it is assumed that the rightward automatic scroll shown in FIGS. 18A to 18D is carried out and hence description is made of a case in which the starting position SP is set by selecting the option "指定位置" (Designated position) (the case of FIGS. 15A or 15B) such that the upper left corner point Plu of the print image data GD is set to the predetermined point and the reference point setting the ending position is caused to correspond to the upper left corner of the display image data GC, but the predetermined point and a point of the display screen which is made correspondent to the reference point may be changed according to the direction of scroll. For instance, when carrying out the automatic scroll in the rightward and upward directions, the upper left corner point Plu of the print image data GD may be set to the predetermined point from which the distances of the reference point corresponding to the upper left corner of the display image data GC should be calculated, while, when carrying out the automatic scroll process in the leftward and downward directions, the lower right corner point Prd of the same may be set to the predetermined point from which the distances of the reference point corresponding to the lower right corner of the display image data GC should be calculated.

It goes without saying that the predetermined point can be changed still further as required. For instance, it is possible to employ the upper left corner point Plu of the print image data GD as the predetermined point for the rightward automatic scroll, the upper right corner point Pru of the same as one for the upward scroll, the lower right corner point Prd as one for a leftward scroll, and the lower left corner point Pld as one for a downward scroll, and causes the reference point set with respect to the predetermined point to correspond to respective predetermined points of the display image data GC.

Figure 19:
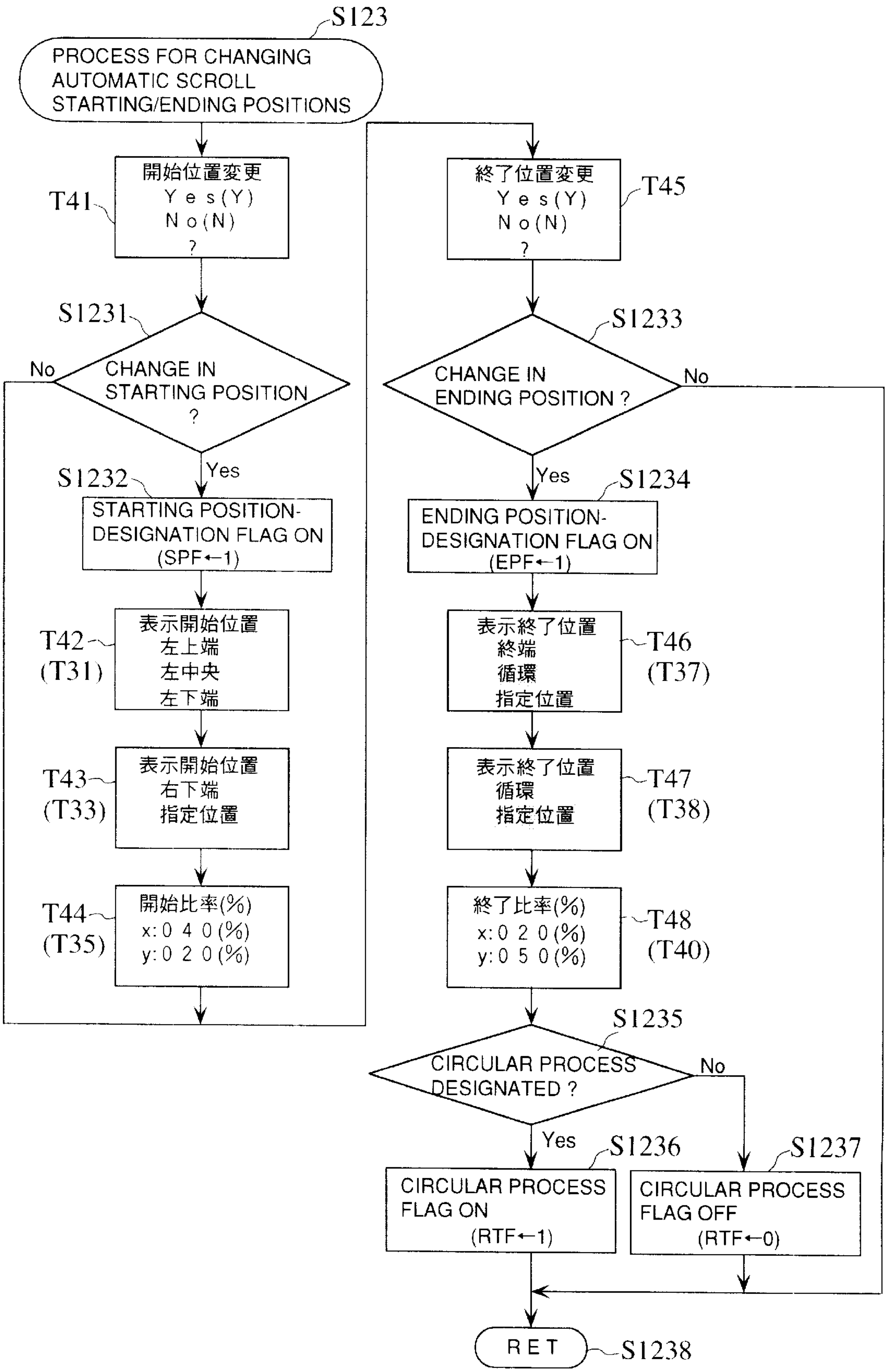
FIG. 19 is a flowchart showing a subroutine for carrying out a process for changing the automatic scroll-starting/ending positions, which is executed in the FIG. 8 automatic scroll start preparation process.

Next, a subroutine for carrying out the process for changing the automatic scroll starting/ending positions in FIG. 8 (S123) will be described in detail with reference to FIG. 19. After terminating the process for setting/changing the image size ratio at the start of the automatic scroll at the step S122 in FIG. 8, the present process is started at the step S123. As shown in FIG. 19, a message screen "開始位置変更?" (Change in starting position ?)" first appears which prompts the user to effect a key entry answering the question as to whether or not the starting position SP is to be changed (T41). After the key entry is made to answer this question, it is determined at a step S1231 whether or not the starting position SP is to be changed. If the starting position SP is not to be changed (No to S1231), a message "終了位置変更?" (Change in ending position?) is displayed as a first step for changing the ending position (T45).

On the other hand, when the starting position SP is to be changed (Yes to S1231), then the starting position designation flag SPF is turned on at a step S1232, thereafter displaying a menu screen (T42) for selecting the display starting position which is identical to the above-mentioned screen T31 in FIGS. 14, 15A or 15B. Now, description is made hereinafter assuming that the option "指定位置" (Designated position)" is selected, similarly to the case of FIG. 15B.

After selecting the option "指定位置" (Designated position) for the display starting position menu screen (T43 identical to T33 in FIG. 15B), by depressing the selection key 107, the "開始比率(%)" (Staring position (%)) entry screen (T44 identical to T35 in FIG. 15B) is displayed, and hence similarly to the case of FIG. 15B, values e.g. of [x: 040 (%), y: 020 (%)] are input to set the starting position SP. Then, the program proceeds to the first step for changing the ending position (T45).

In the ending position-changing process, the message screen "終了位置変更?" (Change in ending position ?)" is first displayed to prompt the user to effect a key entry answering the question as to whether or not the ending position is to be changed (T45). After the key entry is made, it is determined at a step S1233 whether or not the ending position is to be changed. If the ending position is not to be changed (No to S1233), the process (S123) is terminated at a step S1238, followed by the program proceeding to the next step S124 in FIG. 8, that is, the process for setting the automatic scroll starting/ending positions.

On the other hand, if the ending position is to be changed (Yes to S1233), as shown in FIG. 19, then, the ending position designation flag EPF is turned on (EPF=1) at a step S1234 and then "表示終了位置" (Display ending position) menu screen (T46 identical to T37 in FIG. 16) is displayed. Now, description is made hereafter assuming that the option "指定位置" (Designated position)" is selected, similarly to the case of FIG. 17B.

After selecting the option "指定位置" (Designated position) from the menu screen (T47 identical to T38 in FIG. 17B), by depressing the selection key 107, "終了比率(%)" (Ending position percentage (%)) entry screen (T48 identical to T35 in FIG. 15B) is displayed, and hence similarly to the case of FIG. 17B, values e.g. of [x: 020 (%), y: 050 (%)] are input to set the ending position EP. Then, it is determined at a step S1235 whether or not the option "循環" (Circulation) is designated.

If the circulation is designated (Yes to S1235), the circular process flag is turned on (RTF=1) at a step S1236. However, it is assumed here that the option "指定位置" (Designated position)" is selected, and accordingly the option "循環" (Circulation) is not designated (No to S1235), so that after turning off the circular process flag RTF (RTF=0) at a step S1237, the process (S123) for changing the automatic scroll starting/ending positions is terminated at a step S1238 and then the program proceeds to the next step S124 in FIG. 8.

Now, the process executed at the step S124 in FIG. 8 for setting the automatic scroll starting/ending positions will be described with reference to FIG. 20. After carrying out the subroutine for changing the automatic scroll starting/ending positions at the step S123 in FIG. 8, or when it is determined at the step S124 that the settings are not to be changed (No to S121) in the same figure, the subroutine for carrying out the process for setting the automatic scroll starting/ending positions is started. First, it is determined at a step S1241 in FIG. 20 whether or not the starting position is designated (i.e. whether or not the starting position designation flag SPF is equal to 1).

The starting position designation flag SPF becomes equal to 1 not only when the starting position SP is designated in the above subroutine (S123) for carrying out the process for changing the automatic scroll starting/ending positions, but also when it is designated from the environment-setting screen displayed in response to the operation of the environment-setting key 113, as described hereinabove with reference to FIGS. 14, 15A and 15B, that is, when it is designated before starting the automatic scroll process at the step S10 in FIG. 7.

When the starting position SP is not designated (No to S1241), the display image data GC stored at this time point, that is, the display image data GC which should have been displayed if the image key had been depressed before the start of the automatic scroll process at the step S10 in FIG. 7 is set at a step S1242 to a portion of the print image data GD in the display range at the starting position SP, and displayed on the display screen 18 at a step S1244.

On the other hand, when the starting position SP is designated (Yes to S1241), the display image data GC at the starting position SP is set according to the above-described manner of setting the starting position SP at a step S1243, and displayed on the display screen 18 at the step S1244.

Figure 20:
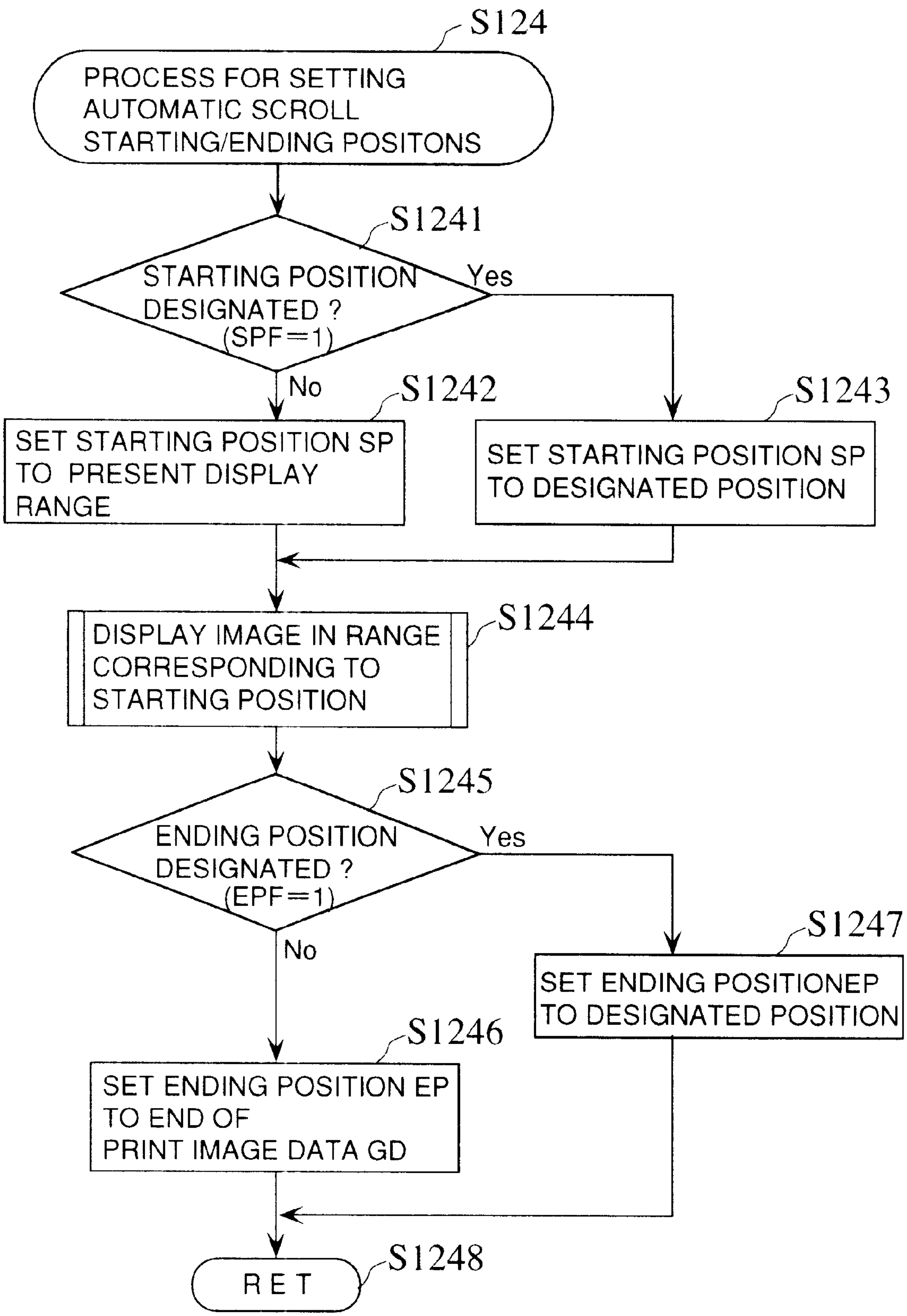
FIG. 20 is a flowchart showing a subroutine for carrying out a process for setting the automatic scroll-starting/ending positions, which is executed in the FIG. 8 automatic scroll start preparation process.

After the image at the starting position SP is displayed at the step S1244, as shown in FIG. 20, it is determined at a step S1245 whether or not the ending position is designated (i.e. whether or not the ending position designation flag EPF is equal to 1).

The ending position designation flag EPF becomes equal to 1 not only when the ending position EP is designated in the subroutine (S123) for changing the automatic scroll starting/ending positions but also when it is designated before starting the automatic scroll process at the step S10 in FIG. 7 from the environment-setting screen as described hereinabove with reference to FIGS. 16 to 17B. Further, when the circular process flag RTF is on (RTF=1), the priority is given to the circular process flag RTF=1 even if the ending position EP is designated, as described above at the step S24 in FIG. 7.

Referring to FIG. 20, when the ending position EP is not designated (No to S1245), the ending position EP is set at a step S1246 to the default position assuming that the "終端" (Trailing end) is selected from the menu screen T37 in FIG. 16 or the menu screen T46 in FIG. 19 described hereinbefore, whereas when the ending position EP is designated (Yes to S1245), the ending position EP is set to the position designated as described above, at a step S1247, followed by terminating the program (S124) at a step S1248.

After terminating the FIG. 20 routine for setting the automatic scroll starting/ending positions (S124), the program returns to the FIG. 8 process to terminate the routine (S12) for the automatic scroll start preparation process at the step S125. Then, the program proceeds to the step S13 in FIG. 7, wherein it is determined whether or not the above pause flag PF is equal to 1.

Then, as described hereinabove with reference to FIG. 7, if the circular process flag is equal to 1 (Yes to S24), so long as no terminating event occurs, the step S13 for determining whether or not the pause flag PF is equal to 1 to the step S24 for determining whether the circular process flag RTF is equal to 1 are carried out in the loop. If the circular process flag is equal to 0 (No to S24), the step S13 for determining whether or not the pause flag PF is equal to 1 to the step S25 for determining whether or not the ending position EP is reached by the scroll are carried out in the loop until the ending position EP is reached (i.e. until the answer to the question of the step S25 becomes affirmative (YES)).

As described above, according to the ink jet printer 1, it is possible to set the starting and ending positions SP and EP, at which the display range or the display image data GC starts and ends on the print image data (basic image data) GD by the automatic scroll, freely or as desired. Further, if the starting position SP and ending position EP are not designated, the starting position SP is set to the present range of the print image data GD displayed as the display image data GC on the image screen, while the ending position EP is set to a range of the print image data GD in which a trailing end thereof is included for being displayed.

That is, if the starting position SP is not designated (SPF=0), when any of the four cursor keys 110 is depressed with the automatic scroll key 115 being simultaneously depressed, the automatic scroll is started from a range of the print image data GD being displayed when the key entries are made (when the interrupt is generated, i.e. when the command to start the automatic scroll is entered).

Therefore, e.g. if the print image data GD is scrolled to a desired starting position SP by using a cursor key 110 and then the key entries for instructing the start of the automatic scroll process are made, it is possible to start the automatic scroll process from the desired display range to thereby cause the print image data GD to come into view starting with the desired portion thereof with ease. This makes it possible to enhance the display capability for confirming (viewing) the print image data GD, that is, the operability of the ink jet printer as the image display device.

On the other hand, it is possible to designate the starting position SP and hence if the automatic scroll process is started by the automatic scroll key entry after designation or setting of the starting position SP (SPF=1), it is possible to execute the automatic scroll process from a desired display range to thereby cause the print image data GD to come into view from a desired portion thereof with ease, which makes it possible to further increase the operability of the ink jet printer 1 as the image display device.

Further, if the ending position EP is not designated or set (EPF=0), the ending position EP is set to a display range at which the trailing end of the print image data GD comes into view. That is, when the trailing end (y=GPv in the case of the vertical automatic scroll process, x=GPh in the horizontal automatic scroll process: see FIGS. 12A to 12E, 18A to 18D, 31A to 31C and the like) of the print image data (basic image data) GD is reached, the automatic scroll process is terminated, so that the automatic scroll process can be started (the command for starting the same can be entered) without specifically designating the ending position EP. Further, since the automatic scroll process is automatically terminated, it is possible to save the trouble of operating the device, which enables the ink jet printer 1 to be very easily operated as the image display device.

On the other hand, since the ending position EP can be designated, if the same is first designated (EPF=1) and then the automatic scroll process is started (the command for starting the same is entered), the scroll can be terminated at the designated ending position EP, which makes it possible to cause only a required display range to come into view without difficulty. For instance, if the values appearing on the screens T44 and T48 in FIG. 19 are applied to the print image data GD shown in FIG. 12A, it is possible to view an area enclosed by a phantom line in the figure. As a result, processing time can be shortened, and since the automatic scroll process is automatically terminated, the trouble of operating the device can be saved, which enables the ink jet printer 1 to be very easily operated as the image display device.

Further, not only the ending position EP but also the circulation can be designated. If the circulation is designated (RTF=1) and then the automatic scroll process is started, the automatic scroll process is circularly carried out by connecting a trailing end of the print image data (basic image data) GD and a leading end of the same to each other, so that, from whatever portion of the print image data GD the automatic scroll process may be started, the entire range of the print image data GD in the direction of the scroll can be caused to come into view as the scroll is carried out, and even a portion which was overlooked or could not be viewed on the immediately preceding occasion can be reviewed with ease without any other particular operations, which enables the ink jet printer 1 to be operated very easily as the image display device. Alternatively, e.g. when the ink jet printer 1 is exhibited for sale in a store, the circular scroll of print image data GD for demonstration provides an advantageous effect of causing the ink jet printer 1 to continue presenting itself to customers.

Figure 21:
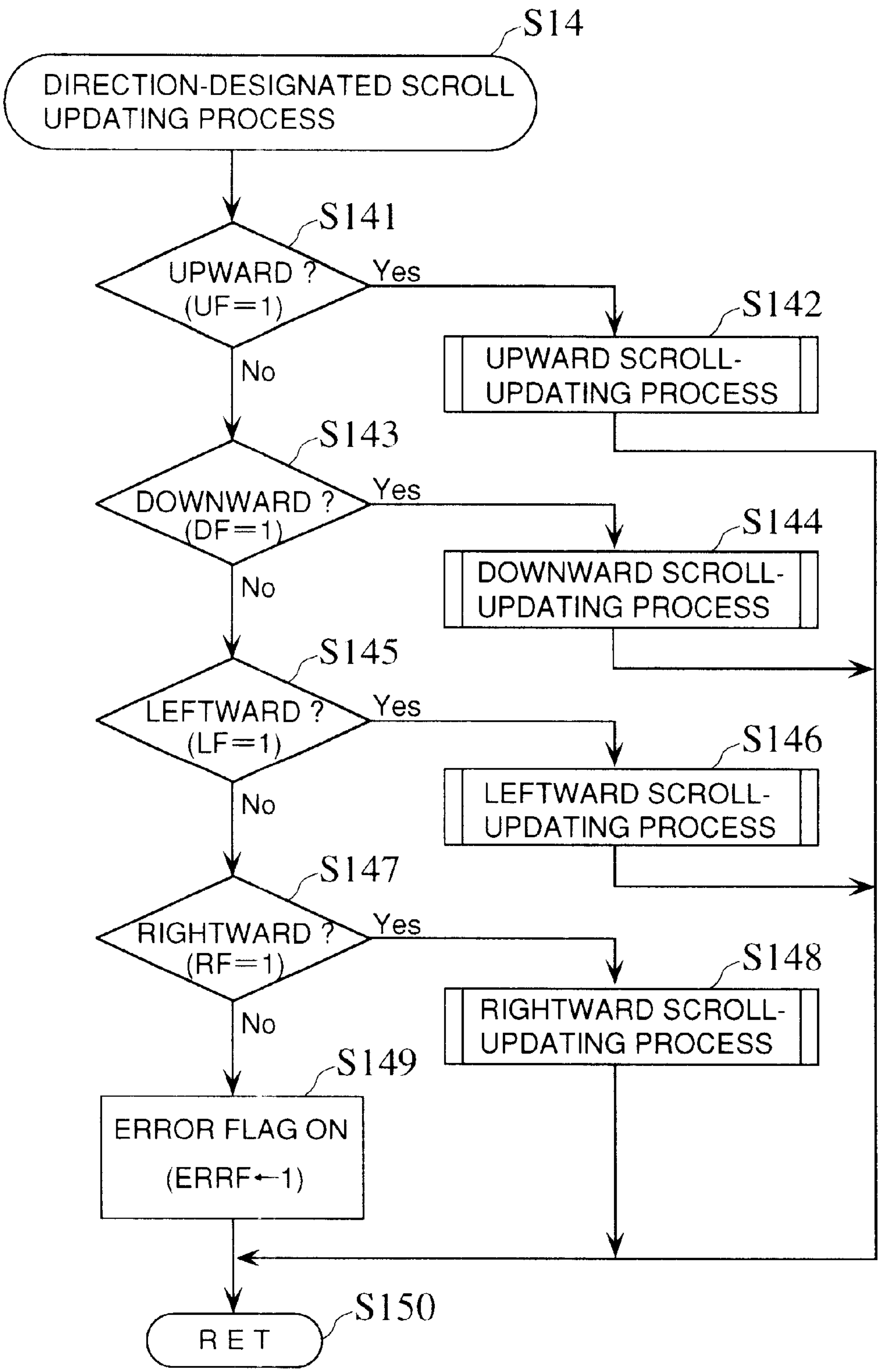
FIG. 21 is a flowchart showing a subroutine for carrying out a direction-designated scroll-updating process, which is executed in the FIG. 7 automatic scroll process.

Next, a subroutine for the direction-designated scroll updating process executed at the step S14 in the automatic scroll process in FIG. 7 will be described with reference to FIGS. 21 to 35B. When it is determined in FIG. 7 that the pause flag is equal to 0 (No to S13) and the updating process is started at the step S14, as shown in FIG. 21, it is first determined at a step S141 whether or not the designated direction is upward, that is, the upward flag UF is on (UF is equal to 1). If the upward flag UF is equal to 1 (Yes to S141), then a subroutine for carrying out an upward scroll-updating process is executed at a step S142, followed by terminating the updating process (S14) to proceed to the next process at the step S16 in FIG. 7, wherein it is determined whether or not the above-mentioned error flag ERRF is equal to 1.

On the other hand, if the upward flag UF is equal to 0 (No to S141), then it is determined at a step S143 whether or not the designated direction is downward, that is, whether or not the downward flag UF is on (DF is equal to 1).

Similarly, it is determined at steps S145 and S147 whether or not designated flags LF and RF are on respectively (whether or not any of the flags LF and RF is equal to 1). If any of the designated flags is on (Yes to S143, Yes to S145, or Yes to S147), then, a subroutine for carrying out the corresponding direction-designated scroll-updating process is executed at a corresponding one of steps S144, S146 and S148, followed by terminating the updating processing (S14) to proceed to the step S16 in FIG. 7.

On the other hand, if each of the direction-designated flags DF and LF is determined to be off at the corresponding step (No to S143 and No to S145), it is then determined at the following step whether or not the following direction-designated flag is on. If all the designated direction flags are off (No to steps S143, S145, S147, that is, if DF, LF and RF are all equal to 0), the error flag ERRF is turned on (ERRF is equal to 1) at a step S149, followed by terminating the updating processing (S14) at a step S150, and proceeding to the step S16 in FIG. 7.

In this case, as described above with reference to FIG. 7, since there has occurred an error and hence, after displaying a predetermined error message at the step S17, each flag is reset at the step S18 to enable general interrupts at the step S19 and then the automatic scroll process is terminated at the step S30, returning again to the state in which the key entry wait is enabled in FIG. 6.

Now, before explaining the above scrolls in the upward, downward, leftward and rightward directions (S142, S144, S146, S148), a method of forming the print image data GD as an object to be printed in the ink jet printer 1 and a method of forming display image data GC as an object to be displayed on the image screen will be described hereinafter with reference to FIGS. 22 to 31C.

As described with reference to FIG. 5, the ink jet printer 1 includes an area of text memory (basic data storage means) 244 for storing text data (basic data) comprised of letters and the like that is entered by the user into the static RAM 241 of the control block 200. The static RAM 241 is supplied with power by the backup circuit even when the power is turned off. Further, the control block 200 has the CG-ROM 230 (unit image data-forming means) which outputs font data in response to entered code data identifying characters and the like.

Therefore, the control block 200 of the ink jet printer 1 calls the control program in the ROM 220, the CPU 210 then reads out text data entered by the user from the text memory 244 and combines this information with the font data stored in the CG-ROM 230. The font data thus selected is developed as image data to be printed, and stored within the RAM 240. Thus, a new item of pint image data (basic image data) GD can be produced.

That is, according to the ink jet printer 1, it is possible to not only form or reproduce print image data (basic image data) GD stored in advance but also form or create new print image data GD. Further, text data (basic data) entered by the user is stored to form print image data (basic image data) GD based on the same, which makes it possible to form print image data GD within a desired range as required.

Now, first, assuming that such print image data (basic image data) GD as shown in FIG. 12A or 18A referred to hereinabove has been formed and stored in the area of the RAM 240, the method of forming display image data GC to be displayed on the image screen will be described.

Figure 22:
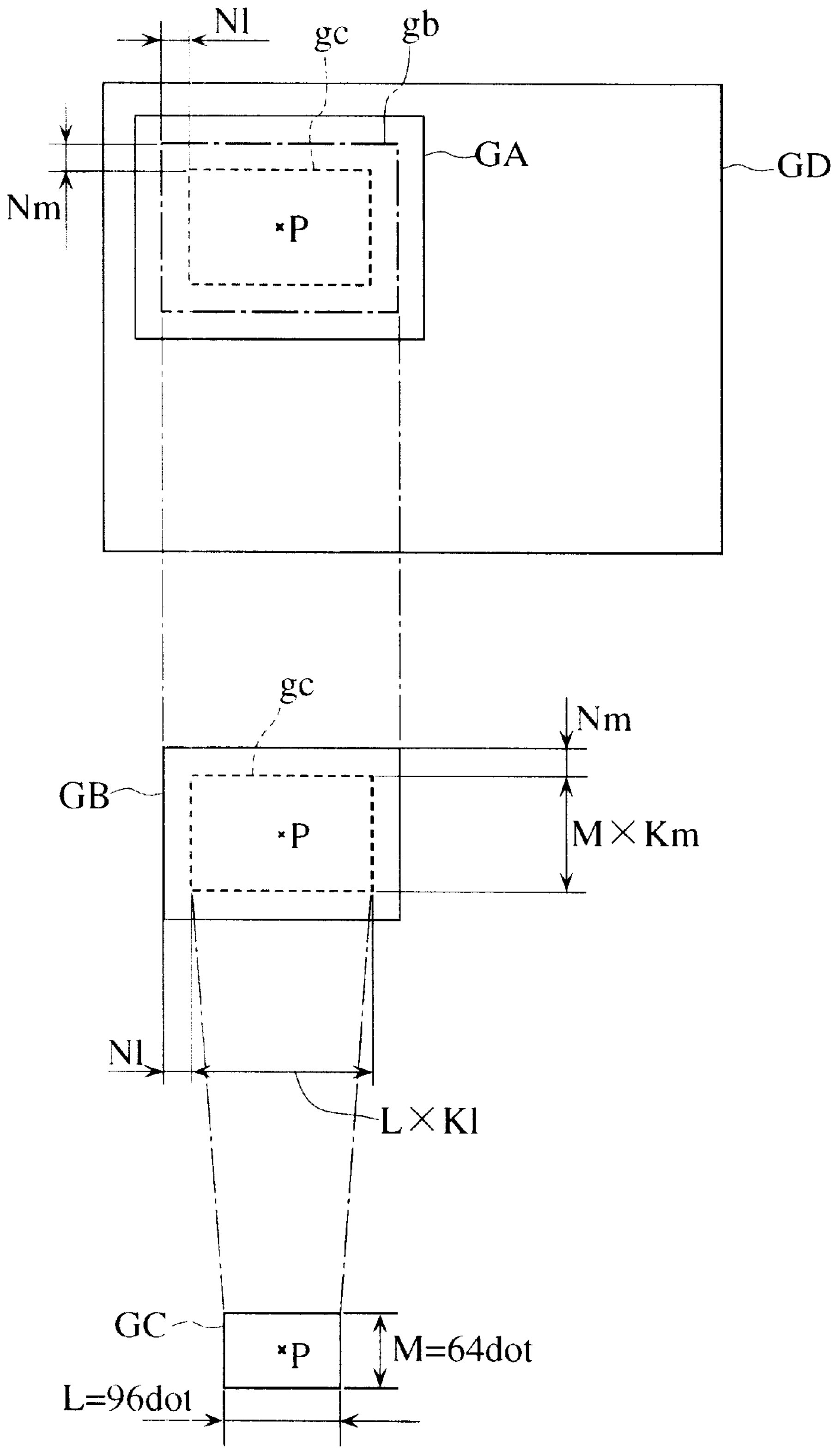
FIG. 22 is a diagram which is useful in explaining a method of forming print image data, scroll image data and display image data by the FIG. 1 ink jet printer.

Let it be assumed that print image data GD having a size of an uppermost figure shown in FIG. 22 has been formed and stored in the RAM 240. As shown in the figure, part of the print image data GD is first extracted (read out from the original area and stored in another) as the developed image data GA in the developed image data buffer 245 in the RAM 240. Then, image data (portion surrounded by one-dot-chain lines in the figure) gl, i.e. part of the developed image data GA, is extracted to the scroll image data buffer 246 as scroll image data GB.

Further, image data gc (portion surrounded by broken lines), i.e. part of the scroll image data GB, is increased or decreased in size such that the resulting image data has an image size ratio described hereinbefore with reference to FIGS. 9 to 13B, or alternatively, schematized if required (see FIGS. 12D and 12E) to thereby store the same as display image data GC in the display image data buffer 247. This item of the display image data GC is displayed on the display screen 18 (see FIGS. 1 and 5).

Since the display screen 18 has, as described above, a resolution of 64×96 dots, as shown in FIG. 22, the dot number M in the direction of the width of the display image data GC (in the vertical direction) and the dot number L in the direction of the length of the same (in the horizontal direction) are required to be equal to 64 and 96 respectively (point P in the figure represents the center of the display image data GC). Therefore, e.g. if the image size ratio (hereinafter also referred to as "the zoom ratio ZM") is set to 1/16 (equivalent to the case of 1024 dots being decreased to 64 dots), the original image data gc is required to be M×Km in the direction of the width thereof (Km represents the reciprocal of the image size ratio, which is applied to the width of the display image data GC: in the present case, Km=1/ZM=16)=1024 dots and L×Kl in the direction of the length thereof (Kl represents the reciprocal of the image size ratio, which is applied to the length of the display image data GC: in the present case Kl=1/ZM=16)=1536 dots.

Figure 23A:
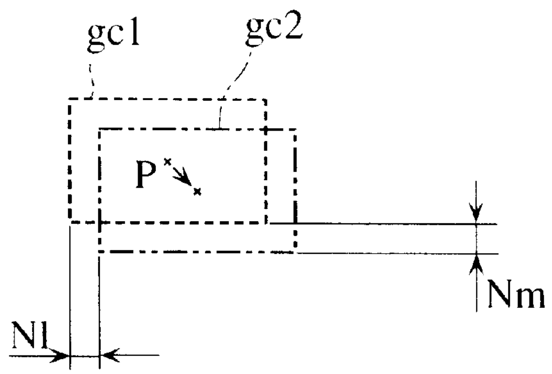
FIGS. 23A to 23C are diagrams showing scroll image data formed when the display image data appearing in FIG. 22 is scrolled downward to the right.
Figure 23B:
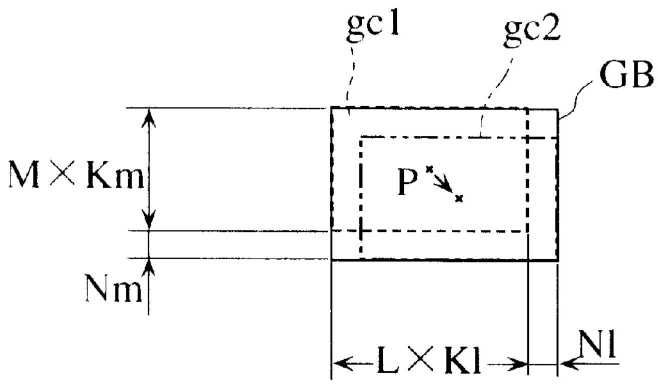

When the display range is scrolled downward to the right (e.g. when, during the rightward automatic scroll, a process changing command, described hereafter, has been entered to move the display range downward, or inversely, when, during the downward automatic scroll, the display range has been moved rightward), as shown in FIG. 23A, assuming that image data gc (corresponding to the display image data GC) in an original display range is represented by image data gc1 and the resulting image data gc is represented by image data gc2, to carry out the scroll process based on the scroll image data GB without extracting new image data from the print image data GD, the scroll image data GB is required to have a size as large as an area shown in FIG. 23B.

For instance, when the display image data GC is scrolled rightward by nl lines of dots (e.g. nl=1) and downward by nm lines of dots (e.g. nm=1) during a predetermined unit time period, as shown in FIG. 23B, the scroll image data GB is required to have not only the image data gc1 before scrolled, i.e. the image data gc1 of (M×Km)×(L×Kl) dots but also image data for N1 lines of dots (N1=nl×K1: e.g. N1=1×16=16 lines of dots: hereinafter "the lines of dots" are simply referred to as "the lines") on the right-hand side thereof as well as image data for Nm lines (Nm=nm×Km: e.g. Nm=1×16=16) on its downward side.

Inversely, when there can be no other scroll than the scrolls in the rightward direction and in the downward direction, if the scroll image data GB has image data of (M×Km+Nm)×(L×K1+N1) dots shown in FIG. 23B, it is possible to carry out the scroll process until after the above predetermined unit time period, without extracting new image data from the print image data GD.

Figure 23C:
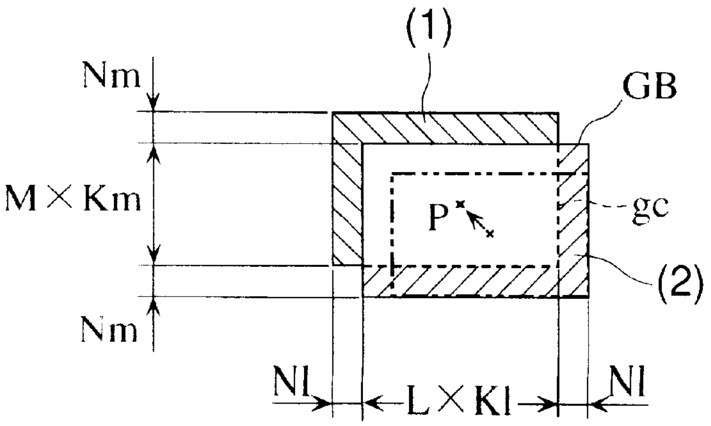

Further, as shown in FIG. 23C, an image data item in the scroll image data GB may be moved or scrolled left-upward without changing a range for extracting the image data gc to thereby convert (increase or decrease in size, or schematize, as described above) the resulting image data gc within the same extracting range as above to the display image data GC. In this case, the resulting display image data GC is image data scrolled downward to the right.

Further, in the case of FIG. 23C, as a portion of data corresponding to a hatched area (1) in the figure has been moved upward to the left as viewed in the figure, out of the display image data area, a storage space corresponding to the amount of the removed image data is formed as a hatched area (2). Therefore, by extracting a new portion of image data from the print image data GD to fill this storage space before another lapse of the predetermined unit time period such that image data can be continuously scrolled next time, the above scroll operation can be continuously repeatedly carried out thereafter.

Figure 24:
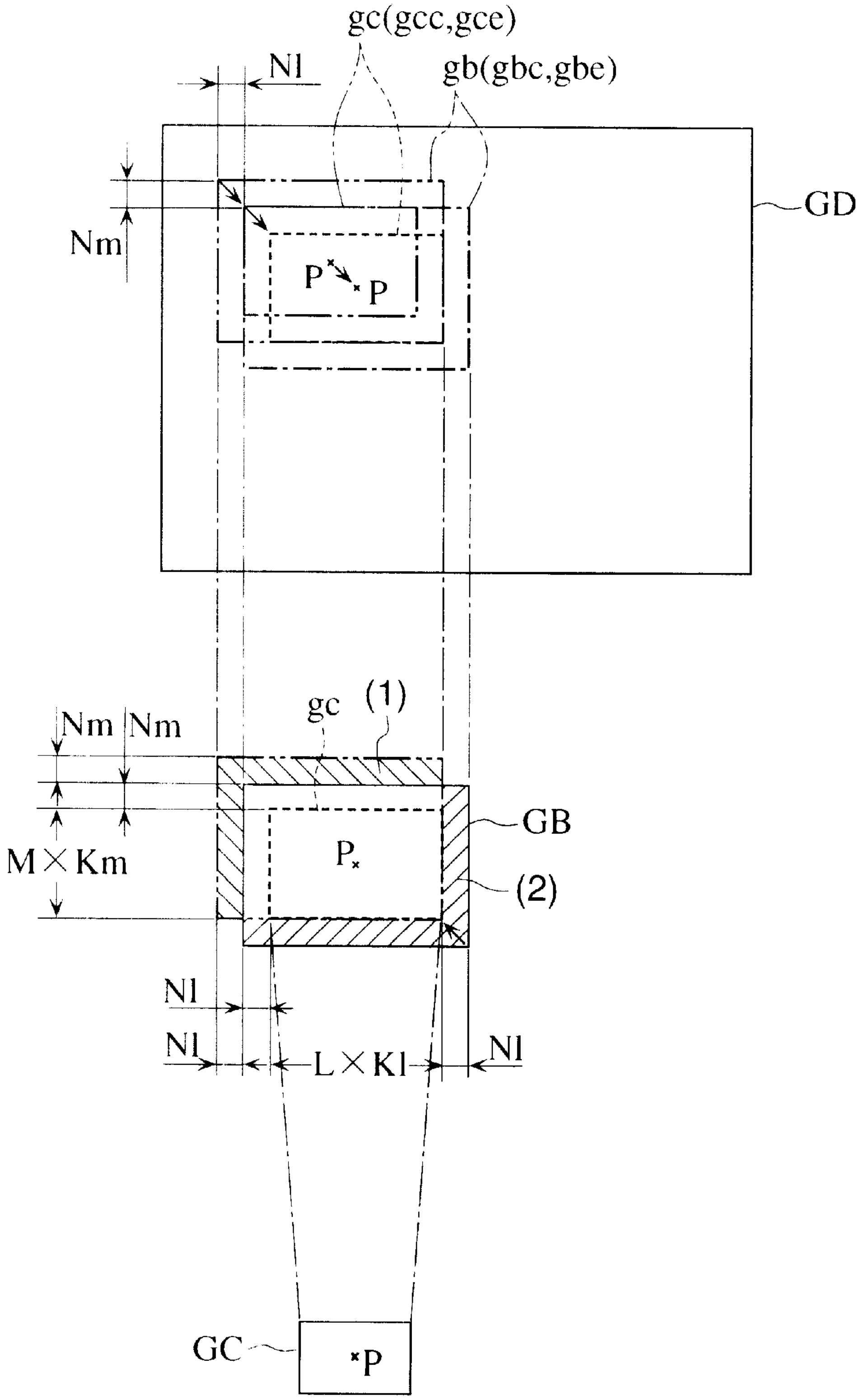
FIG. 24 is a diagram which is useful in explaining the relationship between the print image data, the scroll image data and the display image data during the downward-to-the-right scroll process of the display image data as shown in FIGS. 23A to 23C.

FIG. 24 shows the relationship between the print image data GD, the scroll image data GB and the display image data GC in the scroll downward to the right, described hereinabove. As shown in the figure, when the display image data GC is scrolled downward to the right over a predetermined unit time period after a given time point, it is only required to move the scroll image data GB in an opposite direction to the direction of scroll of the display image data GC by the same amount, i.e. by N1 lines to the left and by Nm lines upward before the lapse of the predetermined unit time period.

And, if a new image data item is extracted from the print image data GD by the same amount as occupied by the image data in the hatched area (1) moved out upward to the right before the lapse of the predetermined unit time period to thereby form image data in the hatched area (2), this scroll operation can be continuously repeatedly carried out hereafter.

Figure 25A:
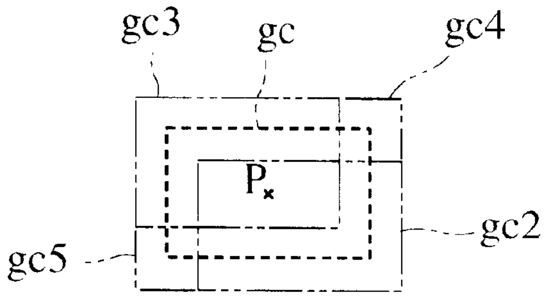
FIGS. 25A and 25B are diagrams showing scroll image data formed when the display image data appearing in FIG. 22 is scrolled in leftward, rightward, upward and downward directions.
Figure 25B:
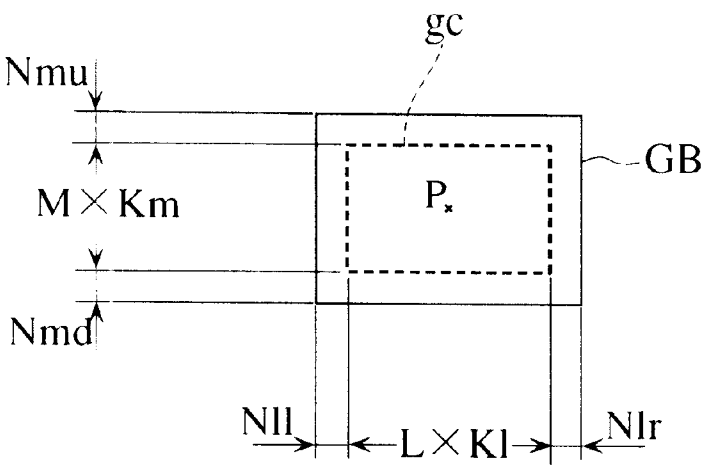

Although in the above example described with reference to FIGS. 23A to 24, only the rightward and downward scroll operations are taken into account, the ink jet printer 1 is basically capable of scrolling in the four directions, i.e. rightward, downward, upward and leftward directions. Therefore, as shown in FIG. 25A, the same amount of image data as represented by an area in FIG. 25B is prepared as the scroll image data GB and stored in the scroll image data buffer 246 by the above given time point, such that the scroll image data GB can supply not only the image data gc2 corresponding to the display image data GC scrolled downward to the right but also image data gc3 corresponding to the display image data GC scrolled upward to the left, image data gc4 corresponding to the display image data GC scrolled upward to the right, and image data gc5 corresponding to the display image data GC scrolled downward to the left.

Although in FIG. 25B it is possible to set the numbers of Nmu lines in an upward scroll range, Nmd lines in a downward scroll range, Nll lines in a leftward scroll range and Nlr lines in a rightward scroll range to respective different values, for purposes of ease of understanding, the following description will be made assuming that the display image data GC can be scrolled by Nc lines (upward, downward, leftward and rightward) within a predetermined unit time period, and that the number of lines of the scroll image data GB equivalent to the Nc lines is equal to Nb (the same value in all the four directions).

Further, the number of dots in the vertical direction, that is, in the direction of the width of the tape T can be fixed to 1024 dots which is the maximum value in the direction of the width of the tape T, and the vertical scroll can be carried out by changes in readout addresses (changes in extracting ranges) of the image data gc, while internal image data can be moved only for the rightward or leftward scroll to thereby oust a portion of the image data gc indicated by the above-mentioned area (1) in FIG. 24 and add a portion of the image data gc indicated by the above-mentioned area (2) in the same figure. However, the following description will be made assuming that there is prepared scroll image data GB which is applicable to wider range of uses and easier to understand than such data, and at the same time scrollable in all the directions.

It should be noted that in the example described above with reference to FIGS. 22 to 25B, after extracting part of the print image data GD as developed image data GA into the developed image data buffer 245 in the RAM 240 and then part of the developed image data GA, i.e. image data gb as it is (without being increased or decreased in size) as scroll image data GB in the scroll image data buffer 246, the size of part of the resulting scroll image data GB, i.e. image data gc is increased, decreased or schematized to thereby forming display image data GC.

Figure 26:
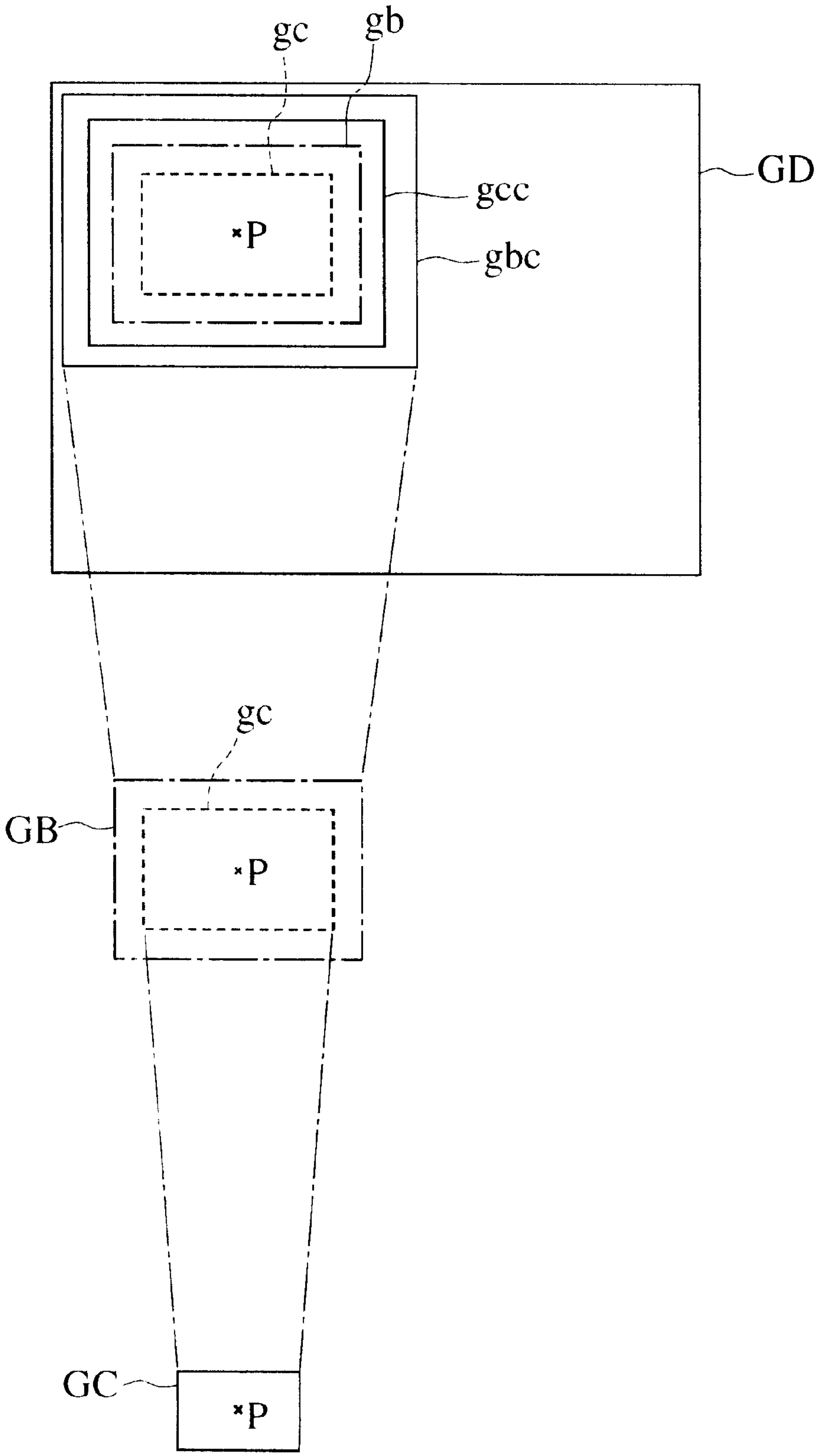
FIG. 26 is a diagram similar to FIG. 22, which is useful in explaining a method of decreasing the size of data or schematizing the same when the print image data is formed into scroll image data.

In the above process, however, as shown in FIG. 26, it is possible to read out image data gbc in a lager range, that is, larger in size than the above image data gb from the print image data GD for decreasing the size of the read-out image data gbc or schematizing the same to thereby form the scroll image data GB. Portion corresponding to the display image data GC, as shown in the figure, is the same image data gc on the scroll image data GB, whereas on the print image data GD it corresponds to image data gcc in a larger range and of larger size.

Figure 27:
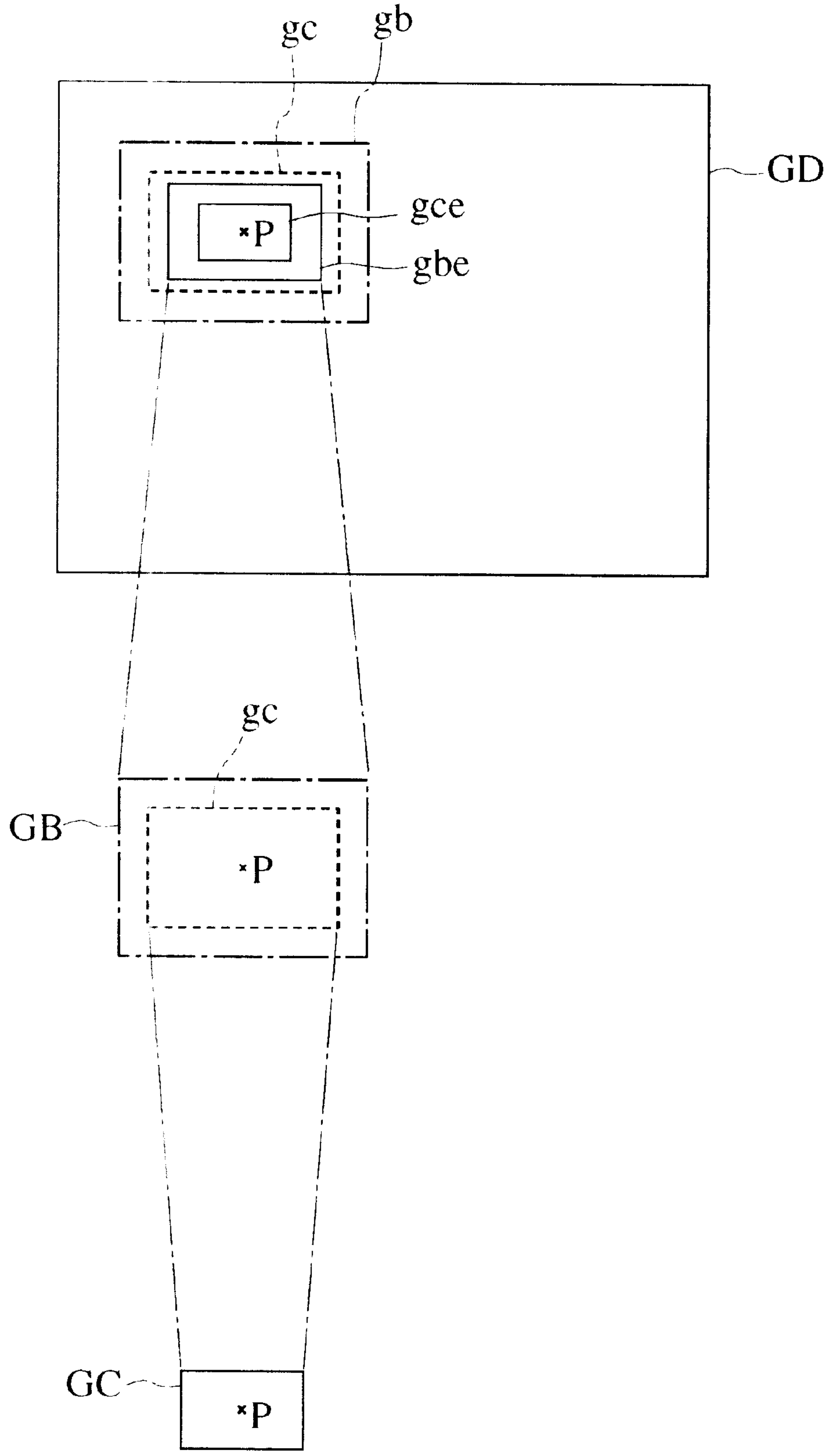
FIG. 27 is a diagram similar to FIG. 22, which is useful in explaining a method of increasing the size of data when print image data is formed into scroll image data.

Similarly, as shown in FIG. 27, it is possible to read out image data gbe in a smaller range and smaller in size than the above image data gb from the print image data GD for increasing the size of the resulting image data gbe to thereby form the scroll image data GB. In this process as well, portion corresponding to the display image data GC is image data gc on the scroll image data GB, whereas on the print image data GD it corresponds to image data gce in a smaller range and smaller in size than gc.

Although in the above cases of FIGS. 26 and 27, the central point of the display image data GC is used as the reference point for increasing or decreasing the size of image data, it is possible to use other points, such as the upper left corner point or the like, as a reference point. Further, image data may be increased or decreased in size or schematized both when the scroll image data GB is formed from the print image data GD and when the display image data GC is formed from the scroll image data GB. Moreover, by enabling the data to be processed to this end selectively at these processing points, the range of the zoom ratio ZM or the like can be increased to thereby enhance the usefulness of the ink jet printer 1.

Further, even if the zoom-in/out of image data is carried out as in FIGS. 26 to 27, image data items gb and gc occupying only respective portions of the range of the print image data GD in FIG. 24 are replaced by the above image data items gbc and gcc, or the image data items gbe and gce, but there is no change in the relationship between the scroll image data GB and the display image data GC. That is, the scroll process can be performed without extracting new image data items until the predetermined unit time period elapses and if next image data is supplied before the lapse of the predetermined unit time period, the above scroll operation can be continuously repeatedly carried out.

As described above, according to the ink jet printer 1, scroll image data GB including data in a display range at any given time and data in ranges to which the scroll can be effected from the above display range before the lapse of a predetermined unit time period is stored in the scroll image data buffer 246 (scroll image data storage means) separately from the print image data (basic image data) GD, to thereby obtain the display image data GC from the scroll image data GB. Therefore, even when a memory area (basic image data storage means) for storing basic image data is unavailable due to access by other resources or the like, for instance, the scroll process can be performed until the predetermined unit time period elapses.

Further, it is possible to scroll the image displayed using the image data gc read from the scroll image data buffer 246 (scroll image data storage means) and form the print image data (basic image data) GD to store the same in the above memory area simultaneously by a time sharing process or the like. This can shorten the processing time.

In general, if the display screen is small in size, the size of display image data required at any given time is small, and accordingly however large the entire basic image data for forming display image data therefrom may be, it is only required that an amount of data corresponding to the small display range is available at each displaying time point. Further, when basic image data is edited on the display screen by changing entered data items via input means, the processing time for display is shorter when only a display range and its neighboring portion are changed than when the entire basic image data is re-formed whenever data is changed.

That is, in the case of the ink jet printer 1 as well, as described hereinabove, since the display screen 18 is small in size, the display image data GC required at any given time may be small. Therefore, it is only required that a portion of the print image data (basic image data) GD for forming display image data therefrom is available in an amount corresponding to the small-sized display image data GC at each displaying time point. Further, when the print image data (basic image data) GD is edited on the display screen 18 by changing text data items in the text memory 244, the processing time for display is shorter when only the display image data GC and its neighboring portion are changed than when the whole print image data GD is re-formed.

Figure 28A:
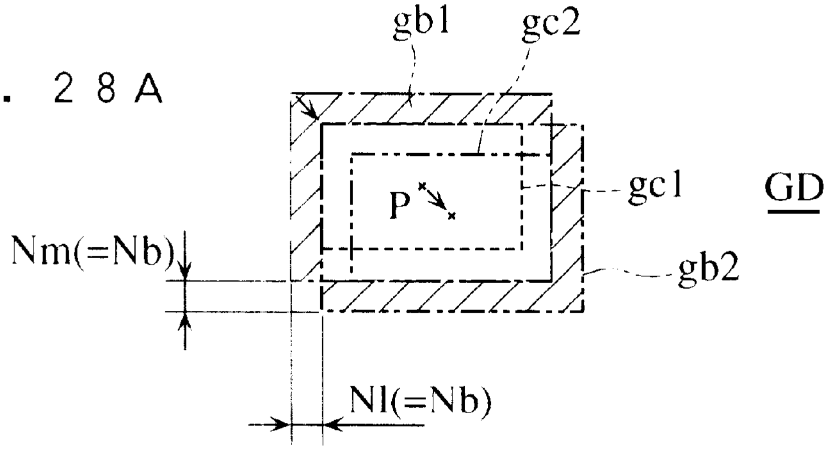
FIGS. 28A to 28C are diagrams showing developed image data formed when the display image data appearing in FIG. 22 is scrolled in the leftward, rightward, upward and downward directions.

For instance, as shown in FIG. 28A, when the automatic scroll downward to the right is carried out, similarly to the relationship between the image data gc (gc1 for gc before scroll, gc2 for gc after scroll) and the scroll image data GB, which is described above with reference to FIGS. 23A to 23C, the developed image data GA requires image data gb1 and gb2 (gb1 for gb before scroll, gb2 for gb after scroll) at any given time of starting of the scroll process for scrolling the image data gb downward to the right.

In other words, at the given time point, the scroll image data GB corresponding to the image data gb1 is required for scrolling the display image data GC within the predetermined unit time period from the given time point, and after the lapse of the predetermined unit time period, scroll image data GB corresponding to the image data gb2 is required for further scrolling of the display image data GC within the predetermined unit time period from the time point of the lapse of the predetermined time period, so that, to carry out the scroll process within each predetermined unit time period without extracting new image data from the print image data GD, the developed image data GA including the image data gb1 and gb2 is required at the above given time point.

Figure 28B:
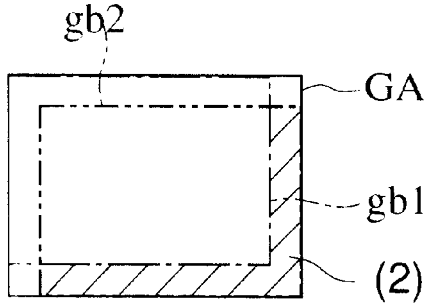

Inversely, when there can be no other scroll process than the scroll in the rightward direction and in the downward direction, so long as the developed image data GA shown in FIG. 28B is available, the ink jet printer 1 can carry out the above scroll process without extracting new image data from the print image data GD during the above predetermined unit time period. That is, as described above with reference to FIG. 23C, even if image data in the range (2) in FIG. 23C is required as the scroll image data GB before the lapse of the predetermined unit time period, it is possible to supply the same. And, if the above relationship between the developed image data GA and the scroll image data GB is applied to the scroll processes in all the directions, as in the case of the scroll image data GB shown in FIG. 25B, the developed image data GA is only required to have the size of the area shown in FIG. 28C.

Now, as described hereinbefore, the ink jet printer 1 stores text data (basic data) entered by the user to form print image data (basic image data) GD from the same, which makes it possible to form print image data GD in a desired range, when necessary. In other words, there is no need to form the whole print image data GD for extracting part thereof as developed image data GA, but the user is only required to form a necessary range of image data directly from the text data as developed image data GA.

Figure 28C:
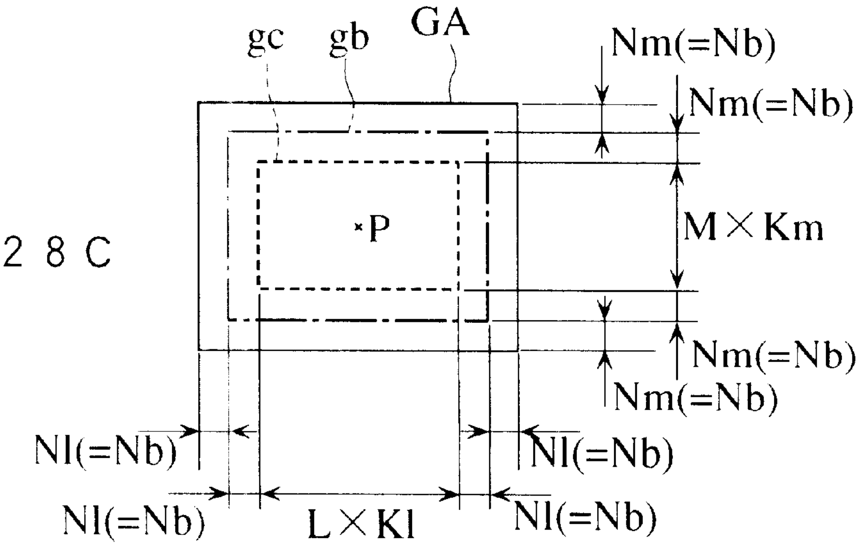
Figure 29A:
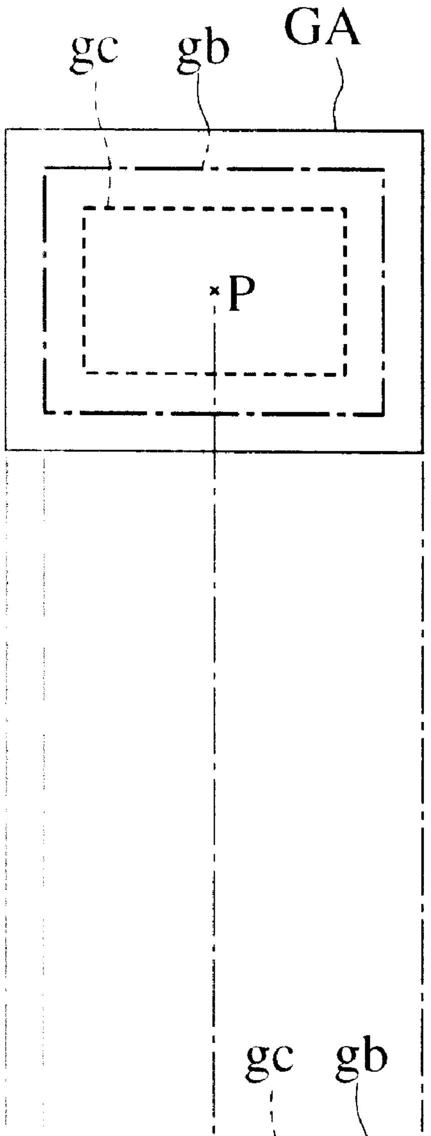
FIGS. 29A and 29B are diagrams which are useful in explaining an image data-updating process executed when a required range of print image data is formed as developed image data.

Therefore, the ink jet printer 1 reads out only required text data items from the text memory 244 to cause the CG-ROM 230 to output corresponding font data, thereby developing the same on the developed image data buffer 245 so as to prepare developed image data GA shown in FIG. 29A (identical to the data show in FIG. 28C) by the above given time point.

Figure 29B:
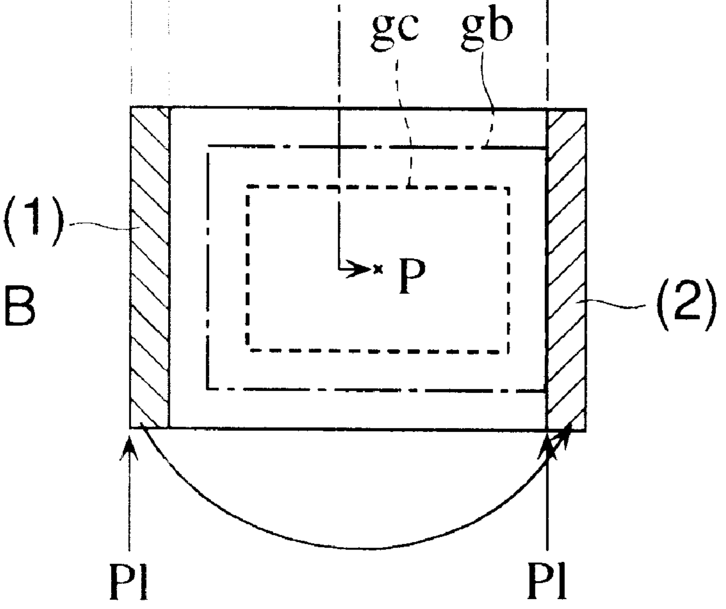

When the developed image data GA is in a state shown in FIG. 29A at the above desired time point, if the display image data GC is scrolled rightward before the lapse of the predetermined unit time period, the image data gc corresponding to the display image data GC and the image data gb containing it in the following scroll range are moved as shown in FIG. 29B, and hence unnecessary image data in a hatched area (1) in the figure is disposed of before the lapse of the predetermined unit time period to develop image data in a hatched area (2)from the text data to form new developed image data.

The developed image data buffer 245 of the ink jet printer 1 is a circular buffer for circulating addresses upward, downward, leftward and rightward. Two points P1 shown in the horizontal direction in FIG. 29B (direction of the length of the tape T) designate an identical point in the horizontal direction on the address pointer.

Figure 30A:
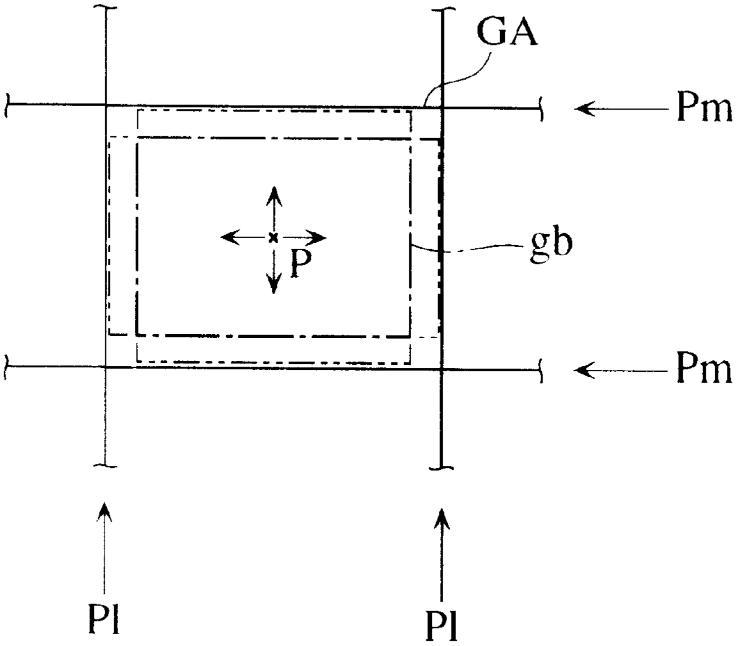
FIGS. 30A and 30B are diagrams which are useful in explaining the image data-updating process executed when the developed image data in FIGS. 29A and 29B is formed in a circular buffer which is circularly addressed in the leftward, rightward, upward and downward directions.

That is, the developed image data buffer 245 is configured as shown in FIG. 30A. Two points Pm shown in the vertical direction (direction of the width of the tape T) designate an identical point (address) on the address pointer, and two points P1 shown in a horizontal direction of the figure also designated an identical point (address) on the address pointer.

Figure 30B:
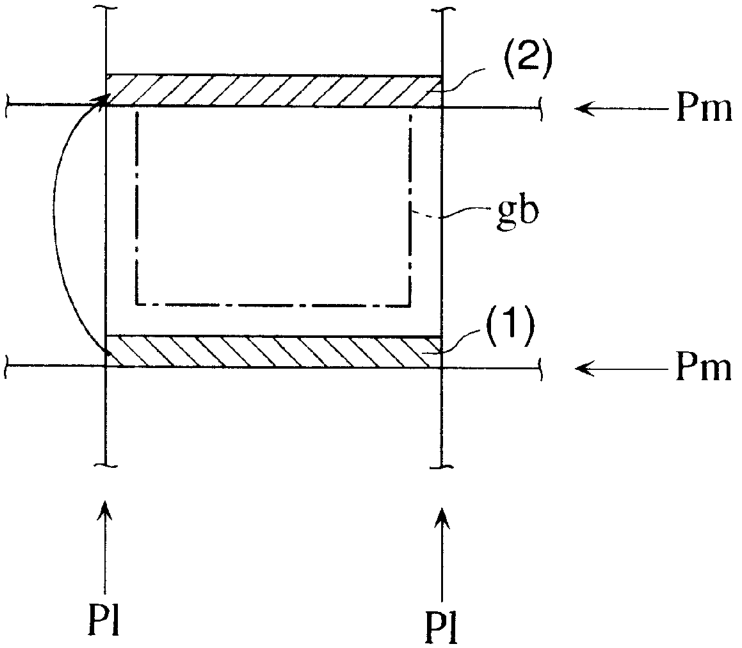

For instance, when the image data gb is moved upward, as shown in FIG. 30B, image data in a hatched area (1) is disposed of to newly form image data in a hatched area (2). However, since the hatched area (1) has addresses identical to ones of the hatched area (2) with reference to the address Pm, actually new image data is formed simply by writing image data to be added to the hatched area (2) onto the hatched area (1). Therefore, a minimum area required for the developed image data GA suffices to perform the above address-circulating operation, whereby memory area can be saved.

In the above case, only an area required for the developed image data GA is allocated to the developed image data buffer 245 to circulate addresses, while it is possible to circulate addresses after allocating an additional backup area thereto for storing data neighboring the developed image data GA.

In FIG. 28C, for instance, when the number of dots in the direction of the length of the image data gc is set to 1536 dots (L×K1=1536 dots) and the number of Nl lines in the scroll range is set to 16 (Nl=Nb=16 (dots)), the number of dots in the direction of the length of the developed image data GA becomes equal to 1600 dots (1536+4×16=1600). Therefore, if an area for 2048 dots which can be expressed in addresses of 10 bits including 448 dots for the backup area is allocated to the buffer 245, 10-bit addresses of (0 0 0 0 0 0 0 0 0 0) b to (1 1 1 1 1 1 1 1 1 1) b can be employed to thereby set an address next to an ending address (1 1 1 1 1 1 1 1 1 1) b to (0 0 0 0 0 0 0 0 0 0) b, which provides another advantage of making it easier to control the address by the address pointer.

Further, as described above, the ink jet printer 1 forms print image data GD having the maximum 1024 dots in the direction of the width thereof, and hence an area may be allocated to the buffer 245 for expressing 1024 dots in the direction of the width by addresses of (0 0 0 0 0 0 0 0 0) b to (1 1 1 1 1 1 1 1 1) b of 9 bits.

In the above case, e.g. when the above-mentioned zoom ratio ZM is set to 1/16, it is impossible to form image data items of 4×Nm=4×Nb=4×16=64 dots in the upward and downward scroll ranges shown in FIG. 28C. However, the print image data GD has the maximum 1024 dots, and therefore this inconvenience can be overcome by using blank dots. When another zoom ratio ZM is set, e.g. when the zoom ratio ZM=1/12 is used, if the number of dots in the direction of the width of the image data gc corresponding to the display image data GC is set to 768 dots (M×Km=64×12=768 dots), and the number of scroll lines is set to 12 (Nm=Nb=12 (dots)), the number of dots in the direction of the width of the developed image data GA becomes equal to 816 dots (768+4×12=816 dots), which makes it possible to secure a backup area of 208 dots (1024−816=208 dots)

Further, the scroll image data buffer 246 can be implemented by a circular buffer similar to the above developed image data buffer 245. If the above circular buffer is adopted, a method of scrolling the readout address of the image data gc in the range of the display image data GC is more conveniently used, similarly to the case of the developed image data GA shown in FIG. 29B, than a method of shifting internal image data adopted in the FIG. 23C in an opposite direction to the direction of the scroll.

As described above, there are two methods of forming the scroll image data GB, more particularly, of adding newly required image data and extracting (reading out) the image data gc corresponding to the display image data GC.

That is, there are a first method of shifting internal image data in an opposite direction to the direction of the scroll to supply new image data for the resulting emptied area for reading out image data gc corresponding to display image data GC from an identical range (of addresses), and a second method of shifting (circulating) both a range (of addresses) for reading out image data gc corresponding to display image data GC and a range (of addresses) for supplying new data. The former and the latter will be described hereinafter with reference to FIGS. 32, 33A and 33B and FIGS. 34, 35A and 35B respectively by taking a rightward scroll process as an example.

As described above, the ink jet printer 1 deals with the print image data GD as circular image data having its trailing end and leading end. connected to each other. Therefore, the relationship between the print image data GD which is not actually formed or developed in its entirety and the developed image data GA is described beforehand hereafter with reference to FIGS. 31A to 31C.

Figure 31A:
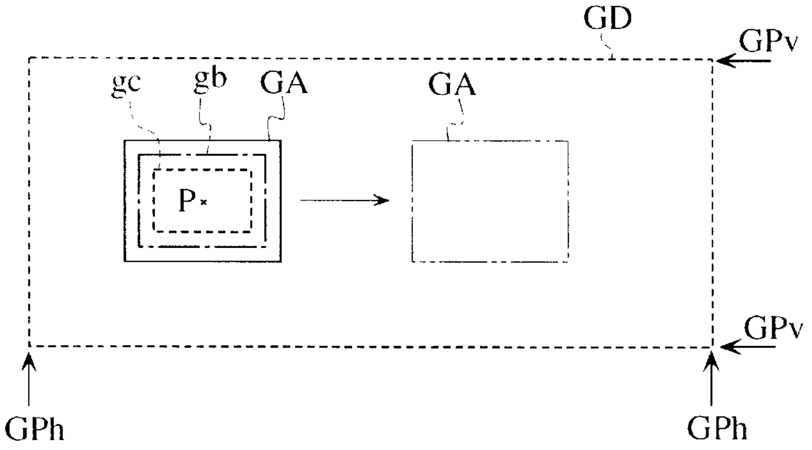
FIGS. 31A to 31C are diagrams which are useful in explaining the relationship between print image data and developed image data in the case where print image data is handled as circular image data and actually the whole print image data is not simultaneously formed.
Figure 31B:
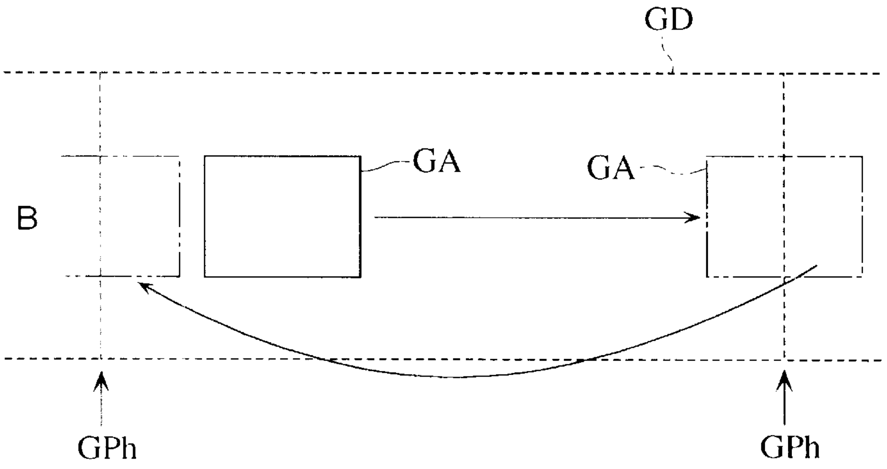
Figure 31C:
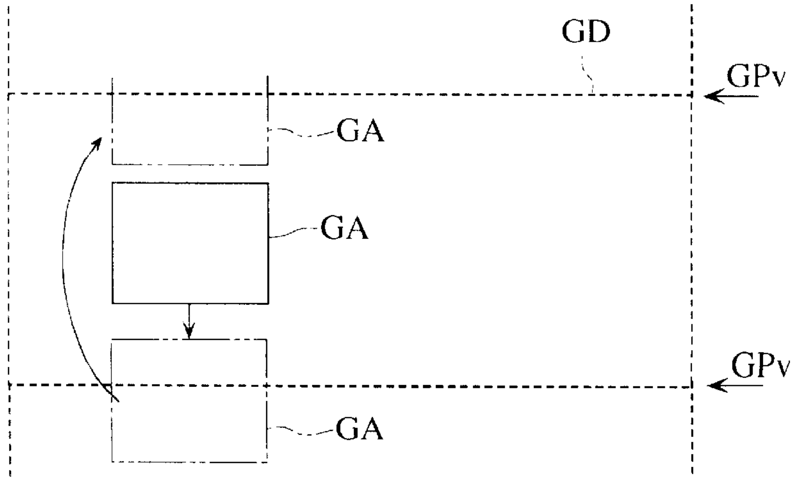

As shown in FIGS. 31A to 31C, when the imaginarily formed or developed entire range of print image data GD is scrolled, e.g. rightward, the range of the print image data GD formed as developed image data GA is scrolled rightward, as shown in FIG. 31A. Now, it is assumed that the x coordinate of the horizontal trailing end of the print image data GD is represented by GPh (x=GPh). As shown in FIG. 31B, if a portion of image data on the leading end-side of the print image data GD is developed into an area of the developed image data GA corresponding to a portion that extends off screen as the print image data GD is scrolled past the trailing end thereof (portion which becomes empty if the print image data GD is not in the circular form), the imaginarily developed print image data GD becomes circular image data. In this case, the horizontal trailing and leading ends coincide with each other, i.e. they have an identical x coordinate (x=GPh).

Similarly, when the imaginary entire range of print image data GD is scrolled downward, assuming that the y coordinate of the vertical trailing end of the print image data GD is represented by GPv (y=GPv), as shown in FIG. 31C, if a portion of image data on the leading end-side of the print image data GD is developed into an area of the developed image data GA corresponding to a port that extends off screen as the print image data GD is scrolled past the trailing end (portion which becomes empty if the print image data GD is not in the circular form), the imaginary entire range of print image data GD becomes circular image data. In this process, the vertical trailing and leading ends thereof coincide with each other, i.e. they have an identical y coordinate (y=GPv)

In FIG. 31A referred to above, when the number of dots in the direction of the width of the print image data GD is so small that a vertically entire portion between the vertical trailing ends GPv can be developed within the range of the developed image data buffer 245, or alternatively, when an area corresponding to the a maximum 1024 dots in the direction of the width of the print image data GD is intentionally allocated to the buffer 245 for the developed image data GA, it goes without saying that there is no need to provide new image data in carrying out the vertical scroll process, differently from the FIG. 31C case.

Further, in the above cases, when printing is actually carried out on the tape T, if the print image data GD is developed onto the developed image data GA from its leading end side, this developed image data GA can be used as it is as image data for printing, which makes it unnecessary to form or develop the entire print image data GD in another area or the like.

Further, even when an entire portion in the direction of the width of the print image data GD can not be prepared at a time as the developed image data GA, the downward scroll process of the developed image data GA can be carried out from the upper left corner of the left end of the print image data GD toward the lower left corner of the left end thereof to output dots of a first left end line for printing. Then, the same process can be carried out on an adjacent line of dots on the right side. Thus, lines of dots can be output one after another by shifting rightward, whereby it is possible to print the whole print image data GD without forming or developing the whole of the data in a different area.

Next, each direction-designated scroll-updating process shown in FIG. 21 will be described with reference to FIGS. 32 to 35B by taking the rightward scroll-updating process executed at the step S148 as an example. First, as described hereinbefore, with reference to FIGS. 32, 33A and 33B, the first method will be explained which shifts internal image data in the scroll image data GB in an opposite direction to the direction of the scroll while adding new image data in the resulting empty area and reading out the image data gc corresponding to the display image data GC from an identical range (of addresses).

Figure 32:
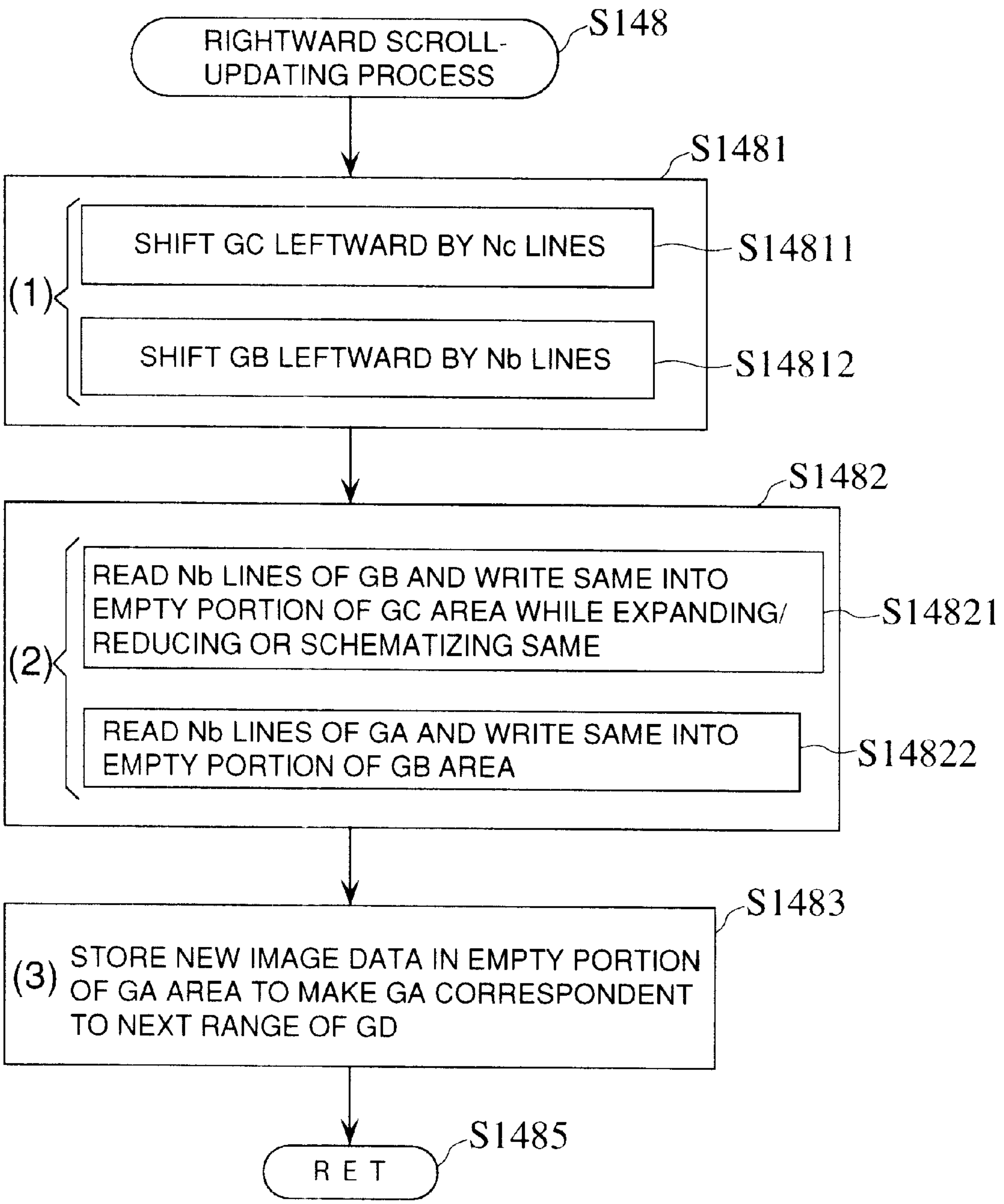
FIG. 32 is a flowchart showing a subroutine for carrying out a rightward scroll-updating process, which is executed in the FIG. 21 direction-designated scroll-updating process.
Figure 33A:
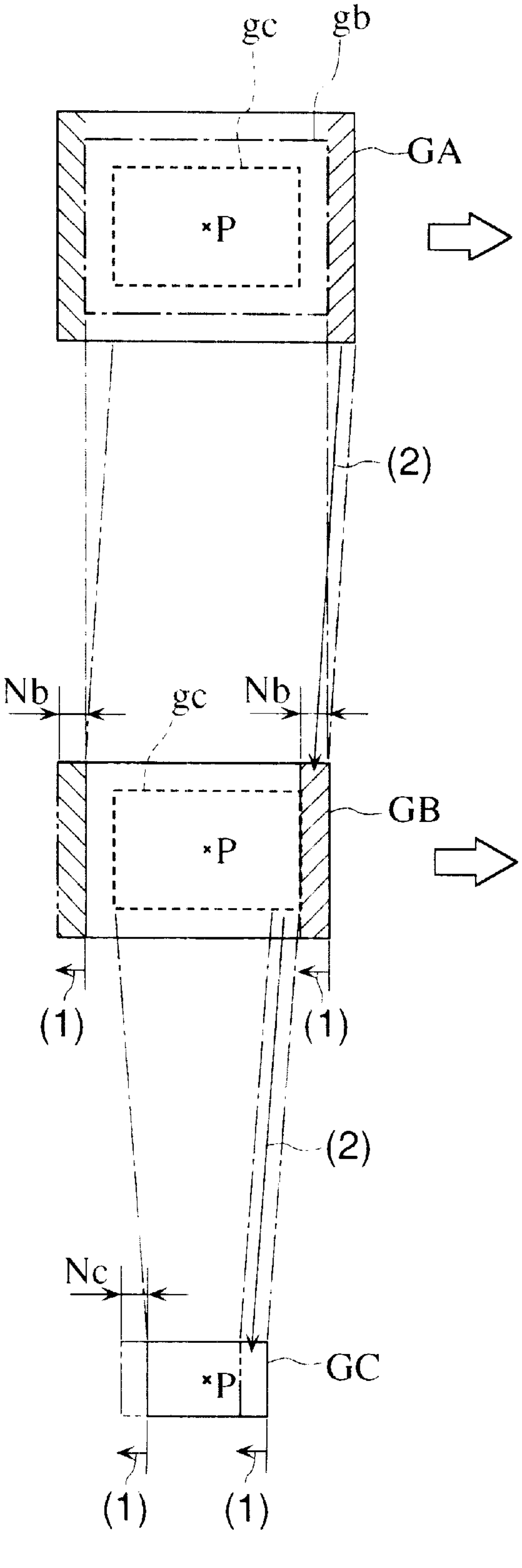
FIGS. 33A and 33B are diagrams corresponding to FIG. 32, which are useful in explaining the relationship between the print image data, the scroll image data and the display image data.
Figure 33B:
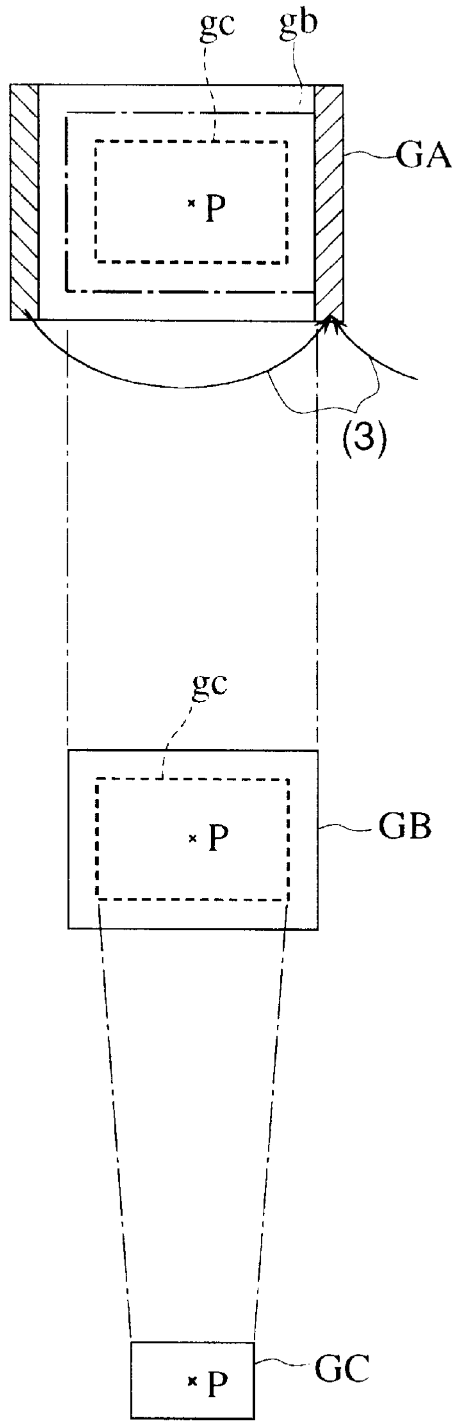

When it is determined in the FIG. 21 subroutine that the rightward flag RF is equal to 1 (Yes to S147), the present process is stated at the step S148, as shown in FIGS. 32, 33A and 33B in further detail.

(1) First, the display image data GC is scrolled leftward by Nc lines, that is, by a scrollable amount of display image data GC which can be scrolled in a predetermined unit time period at a step S14811, while the scroll image data GB is scrolled leftward by Nb lines corresponding to the Nc lines of the display image data GC at a step S14812. Either of the above processes may be first carried out, or alternatively, both of the same may be simultaneously executed by time sharing at the step S1481.

(2) Next, at a step S14821 the Nb lines of the scroll image data GB are read and written into an empty area produced by the step S14811 of (1) for the display image data GC while being expanded, reduced or schematized for display, and at a step S14822 the Nb lines of the developed image data GA are read and written into an empty area produced by the step S14812 of (1) for the scroll image data GB. Either of the above processes may be first carried out, or alternatively, both of the same may be simultaneously executed by time sharing at the step S1481.

In this case, in the scroll image data GB, internal image data is shifted in an opposite direction (leftward in the present subroutine) to the direction of the scroll (rightward in the present subroutine) to add new image data in the resulting empty area, and image data gc corresponding to display image data GC is read out from an identical range (of addresses).

(3) Next, only a required portion of text data is read out from the text memory 244 and corresponding font data is output from the CG-ROM 230 to develop the same as new units of image data at least part of which is stored into an empty area (area which has become available: see FIG. 29B) of the developed image data buffer 245 for a portion of the developed image data GA to be added, whereby developed image data GA is made correspondent to a next range of print image data GD, at a step S1483, followed by terminating the subroutine (S148) at a step S1485.

In the above process, image data gb which can be scrolled to form display image data GC before the lapse of the predetermined unit time period from any given time point is already provided in the scroll image data GB, and hence immediately after scrolling the display image data GC leftward by Nc lines before the lapse of the predetermined unit time period (S14811), image data can be supplied from the scroll image data GB to the empty area for a portion of the display image data GC to be added at the step S148221.

Further, a portion of image data required to be provided as the above scroll image data GB before the lapse of a next predetermined unit time period is already prepared in the developed image data GA at the given time, and hence immediately after scrolling the scroll image data GB leftward by Nb lines at the step S14812, the portion of image data can be supplied from the developed image data GA to the empty area for a portion of the scroll image data GB to be added, at the step S14822.

And, immediately after terminating the addition or supply of the image data to the scroll image data GB, a newly required image data is prepared as developed image data GA at the step 1483, so that if a time point upon the lapse a of the predetermined unit time period described above is set as a new given time point, the rightward scroll-updating process can be carried out in the same manner as described above. That is, the above-mentioned subroutine executed in FIGS. 32, 33A and 33B can be continuously repeatedly carried out.

Inversely, the print image data GD required for display from any given time point until the lapse of a predetermined unit time period from the given time point is prepared as developed image data GA by the predetermined unit time period before the given time point so as to supply the resulting developed image data GA to scroll image data GB by the given time point, whereby scroll image data GB which can be supplied to the scrollable range of display image data GC for use from the given time point before the lapse of the predetermined unit time period is provided by the given time point. And, by repeatedly carrying out this process, the ink jet printer 1 copes with the scroll process at any given time points.

Next, the second method of shifting (circulating) both a range (of addresses) for reading out image data gc corresponding to display image data GC within scroll image data GB and a range (of addresses) for supplying new image data to the scroll image data GB will be described with reference to FIGS. 34, 35A and 35B.

Figure 34:
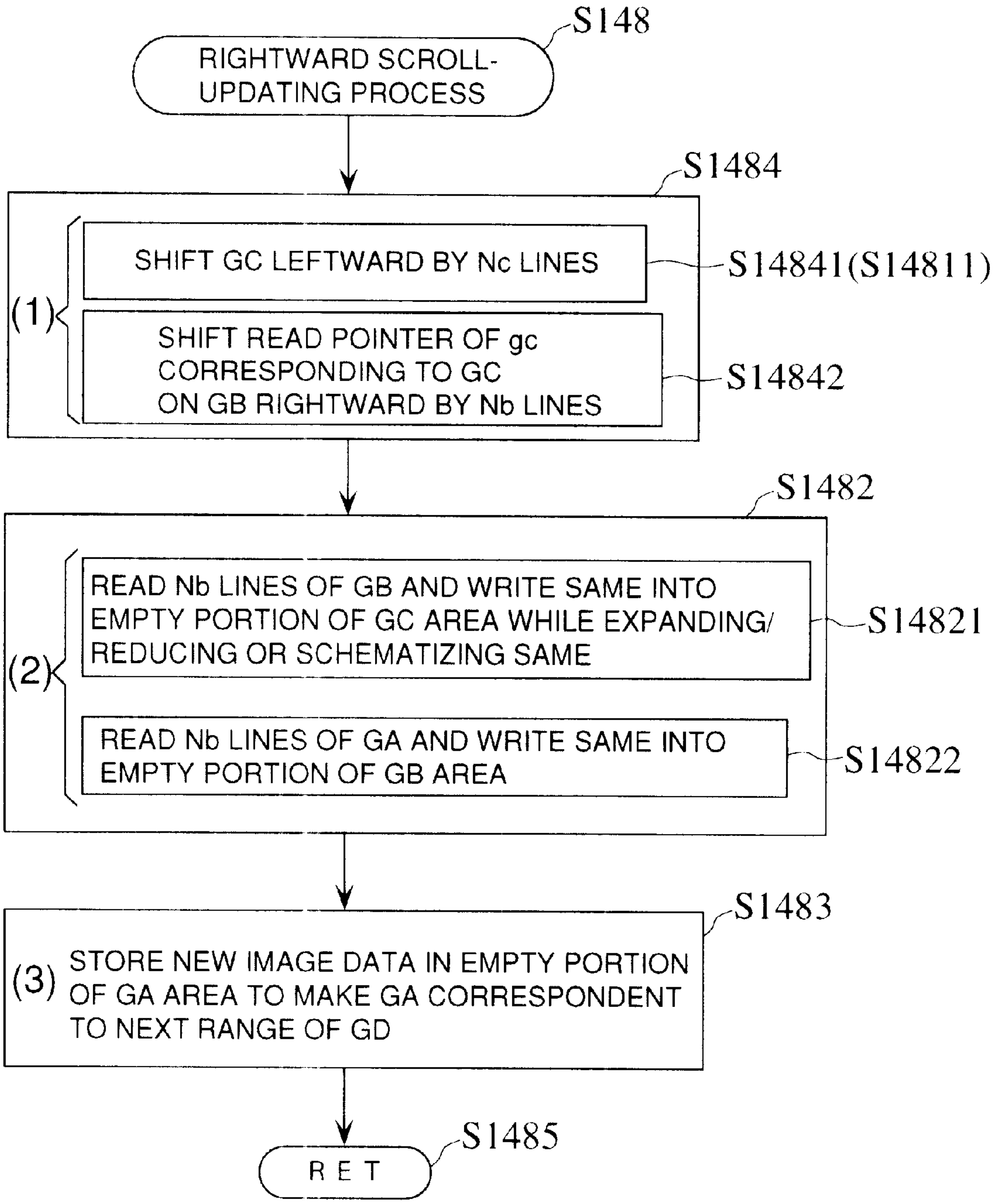
FIG. 34 is a flowchart similar to FIG. 32, which shows a subroutine for carrying out the rightward scroll-updating process by another method.

When it is determined in the FIG. 21 subroutine that the rightward flag is equal to 1 (Yes to S147), the present subroutine is started at the step S148, as shown in FIGS. 34 and 35 in further detail.

(1) First, the display image data GC is scrolled leftward by Nc lines at a step S14841 (identical to S14811 in FIG. 32), while (the value of) a read pointer for reading out image data within the scroll image data GB is shifted rightward by Nb lines corresponding to the Nc lines, at a step S14842. In this process as well, either of the above steps may be first carried out, or alternatively, both of the same may be simultaneously executed by time sharing at the step S1484.

The following step (2) (S1482) et seq. are carried out similarly to the case of FIG. 32, followed by terminating the process at the step 1485. In this process, however, the scroll image data buffer 246 has a construction of a circular buffer similar to that of the developed image data buffer 245 and an empty area of the scroll image data GB shown in FIGS. 35A and 35B corresponds to an area made available by the scroll process. This makes it possible to shift (circulate) both a range (of addresses) for reading out image data gc corresponding to display image data GC within scroll image data GB and a range of addresses for supplying new image data to the scroll image data GB.

Figure 35A:
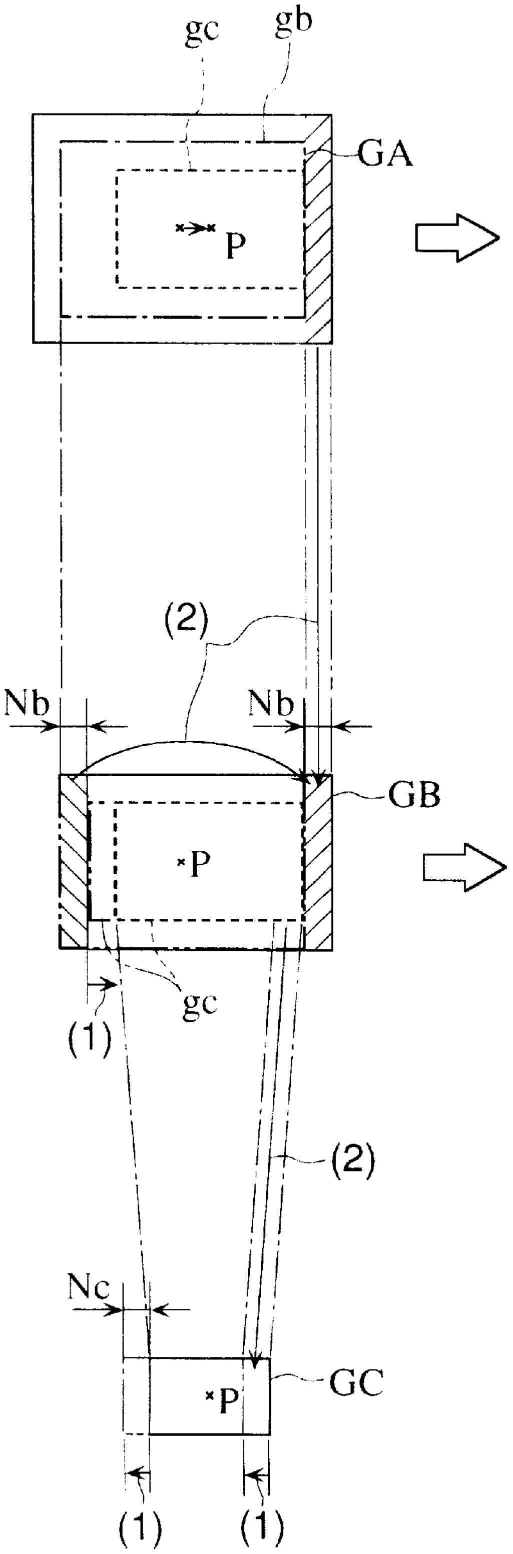
FIGS. 35A and 35B are diagrams similar to FIGS. 33A and 33B, which correspond to FIG. 34.
Figure 35B:
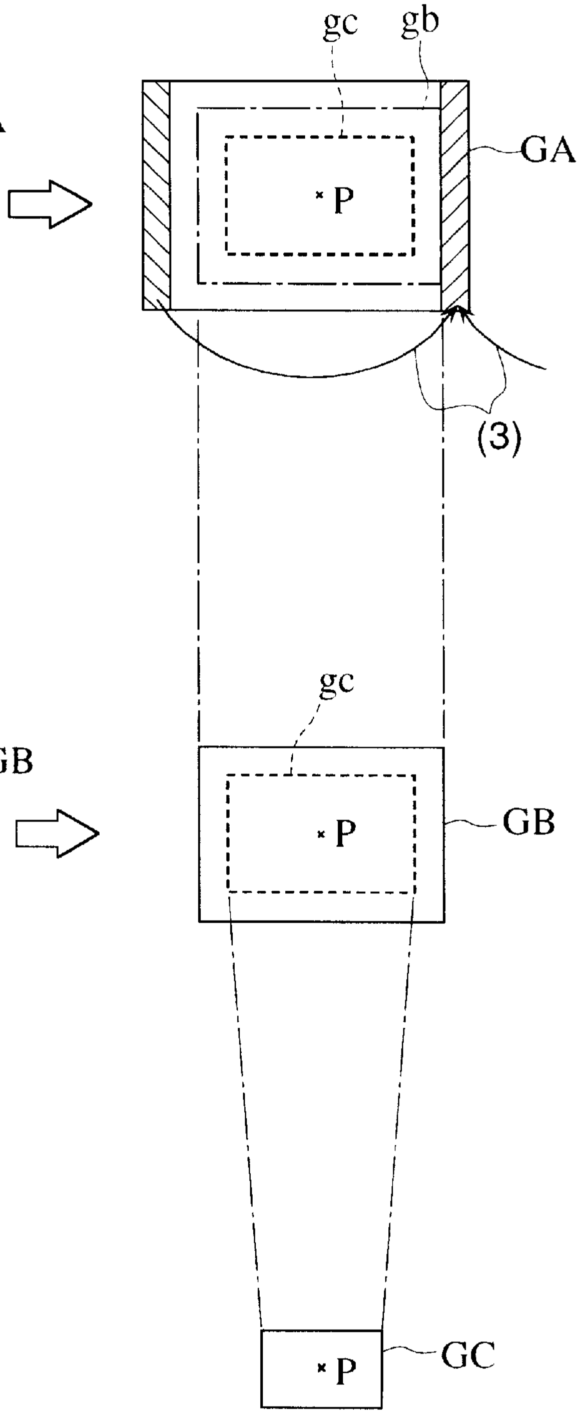

In the above case of FIGS. 34 to 35B as well, image data gb which can be scrolled as display image data GC before the lapse of a predetermined unit time period from any given time point is already provided in the scroll image data GB, and image data required to be provided as the above scroll image data GB before the lapse of a next predetermined unit time period is already prepared in the developed image data GA at the given time. And, immediately after terminating the supply of image data to the scroll image data GB, image data in a newly required range is prepared as developed image data GA.

In other wards, in the above case of FIGS. 34, 35A and 35B, similarly to the case of FIGS. 32, 33A and 33B, if the predetermined unit time period after any given time point described above is set to a new given time point, the rightward scroll-updating process can be carried out in the same manner as described above, and the same process can be continuously repeatedly carried out.

Next, in the routine for the direction-designated scroll updating process shown in FIG. 21, the upward scroll-updating process (S142), for instance, can be carried out similarly to the rightward scroll-updating process (S148) by substituting "SHIFT GC DOWNWARD" for "SHIFT GC LEFTWARD" and "SHIFT READ POINTER . . . UPWARD" for "SHIFT READ POINTER . . . RIGHTWARD" in the rightward scroll-updating process (S148) described hereinabove with reference to FIGS. 32, 35A and 35B. Similarly, the downward scroll-updating process (S144) can be executed similarly to the rightward scroll-updating process (S148) by substituting "SHIFT GC UPWARD" for "SHIFT READ POINTER . . . LEFTWARD" and "SHIFT GB DOWN" for "SHIFT READ POINTER . . . RIGHTWARD". The leftward scroll-updating process (S146) can be performed similarly to the rightward scroll-updating process (S148) by reversing the designated directions.

As described hereinabove, according to the ink jet printer 1, print image data (basic image data) GD required for display from any given time point until the lapse of the predetermined unit time period from the given time point is prepared and stored as developed image data GA in the developed image data buffer (basic image data storage means) 245 by the predetermined unit time period before the given time point.

Then, a required portion of the above resulting developed image data GA is stored as scroll image data GB in the scroll image data buffer (scroll image data storage means) 246 by the desired time point, which makes it possible to continue the smooth scroll within the predetermined unit time period from the given time point.

Further, print image data (basic image data) GD required to be available at each time point can be limited to a range which can be scrolled within a time period twice as long as the predetermined unit time period after the time point, which makes it possible to save the memory area of the print image data (basic image data) GD and at the same time shorten processing time for forming or changing the print image data (basic image data) GD.

Figure 36:
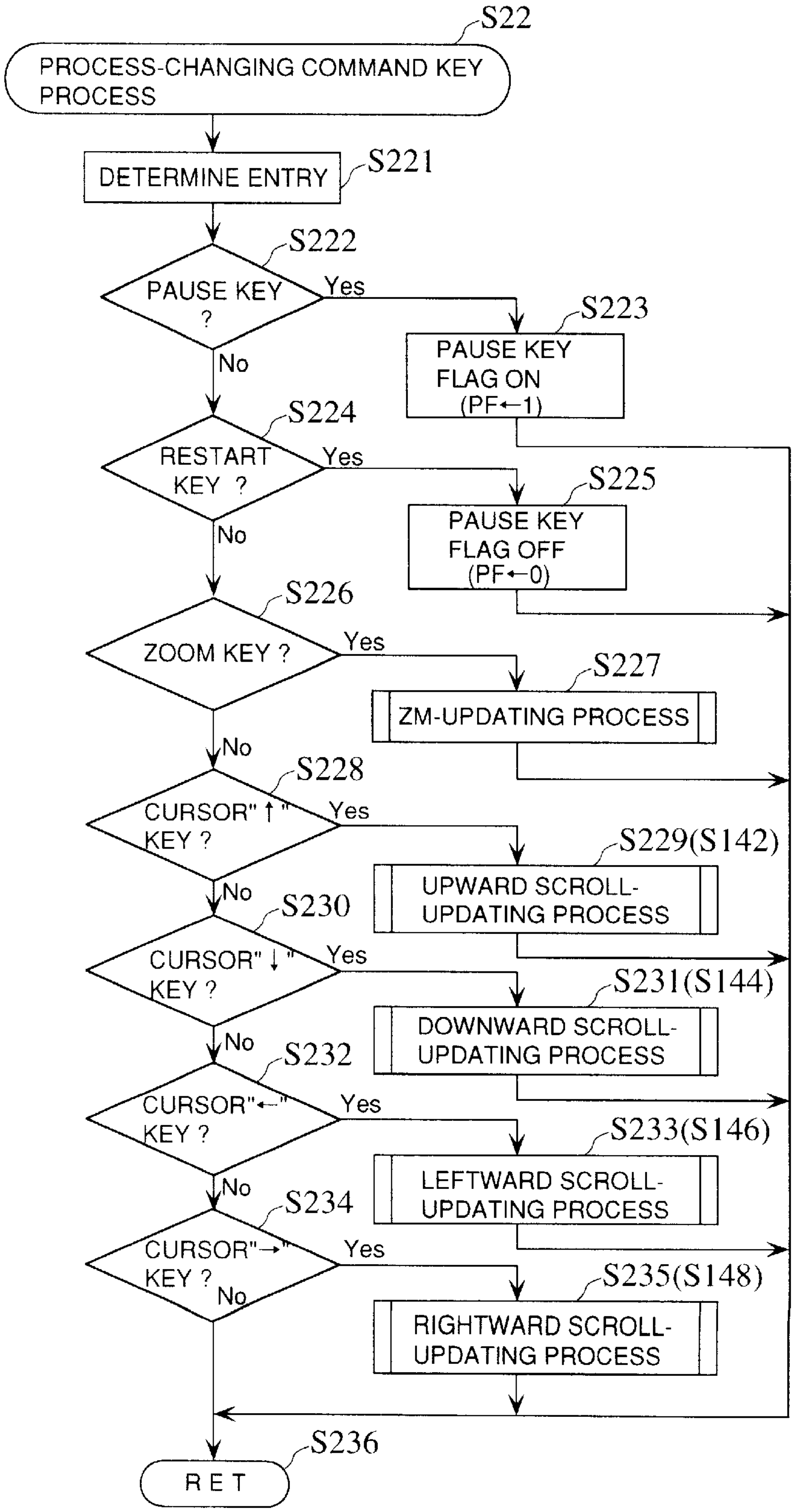
FIG. 36 is a flowchart showing a subroutine for carrying out a process-changing command key process appearing in FIG. 7.

Next, the process-changing command key process executed at the step S22 in FIG. 7 will be described with reference to FIGS. 36 to 38C. When the above-mentioned direction-designated scroll process at the step S14 in FIG. 7 is terminated and there has not occurred any error (No to S16), it is determined whether or not a key entry has been made by any of the process-changing command keys at the step S20. If the key entry has been made by a process-changing command key(Yes to S20) and the operated key is not the stop key 112 (No to S21), the present process is started and first, as shown in FIG. 36, it is determined at a step S221 by which key the entry has been made.

Various subroutines responsive to operations of the entry keys determined to be operated at the step S221 are carried out as described hereinafter, followed by terminating the process at a step S236, and the program proceeds to the following step S24 in FIG. 7, wherein it is determined whether or not the circular process flag RTF is equal to 1.

According to the process changing command key process, if the key entry has been made by the pause key 116 (Yes to S222), the pause flag is turned on (PF=1) at a step S223 and hence when the program returns to the process in FIG. 7, at the step S13 for determining whether or not the pause flag PF is equal to 1, it is determined that the pause flag is equal to 1 (Yes to S13) so that the program skips over the step S14 for the direction-designated scroll updating process and the step S16 for determining whether or not the error flag is on, to the step S20, wherein it is determined whether or not a key entry has been made by any of the process-changing command keys. In other words, so long as the state in which the pause flag PF is equal to 1 is not canceled, the direction-designated scroll updating process (S14) is not resumed but continues to be paused.

However, the step S20 for determining whether or not a key entry has been made by any of the process-changing command keys and steps subsequent thereto continue to be carried out, and hence if a key entry has been made by the stop key 112 (Yes to S20 and S21), the automatic scroll process is terminated by carrying out the steps S18, S19, S30, followed by returning to the key entry wait state in FIG. 6. Alternatively, if, although the key entry has been made by a process-changing command key (Yes to S20), the entry has not been made by the stop key (No to S21), the process-changing command key process (S22) is started again.

Therefore, even in the state in which the pause flag is on (PF=1), a process-changing command by a process-changing command key can be executed, which makes it possible e.g. to stop the automatic scroll process to carry out other processes on print image data in a display range at the time point, such as subroutines for shifting the display range of the image in a direction perpendicular to the direction of the automatic scroll, or alternatively in an opposite direction to the direction of the automatic scroll by operating the cursor key 110 or the like as described hereinafter (S228 to S235) to view unit images in the resulting display range.

Next, as shown in FIG. 36, if the key entry has been made by the restart key 117 (Yes to S224), the above pause flag PF is turned off, that is, the pause flag PF is set "0" at a step S225, and hence when the program returns to the FIG. 7 process, it is determined that the pause flag PF is equal to 0 (No to S13) to thereby resume thedirection-designated scroll updating process at the step S14.

Next, if the entry has been made by the zoom key 118 (Yes to S226), a zoom (ZM)-updating process is carried out at a step S227. This process (S227) corresponds to the third manner of setting/changing the image size ratio (zoom ratio ZM) of which the first manner (see FIGS. 9 to 12E) and the second manner (see FIGS. 8, 13A and 13B) are described above with reference to FIGS. 8 to 13B.

When the zoom key 118 is depressed during execution of the automatic scroll process in FIG. 7, whenever the zoom key 118 is depressed, display image data GC expanded or increased in size is displayed on the display screen 18. For instance, when the zoom key 118 is depressed twice in succession in the state of the screen T24 (the zoom ratio ZM=1/6) in FIG. 12E during execution of the rightward automatic scroll process described above with reference to FIGS. 12A to 12F, the display image data is displayed in the state of the screen T22 (the zoom ratio ZM=1/4) by the first depression, and in the state of the screen T20 (the zoom ratio ZM=1/2) by the second depression.

That is, in this case, according to the routines shown in FIGS. 7 and 36, in response to the key entry made via the zoom key 118 (Yes to S20, No to S21, Yes to S226), the ZM-updating process (S227) and the direction-designated scroll updating process (S14) are carried out, and in response to the next zoom key entry (Yes to S 226), the ZM-updating process (S227) and the direction-designated scroll updating process (S14) are carried out. In short, the ZM-updating process (S227) and the direction-designated scroll updating process (S14) are both performed alternately.

Therefore, according to the ink jet printer 1, the zoom ratio ZM between the size (resolution) of print image data (basic image data) GD and that of display image data GC can be changed in one of the above first and second manners before starting the automatic scroll process (see FIGS. 8 to 19), and during execution of the automatic scroll process as well, the zoom ratio ZM can be changed by making key entries (entering ratio changing commands) by operating the zoom key 118 (see FIG. 36).

It should be noted that, as described with reference to FIG. 9, the zoom ratio ZM has a range of 2/1 (two-fold) to 1/16, and hence in the above example, by further depressing the zoom key 118, the zoom ratio ZM can be changed such that 1/2→1/1→2/1→1/16→1/12→1/8→1/6.

Further, the re can be employed another method which is capable of selecting the zoom ratio ZM by depressing another key after depressing the zoom key 118, or alternatively by depressing the zoom key 118 and another key at the same time. As the above other key, e.g. number keys "1" and "2" may be used for selecting "Zoom in" and "Zoom out" respectively, or alternatively alphabet keys "A" and "B" for selecting "Zoom in" and "Zoom out", respectively. There can be still other methods e.g. of using four cursor keys 110 if their roles in the present process can be discriminated from ones described hereafter.

In the above case, whenever the "Zoom in" key is depressed, the zoom ratio ZM can be changed e.g. such that 1/2→1/1→2/1→1/16→1/12→1/8→1/6. Inversely, whenever the "Zoom out" key is depressed, the zoom ratio ZM can be changed e.g. such that 1/6→1/8→1/12→1/16→2/1→1/1.

Next, when the entry key has been made by any of the four cursor keys 110 (S228, S230, S232 or S234), the scroll-updating process is carried out in a direction designated by the operated one of the cursors 110 (S229, S231, S233 or 235).

In the automatic scroll process at the step S10 in FIG. 7, the whole scroll-updating process (S14) is continued automatically, while the present scroll-updating process responsive to the key entry made by any of the four cursor keys 110 is a so-called manual scroll-updating process. However, the manually-input command for the scroll process (command for moving or scrolling display ranges) entered via the cursor key 110 during execution of the automatic scroll process makes the present scroll-updating process a combination of the scroll processes.

Although the present scroll-updating process and the automatic scroll process are different from each other only in that the former is not carried out automatically continuously, they are identical in their operating principles with each other and hence the present scroll-updating process can utilize subroutines for carrying out the scroll-updating process described above with reference to FIGS. 21 to 35B in common. Now, referring to the examples described above with reference to FIGS. 23 to 24, description is made of a case in which a key entry by the cursor "↓" key 110D is made during execution of the rightward automatic scroll process.

Figures 37A, 37B:
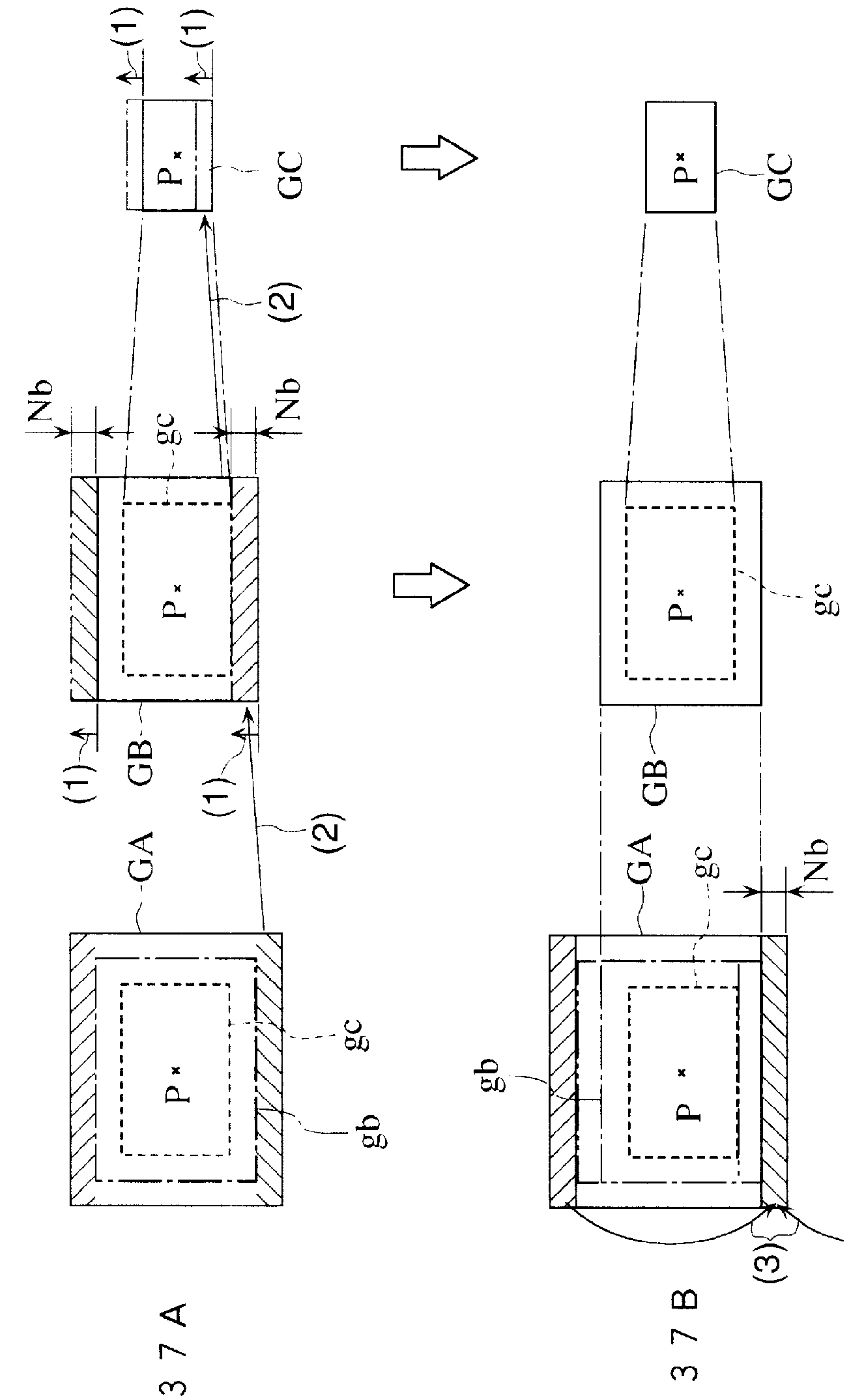
FIGS. 37A and 37B are diagrams similar to FIG. 33 which correspond to the FIG. 36 rightward scroll-updating process.

When it is determined at the step S230 in FIG. 36 that the key entry has been made by the cursor "↓" key 110D (Yes to S230), the downward scroll-updating process (S231 identical to the step S144 in FIG. 21), as shown in FIGS. 37A and 37B, is started.

(1) First, display image data GC is shifted upward by Nc lines and scroll image data GB is shifted upward by Nb lines corresponding to the Nc lines.

(2) Next, the Nb lines of the scroll image data GB are read and written into an empty area produced by the above step (1), for a portion of the display image data GC to be added while being expanded, reduced or schematized for display, at the step S14821, while the Nb lines of the developed image data GA are read and written into an empty area produced by the above step (1), for a portion of the scroll image data GB to be added, at the step S14822.

(3) Only a required portion of text data is read out from the text memory 244 and corresponding font data is developed as new unit image data to be stored in an empty area for a portion of the developed image data GA to be added, whereby developed image data GA is made correspondent to a next range of print image data GD at a step S1483, followed by terminating the subroutine (S148) at a step S1485.

The above method is the same as described hereinbefore with reference to FIGS. 33A and 33B. It goes without saying, however, that the above process can be performed by the method which shifts (circulates) both a range (of addresses) for reading out image data gc corresponding to display image data GC and a range for supplying new image data.

Further, it is possible to simply store information of the depression of the cursor "↓" key 110D by means of the flag or the like at the step 231 in FIG. 36 for carrying out the downward scroll-updating process simultaneously with the direction-designated scroll-updating process at the step S14. The scroll-updating process in this case is the scroll process to a lower right location described hereinabove with reference to FIGS. 23A to 23C, and 24, 28A to 28C, which can be carried out by the same subroutines as shown in FIGS. 32 and 34.

When any of the four cursor keys 110 is depressed during execution of the automatic scroll process in FIG. 7, through the process described above with reference to FIGS. 36, 37A and 37B, a display range at the time point can be moved or scrolled upward, downward, leftward or rightward although the automatic scroll process is being executed.

Figure 38A:
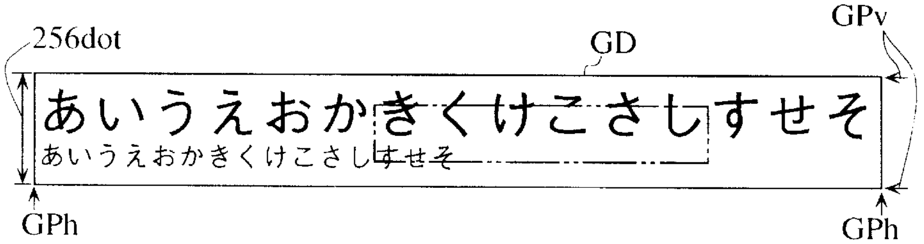
FIGS. 38A to 38C are diagrams showing examples in which a display range shift command is entered by operating cursor keys when the rightward automatic scroll process is being carried out on the same print image data shown in FIGS. 12A to 12E.
Figure 38B:
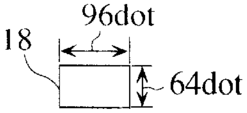
Figure 38C:
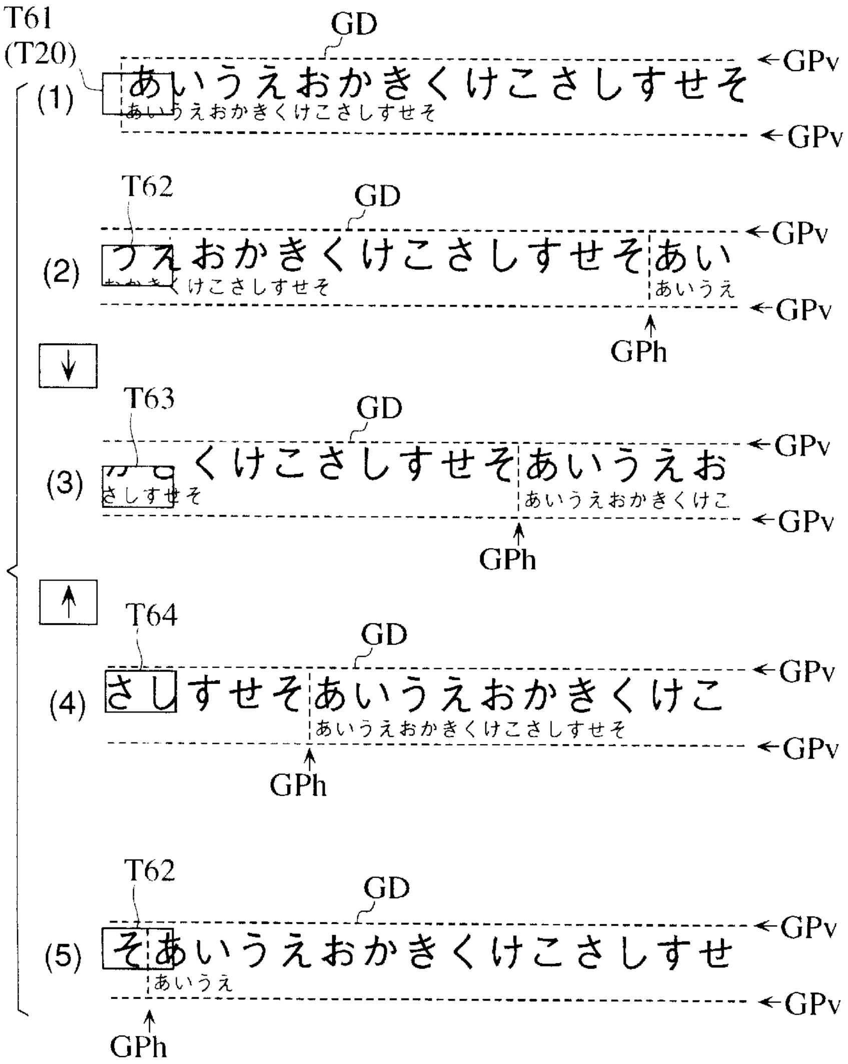

For instance, as shown in FIG. 38A to 38C (FIG. 38C(1) is identical to FIG. 12C(1)), during execution of the rightward automatic scroll process (T62) from the state (in which ZM=1/2) of the screen T61 in FIG. 38C(1) (identical to screen T20 in FIG. 12C), when the cursor "↓" key 110D is depressed, the display range is shifted downward, which makes it possible to view small characters displayed below large characters sequentially.

Further, in this state of the screen (T63), after viewing the last character "そ" of the small Japanese hirakana character string, by depressing the cursor "↓" key 110U, each large Japanese hirakana character above the small characters can be viewed in its entirety, and by continuing the rightward automatic scroll in such a state of the screen T64, the last large character "そ" of the large Japanese hirakana character string can be viewed.

Figure 45A:
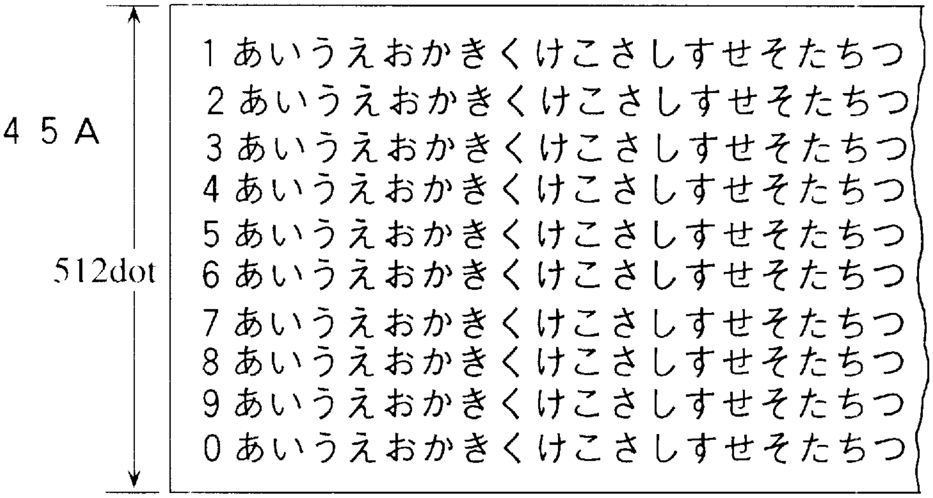
FIGS. 45A and 45B are diagrams similar to FIGS. 43A to 43C, in which print image data has a resolution of 512 dots in the direction of the width thereof.
Figure 45B:
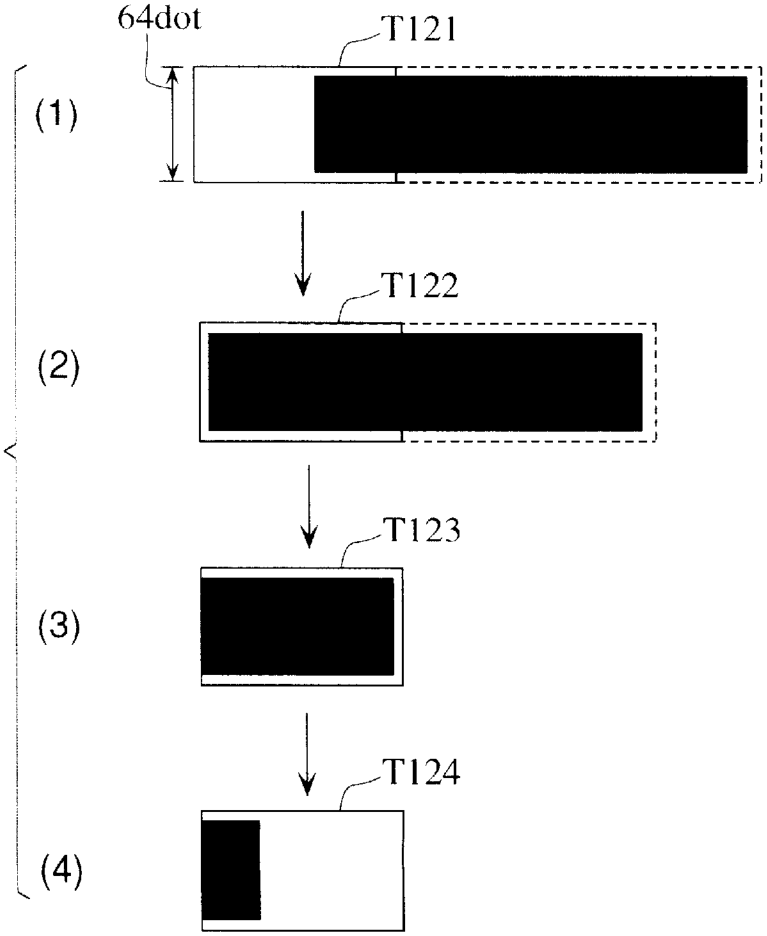

As describe hereinabove, on the display screen 18 can be displayed display image data GC of 64×96 dots. However, when the printer has only a conventional viewing capability, print image data (basic image data) GD of approximately 256 dots in the direction of the width the reof which can be printed on a tape with a width of 24 mm is the upper limit in size of the print image data of which the contents of individual unit images can be viewed or recognized at the above size (resolution) of the displayed image (see FIGS. 43A to 44B). Moreover, tapes T having a larger width tend to be used as print material, and when print image data (basic image data) GD of 512 dots or 1024 dots suitable for the tape T with a large width is decreased in size to display it, it is impossible to accurately grasp the contents of the individual unit images to be printed on the tape and the layout of the individual unit images (see FIGS. 45A and 45B).

Inversely, when the zoom ratio ZM is made large such that each unit image, such as an image of each character, can be viewed, the print image data can not be displayed in its entirety within a small display screen 18. Therefore, although the contents of unit images within a display range can be confirmed, it is impossible to view the contents of unit images or the layout the reof (which the user desires to confirm) as an important constituent of the layout of the entire print image.

To overcome the above inconveniences, as described hereinbefore with reference to FIG. 38A to 38C, in the ink jet printer (image display device) 1, the automatic scroll process is carried out at the zoom ratio ZM which enables the unit image of each character or the like to be viewed at the minimum, for moving a display range, whereby it is possible to view the contents of an individual unit image, such as the last character "そ" of the small characters or the last character "そ" of the large characters mentioned above with reference to FIGS. 38A to 38C, or the layout thereof (which the user desires to view) as an important constituent of the layout of the entire print image.

It should be noted that although in the above example description has been made of the case in which the cursor ↓" key 110D and the cursor "↑" key 110U are depressed to make key entries, it is possible to depress the other cursor keys for carrying out various operations: e.g. by depressing the cursor "→" key 110R during execution of the rightward automatic scroll process, the scroll process can be accelerated , or alternatively by depressing the "↓" key 110L the speed of the scroll process can be reduced or caused to proceed in an opposite direction to the direction of the scroll, the reby saving time for viewing the contents of individual unit images or the layout of the unit images in detail.

It goes without saying that similar operations can be also carried out during the automatic scroll process in a direction other than the rightward direction, and for the purpose of saving time it is effective to make key entries by the above pause key 116.

Further, when the printer is capable of printing various unit images mixed with respect to orientation and/or sequence, e.g. a mixture of character string images comprised of vertical writing character images and/or horizontal writing character images arranged in the direction of the length of a tape and/or in the direction of the width thereof (see FIGS. 42A to 42G), it is required for the user to recognize not only the image of the whole image data but also the orientations and sequence of the character images (unit images) of portions (character strings or the like) to make sure of the intended images and their arrangement. Moreover, it is expected that as the width of a tape increases, that is, as the size of print image data GD becomes larger and more diversified, the necessity of viewing the orientations and sequence of the unit images becomes more and more important.

According to the ink jet printer 1, even in the case of the above print image data GD having a mixture of unit images in the vertical writing and horizontal writing print formats, it is possible to easily view the contents, orientations, layout, sequences and the like of the unit images forming the print image data GD by using the small display screen 18 through relatively simple operations.

As shown in FIGS. 42A to 42G, there are shown various examples of print image data, Ga, Gb, Gc, Gd, Gh, Gv and Gm. Taking the print image data Gm as an example, it contains the image of "パスワード"100" (postal code) formed thereon in the "Portrait/Horizontal writing" print format in which character strings in horizontal writing are each arranged in a transverse direction to the direction of feeding of the tape T (this direction being indicated by an arrow in the figure), with the images of "千代田区" (Chiyoda-ku) to "太郎 様" (Mr. Taro) formed in the "vertical writing" print format.

Figure 39A:
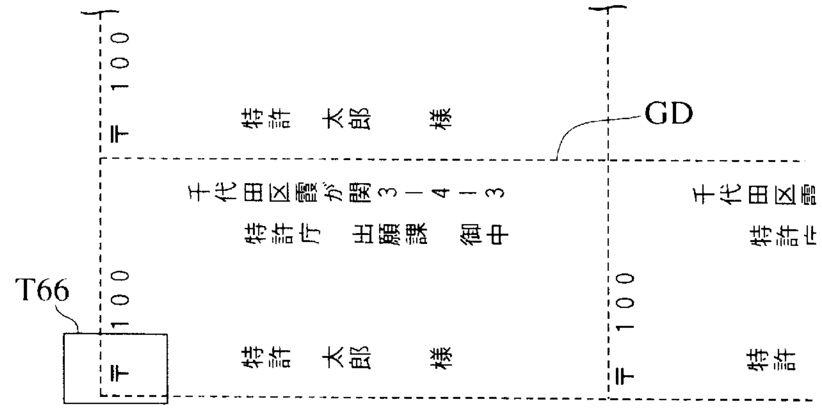
FIGS. 39A to 39D are diagrams which are useful in explaining examples of manners of viewing one of the image data items shown in FIG. 42 as a viewing object.
Figure 39B:
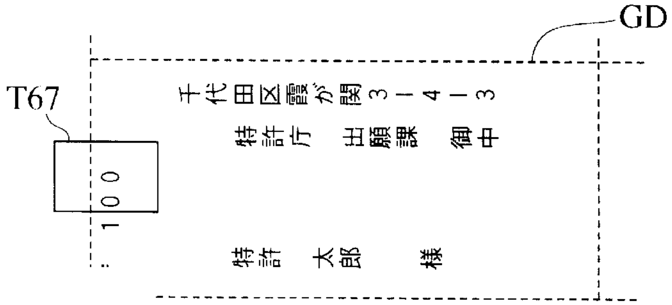
Figure 39C:
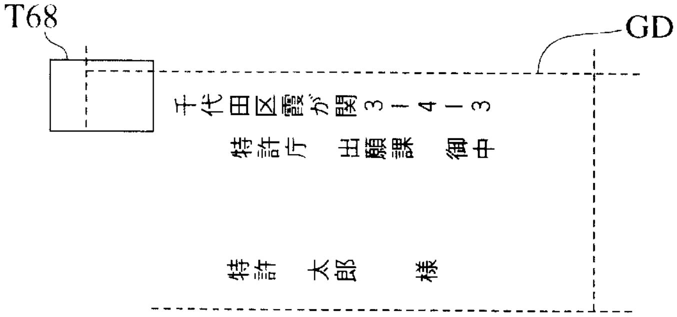
Figure 39D:
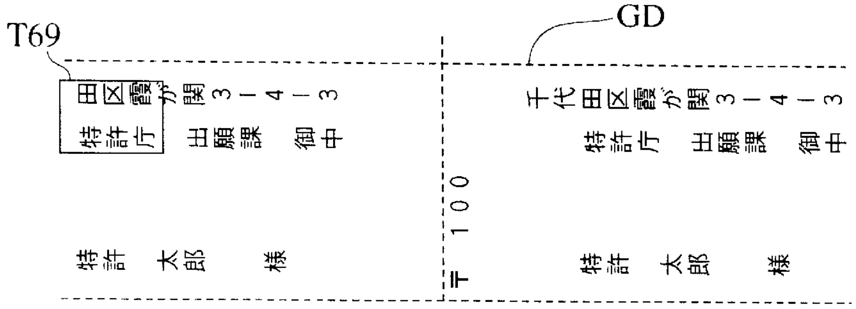

In the case of the above print image data Gm mixed in sequences of unit images, images can be viewed more easily by following each sequence. Assuming that the print image data Gm shown in FIG. 42G is print image data (basic image data) GD to be viewed in the display screen 18, as shown in FIGS. 39A to 39C, the lower left corner of the print image data GD is first displayed (T66) as shown in FIG. 39A, and then the upward automatic scroll process is carried out to confirm the image "開始比率(%)"100" (T67) as shown in FIG. 39B, and continued to the upper left corner of the print image data GD (T68) as shown in FIG. 39C, followed by terminating the upward automatic scroll process.

Needless to say, the above terminating condition may be specified by the designation of the ending position described hereinabove, or alternatively the automatic scroll process may be carried out in a circular manner and terminated by operating the stop key 112 at the upper left corner of the print image data GD. The rightward automatic scroll process can be started from this state (T68), and when a leading portion of the image "千代田区" (Chiyoda-ku) has been displayed, the display range can be moved slightly downwardby the cursor "↓" key 110D (T69), whereby the character strings "千代田区"霞ヶ関3-4-3" (Chiyoda-ku) Kasumigaseki 3-4-3) and "特許庁 出願課 (Tokkyo-cho Shutugan-ka Onchu) (in the figure, these characters are in vertical writing) can be simultaneously viewed.

The above example illustrated in FIGS. 39A to 39D shows a case in which the print image data GD has two sequences of unit images extending at right angles to each other, i.e. in the direction of the length of the tape T and in the direction of the width of the same. As is apparent from the above example, the ink jet printer 1 can select the direction of scroll of the display range selectively along the sequences of the unit images, so that it is possible to easily view the contents, orientations, layout, sequences, etc. of the unit images forming each print image through relatively simple operations.

Figure 42A:
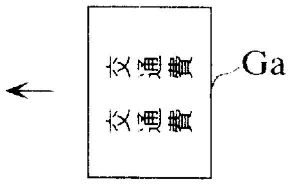
Figure 42B:
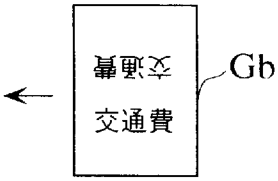
Figure 42C:
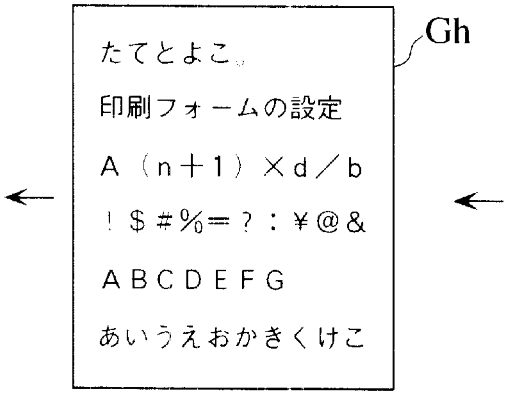
Figure 42D:
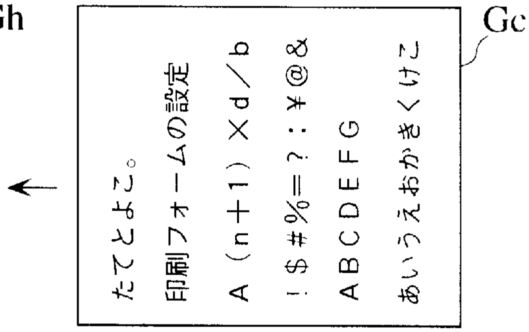
Figure 42E:
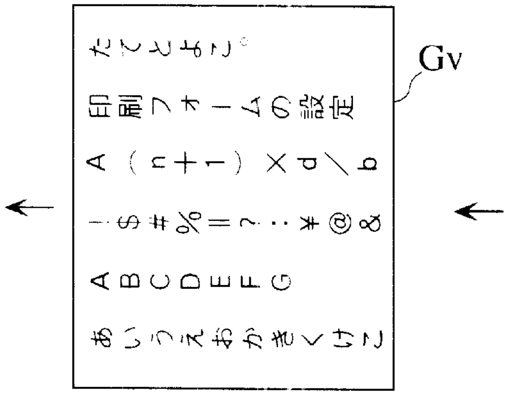
Figure 42F:
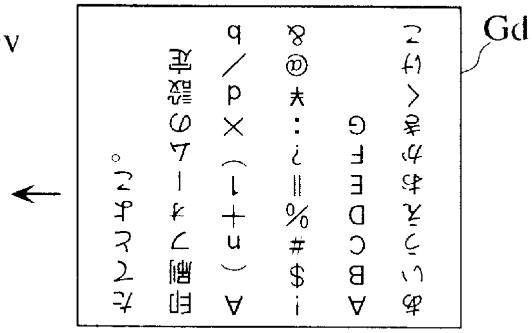
Figure 42G:
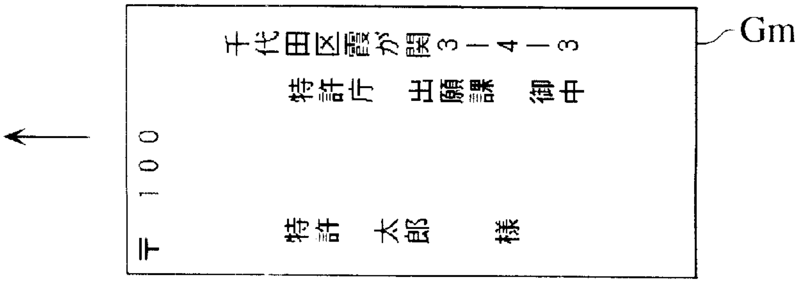
Figure 43A:
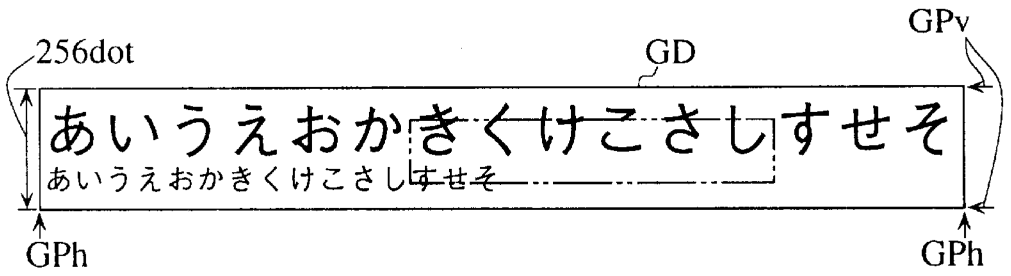
FIGS. 43A to 43C are diagrams showing examples of the rightward automatic scroll process carried out on print image data having a resolution of 256 dots in the direction of the width thereof by employing a conventional function.
Figure 43B:
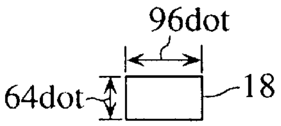
Figure 43C:
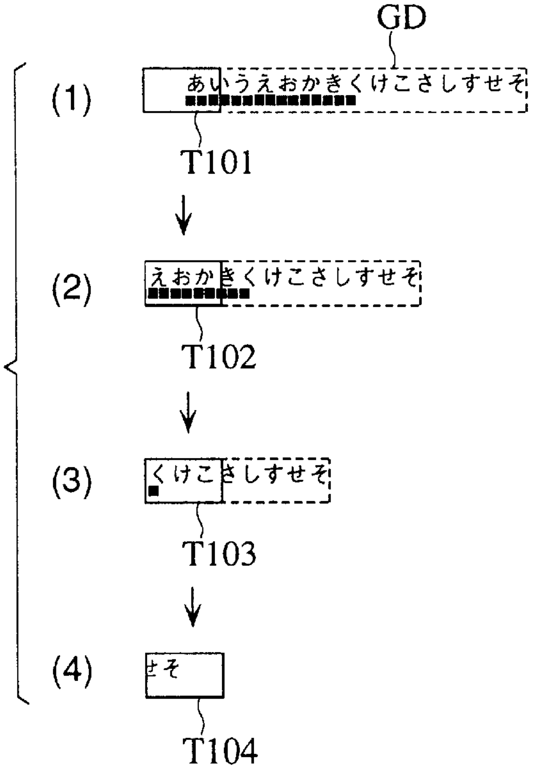
Figure 44A:
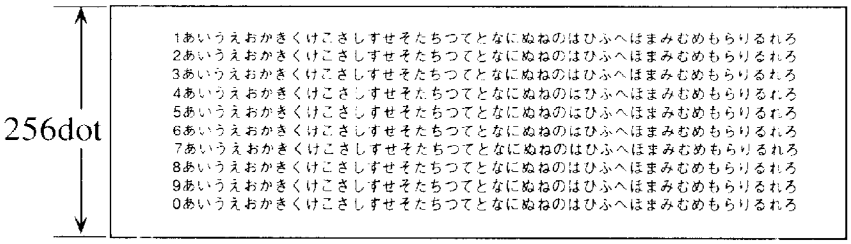
FIGS. 44A and 44B are diagrams similar to FIGS. 43A to 43C.
Figure 44B:
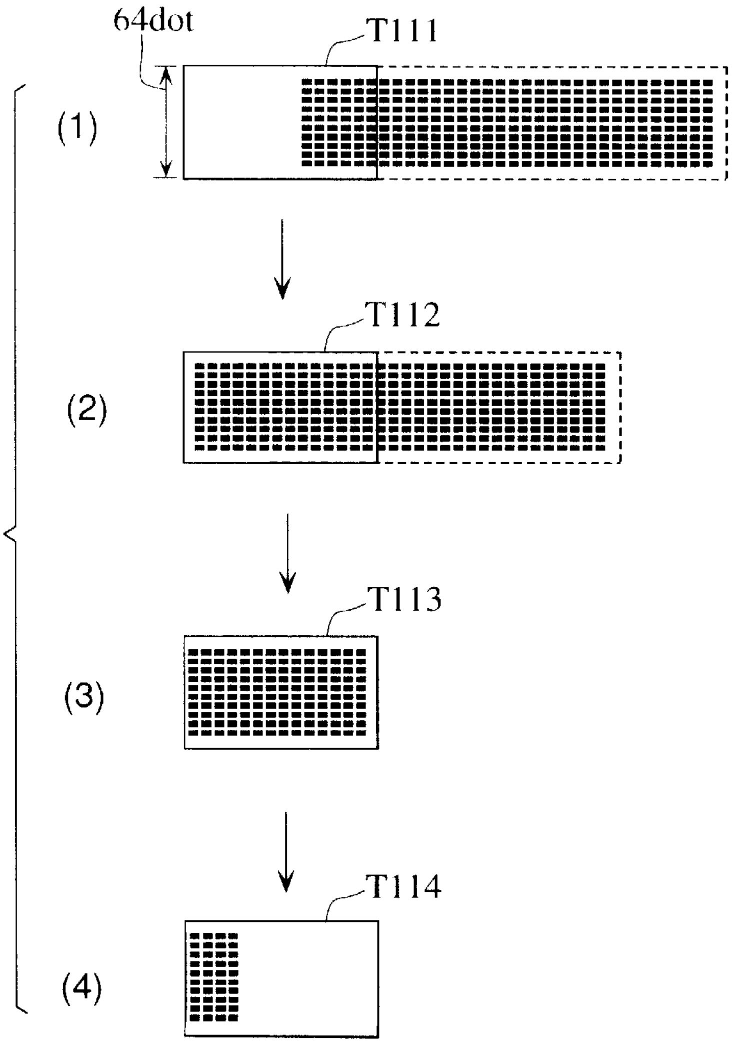

Similarly, assuming that print image data Gb formed in the "Index/Horizontal" print format shown in FIG. 42B is print image data (basic image data) GD to be viewed in the display screen 18, for instance, the upper left corner of the print image data Gb is first displayed to enable the upper half of the print image data Gb to be viewed, and the rightward automatic scroll process can be carried out to view the upper character string of "交通費" (computation allowances) (in the figure in an upside-down state). Then, by displaying the lower right corner of the print image data Gb to enable the lower half of the print image data Gb to be viewed, and the n the leftward automatic scroll process can be carried out to view the lower character string of "交通費" (formed by rotating the upper "交通費" through 180 degrees, which is in point symmetry to the upper character string.

This is an example of sequences of unit images in two opposite directions. According to the ink jet printer 1, even when print image data Gb is formed of character string or like images whose unit images are arranged in two opposite sequences, the automatic scroll can be selectively carried out along the two sequences opposite to each other, so that it is possible to easily view the contents, orientations, layout, sequences, etc. of the unit images forming each image through relatively simple operations.

Figure 40A:
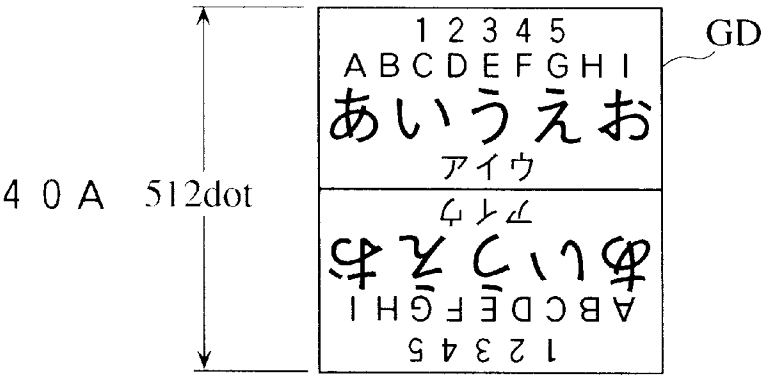
FIG. 40A and 40B are diagrams which are useful in explaining examples of manners of viewing print image data formed by rotating the print image data in FIG. 18A through 180 degrees and uniting the original data and the resulting data in point symmetry to each other, the print image data having a resolution of 512 dots in the direction of the width and used in printing on a printing tape T having a large width.
Figure 40B:
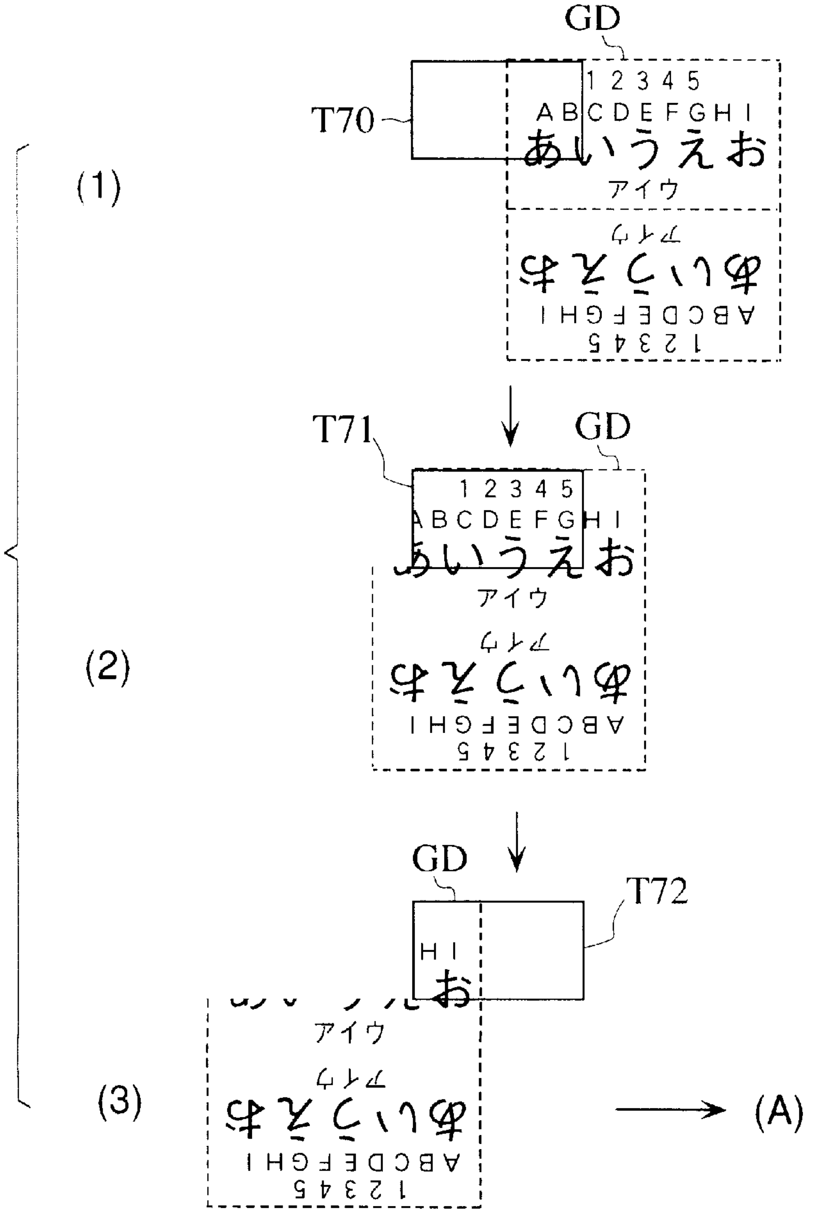
Figure 41:
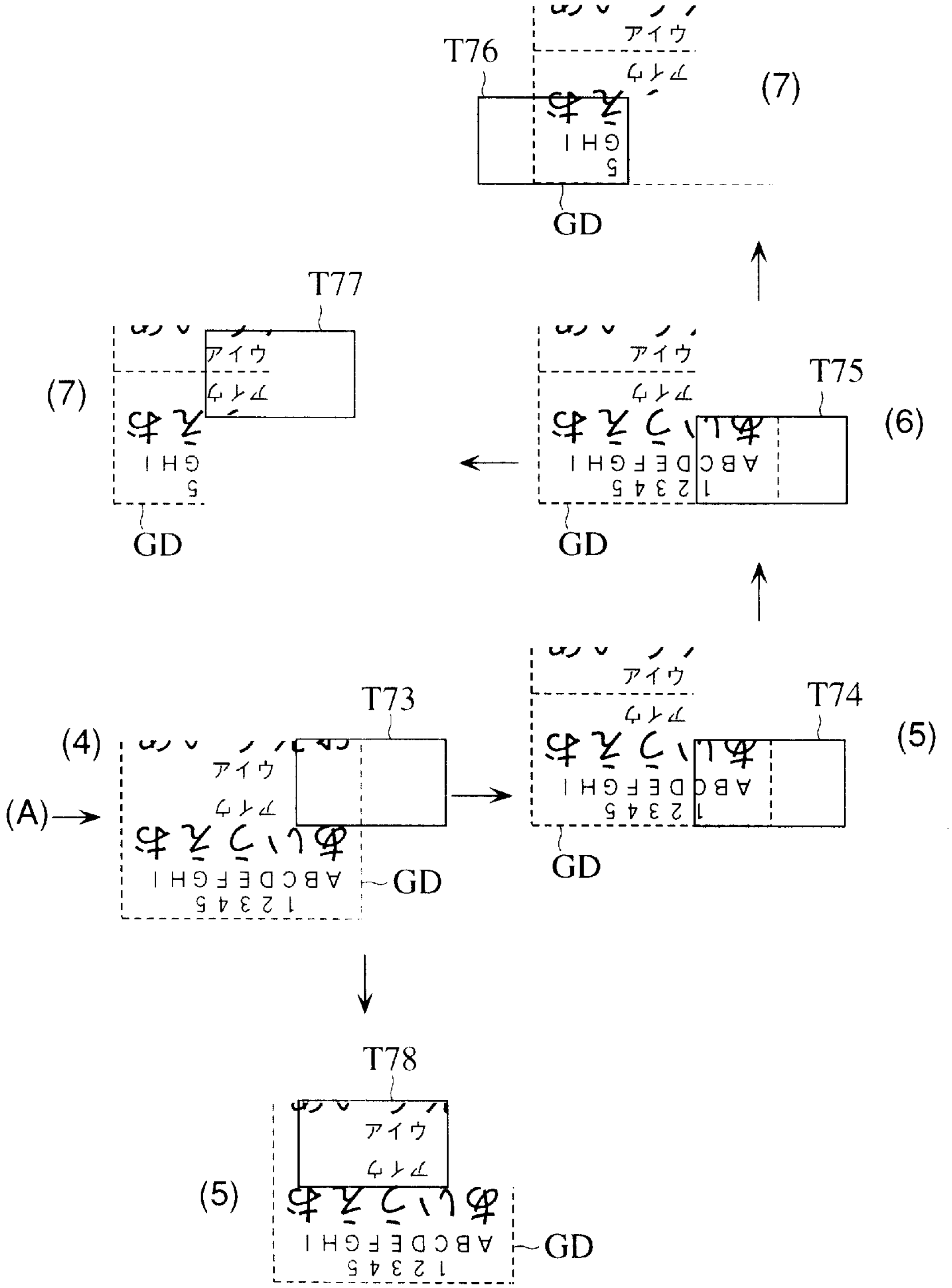
FIG. 41 is a diagram continued from FIG. 40.

Further, FIGS. 40A to 41 show an example of viewing print image data GD to be printed on a tape T having a large width. As shown in FIG. 40A, the print image data GD is formed by rotating the print image data described hereinabove with reference to FIGS. 18A to 18D through 180 degrees to the reby unite the original data item and the resulting data item in point symmetry to each other. The print image data GD has a resolution of 512 dots in the direction of the width of the tape T.

To view this print image data, as shown in a screen T70 in FIG. 40B, the upper left corner of the print image data GD can be first displayed to carry out the rightward automatic scroll process (T70 to T72), whereby it is possible to view part of the upper portion of the print image data GD, i.e. small character strings "1 2 3 4 5" and "A B C D E F G H I" and a large Japanese hirakana character string "あ い う え お" (a i u e o) except for part of this character string, which are located at the upper half of the print image data GD.

The downward automatic scroll process (T72 to T74) and then the leftward automatic scroll process (T74 to T76) can be carried out to view part of the print image data GD at right-hand end, i.e. part of the large Japanese character (e) and the remaining portion of the large Japanese characterless "お" (o), both of which are located at the upper portion of the print image data GD, and small character strings "1 2 3 4 5" and "A B C D E F G H I" and the large Japanese hirakana character string "あ い う え お" e o) except for part of this character string, which are located at the lower half of the print image data GD.

In the above rightward automatic scroll process shown in FIG. 40B, it is impossible to view lower portions of the large Japanese hirakana characters "あ い う え お" (a i u e o) and small Japanese katakana characters "ア イ ウ" (a i u) under the large Japanese hirakana characters.

In such a case, the pause key 116, the restart key 117 and the cursor keys 110 can be operated. That is, in the state of the screen T70 in FIG. 40B (1), for instance, the display range can be slightly shifted downward to thereby confirm lower ends of the large Japanese hirakana characters "あ い" (a i), and after the rightward automatic scroll process further proceeds to the state of the screen T71, the small Japanese katakana characters "ア イ ウ" (a i u) can be confirmed by moving the display range slightly downward. Then, the rightward automatic scroll process is resumed to the state of T72, from which the display range can be moved slightly downward to confirm the remaining portions of the large Japanese hirakana characters "え お" (e o). Thus, the upper half of the print image data GD can be completely brought into view to confirm the images. The same method can be applied to view the whole of the lower half of the print image data GD.

Further, in the state of the screen T75, the leftward automatic scroll process may be stopped by depressing the stop key 112 to carry out the upward automatic scroll process, thereby changing the order of images to be viewed (T77). Similarly, the downward automatic scroll process may be stopped in the state of the screen T73 to execute the leftward automatic scroll process (T78). As described above, the ink jet printer 1 makes it possible to freely confirm or view the print image data GD by relatively simple operations for selectively carrying out the automatic scroll processes in the four directions and changing the scroll processes through entering processing-changing commands.

As described above in detail, according to the ink jet printer 1 (image display device), by operating the automatic scroll key 115 while depressing any of the four cursor keys 110 (by selectively entering commands for starting the automatic scroll processes), it is possible to automatically scroll the display range upward, downward, leftward and rightward on the print image data (basic image data) GD. Further, the scroll processes are automatically executed and hence simply by inputting commands for starting the scroll process, troublesome operations, such as continually depressing other scroll means including cursor keys, can be made unnecessary.

In the above process, as described above with reference to FIG. 22 and other figures, the conversion of image data gc in the display range on print image data (basic image data) GD to display image data GC includes, similarly to the conventional device, the simple extraction, zoom in and zoom out of images or the schematic representation of respective unit images carried out in reducing operations.

This makes it possible to display the display image data GC to such an extent (with a resolution) which enables at least the orientations of unit images to be discriminated. Then, by carrying out the rightward automatic scroll process, it is possible to easily and successively view the contents, orientations, layout, sequences and the like of the unit images (character images, such as images of characters in vertical writing and/or horizontal writing) arranged from the left to the right on the print image data (basic image data) GD. Similarly, by carrying out the downward automatic scroll process, it is possible to view unit images (e.g. of characters in vertical writing and/or horizontal writing) from above to below. This is also the case with the upward or leftward automatic scroll process.

Further, when the print image data has two sequences of unit images, extending at right angles to each other, i.e. in the direction of the length of the tape T and in the direction of the width thereof, the automatic scroll process can be selectively carried out along the two sequences of unit images. Further, even when print image data Gb is formed of character string or like images comprised of two sequences of unit images extending in respective opposite directions, the automatic scroll of the display range can be selectively carried out along the two sequences of the unit images. Accordingly, it is possible to easily view the contents, orientations, layout, sequences and the like of the unit images which form the print image data GD through relatively simple operations.

According to the ink jet printer 1, the manner of automatic scroll process can be changed by key entries (inputting of process-changing commands) via the pause key 116, the restart key 117, the zoom key 118 the four cursor keys 110, etc., which enables images of the print image data GD to be viewed more easily or freely as desired through relatively simple operations.

Although in the above embodiments, the image display device according to the invention is applied to a tape printing apparatus of an ink jet type, this not limitative, but the same can be applied to a tape printing apparatus of a sublimation transfer type in which sublimation of ink is effected by using heating elements of thermal heads, a tape printing apparatus of melting transfer type. etc. Furthermore, it goes without saying that as a tape fed from a tape cartridge, there may be employed not only a peel-off paper-backed adhesive tape but also a tape without using a peel-off paper, such as a transfer tape and an iron print transfer tape, which are commercially available.

Still further, the image display device according to the invention can be applied to a small-sized and inexpensive information processing system other than the tape printing apparatus. For instance, it can be used as an image display device of a small-sized stamp making apparatus, for confirming or viewing image data based on which a stamp having a larger stamp face is to be made.

As described hereinabove, the image display device according to the invention can provide advantageous effects that even when a display screen is employed which is small in size relative to the size of a displayed image, it is possible to easily view the contents, layout, and the like of unit images which form the above displayed image at given locations through relatively simple operations.

It is further understood by those skilled in the art that the foregoing is a preferred embodiment of the invention, and that various changes and modifications may be made without departing from the spirit and scope thereof.

What is claimed is:

1. An image display device including input means for inputting various commands and data;

display means having a display screen;

basic image data storage means for storing part or whole of basic image data formed of a dot matrix; and display control means responsive to a corresponding one of said various commands input by said input means for converting a portion of said basic image data in a display range to display image data to display said display image data on said display screen;

said input means comprising:

start command means for inputting a start command for starting an automatic scroll process for automatically continuously shifting said display range in a scrolling manner in a predetermined one of upward, downward, leftward and rightward directions on said basic image data, and change command means for inputting a proportion change command for changing a proportion between a size of said display image data and a size of said basic, image data during said automatic scroll process, wherein said display control means is responsive to said start command input by said start command means for starting said automatic scroll process, and to said proportion change command input by said change command means for changing said display image data according the reto to thereby display resulting image data on said display screen.

2. An image display device according to claim 1, wherein said display control means starts said automatic scroll process from said display range having been set when said start command is input.

3. An image display device according to claim 1, wherein said input means further includes starting position-designating means for designating a starting position on said basic image data from which said automatic scroll process should be started.

4. An image display device according to claim 1, wherein said display control means carries out said automatic scroll process until a trailing end of said basic image data is reached, whereupon said automatic scroll process is terminated.

5. An image display device according to claim 1, wherein said input means further includes ending position-designating means for designating an ending position on said basic image data at which said automatic scroll process should be terminated.

6. An image display device according to claim 1, wherein said display control means carries out said automatic scroll process in a circular manner by connecting a trailing end and a leading end of said basic image data to each other.

7. An image display device according to claim 1, further including:

basic data storage means for storing said data input from said input means as basic data;

unit image data-forming means for outputting unit image data corresponding to sad basic data; and basic image data-forming means for arranging said unit image data corresponding to said basic data, which is outputted from said unit image data-forming means, in an area for said basic image data within said basic image data storage means to thereby form said part or whole of said basic image data.

8. An image display device according to claim 1, further including scroll image data storage means for storing therein, at any given time point during execution of said automatic scroll process, a portion of said basic image data within a scrollable range including said display range at said any given time point and a range to which said display range can be shifted within a predetermined unit time period from said any given time point, as scroll image data for use at said any given time point, and wherein said display control means converts a portion of said scroll image data in said display range to display image data and display said display image data at said any given time point on said display screen during said execution of said automatic scroll process, and reads out said scroll image data for use at said any given time point from said basic image data storage means to store said scroll image data in said scroll image data storage means by said any given time point.

9. An image display device according to claim 1, further including;

basic data storage means for storing said data input from said input means as basic data;

unit image data-forming means responsive to inputting of various kinds of data the reto for outputting unit image data corresponding to said various kinds of data input thereto;

scroll image data storage means for storing the rein, at any given time point during execution of said automatic scroll process, a portion of said basic image data within a scrollable range including said display range at said any given time point and a range to which said display range can be shifted within a predetermined unit time period from said any given time point, as scroll image data for use at said any given time point; and basic image data-forming means for arranging said unit image data corresponding to said basic data, which is outputted from said unit image data-forming means, in an area for said basic image data within said basic image data storage means, and forming said scroll image data for use at said any given time point before said predetermined time period from said any given time point, said display control means converting a portion of said scroll image data in said display range to display image data and display said display image data at said any given time point on said display screen during said execution of said automatic scroll process, and reading out said scroll image data for use at said any given time point from said basic image data storage means to store said scroll image data in said scroll image data storage means by said any give time point.

10. An image display device according to claim 1, wherein said basic image data is print image data to be printed on a print material.

11. An image display device according to claim 10, wherein said print material is in the form of a tape.

12. An image display device according to claim 1, wherein said change command means further includes stop command means for inputting a stop command for temporarily stopping said automatic scroll process.

13. An image display device according to claim 1, wherein said size of said basic image data is represented by a number od dots in a direction of width of an image represented by said basic image data and said size of said display image data is represented by a number of dots in a direction of width of an image represented by said display image data.

14. A method of displaying an image by automatically scrolling image data for an image display device having input means and a display screen, the method comprising:

storing part or whole of basic image data formed of adot matrix;

converting a portion of said basic image data in a display range to display image data to display said display image data on said display screen, in response to a corresponding one of various commands input by said input means;

starting an automatic scroll process in response to a start command input by said input means, for automatically continuously shifting said display range in a scrolling manner in a predetermined one of upward, downward, leftward and rightward directions on said basic image data; and changing, in response to a proportion change command input by aid input means at or before a start of said automatic scroll process or during said automatic scroll process, a proportion between a size of said display image data and a size of said basic image data during said automatic scroll process, to change said display image data to thereby display resulting display image data on said display screen.

* * * * *